(12) United States Patent
Moffitt et al.

(10) Patent No.: US 12,521,309 B2
(45) Date of Patent: Jan. 13, 2026

(54) COMPOSITIONS AND DEVICES FOR CONTAINING MEDICAL FLUIDS

(71) Applicant: ICU Medical, Inc., San Clemente, CA (US)

(72) Inventors: Ronald D. Moffitt, Spartanburg, SC (US); Vadim V. Krongauz, Austin, TX (US); C. Bradley Boring, Round Rock, TX (US); Wade DePolo, Georgetown, TX (US); Richard Underbrink, Round Rock, TX (US); John A. Thompson, San Antonio, TX (US)

(73) Assignee: ICU MEDICAL, INC., San Clemente, CA (US)

( * ) Notice: Subject to any disclaimer, the term of this patent is extended or adjusted under 35 U.S.C. 154(b) by 1144 days.

(21) Appl. No.: 17/486,418

(22) Filed: Sep. 27, 2021

(65) Prior Publication Data

US 2022/0105001 A1    Apr. 7, 2022

Related U.S. Application Data

(60) Provisional application No. 63/086,918, filed on Oct. 2, 2020.

(51) Int. Cl.
*A61J 1/14* (2023.01)
*A61J 1/10* (2006.01)
(Continued)

(52) U.S. Cl.
CPC .............. *A61J 1/1468* (2015.05); *A61J 1/10* (2013.01); *B29C 48/022* (2019.02); *B29C 48/08* (2019.02);
(Continued)

(58) Field of Classification Search
USPC .............................. 428/35.4; 524/84, 94, 569
See application file for complete search history.

(56) References Cited

U.S. PATENT DOCUMENTS

| | | | |
|---|---|---|---|
| 7,108,913 B1 * | 9/2006 | Cordova | D01F 1/06 |
| | | | 428/394 |
| 7,157,547 B2 * | 1/2007 | Little, Jr. | C08K 5/34 |
| | | | 428/34.1 |
| 2014/0162045 A1 * | 6/2014 | Bourassa | C08K 3/22 |
| | | | 522/155 |

FOREIGN PATENT DOCUMENTS

| | | |
|---|---|---|
| CN | 1431247 | 7/2003 |
| CN | 101724211 | 6/2010 |

(Continued)

OTHER PUBLICATIONS

ASTM International, Designation D882-02, Standard Test Method for Tensile Properties of Thin Plastic Sheeting, 2018, pp. 10.
(Continued)

*Primary Examiner* — Fred M Teskin
(74) *Attorney, Agent, or Firm* — Knobbe, Martens, Olson & Bear, LLP

(57) ABSTRACT

Several embodiments disclosed herein pertain to polymer compositions with optical enhancing agents. In some embodiments, the compositions are provided as polymer (layers including medical films), devices, or parts of devices. Some embodiments provide methods of making such compositions and articles of manufacture comprising them, as well as methods of using polymer compositions or the articles made therefrom. In several embodiments, the polymer formulation includes a base polymer and an optical enhancing additive. In some embodiments, surprisingly, the optical enhancing additive confers upon the polymer film improved stability, including thermal stability.

35 Claims, 21 Drawing Sheets

(51) Int. Cl.
| | |
|---|---|
| *B29C 48/00* | (2019.01) |
| *B29C 48/08* | (2019.01) |
| *B29C 48/88* | (2019.01) |
| *B65B 3/00* | (2006.01) |
| *C08J 5/18* | (2006.01) |
| *C08L 29/04* | (2006.01) |
| *B29K 27/06* | (2006.01) |
| *B29L 7/00* | (2006.01) |

(52) U.S. Cl.
CPC .......... *B29C 48/9135* (2019.02); *B65B 3/003* (2013.01); *C08J 5/18* (2013.01); *C08L 29/04* (2013.01); *B29K 2027/06* (2013.01); *B29L 2007/008* (2013.01); *C08J 2329/04* (2013.01); *C08J 2491/00* (2013.01); *C08J 2491/06* (2013.01); *C08L 2201/08* (2013.01); *C08L 2201/10* (2013.01); *C08L 2203/00* (2013.01)

(56) References Cited

FOREIGN PATENT DOCUMENTS

| | | | |
|---|---|---|---|
| WO | WO 2017/108771 | 6/2017 | |
| WO | WO 2018/047205 A1 * | 3/2018 | ................ C08L 5/16 |

OTHER PUBLICATIONS

ASTM International, Designation D3354-15, Standard Test Method for Blocking Load of Plastic Film by the Parallel Plate Method, 2020, pp. 4.
ASTM International, Designation E308-01, Standard Practice for Computing the Colors of Objects by Using the CIE System, 2001, pp. 32.
ASTM International, Designation E313-05, Standard Practice for Calculating Yellowness and Whiteness Indices from Instrumentally Measured Color Coordinates, 2010, pp. 6.
ASTM International, Designation F1249-13, Standard Test Method for Water Vapor Transmission Rate Through Plastic Film and Sheeting Using a Modulated Infrared Sensor, 2013, pp. 6.
ASTM International, Designation F1980-02, Standard Guide for Accelerated Aging of Sterile Medical Device Packages, 2002, pp. 6.
Chemicalbook, "Copper(II) phthalocyanine", Chemical Safety Data Sheet MSDS / SDS, 2025, p. 9.
Chemicalbook, "Solvent Blue 104", Chemical Safety Data Sheet MSDS / SDS, 2025, pp. 8.
Ciba, "Optical Brighteners", Fluorescent Whitening Agents for+ C4211 Plastics, Paints, Imaging and Fibers, 1999, pp. 16.
Colorchem, "Optical Brightener Agent KSN", Technical Data Sheet, 2017, pp. 1.
Colorants Chem Ovt Ltd, "Solvent Blue 97", Technical Data Sheet, 2008, pp. 1.
Jervis, Daniel A., "Optical Brighteners: Improving the Color of Plastics," Plastics Additives & Compounding, Nov./Dec. 2003, pp. 42-46.
Krongauz, et al., "Processes in Photoreactive Polymers", Springer-Science + Business Media, B.V., 1995, pp. 414.
Mayzo, Inc., Benetex® OB: Optical Brightener, Fluorescent Whitening Agent, Product Data Sheet, 2010, pp. 4.
Mayzo, Inc., Benetex® OB-1: Optical Brightener, Fluorescent Whitening Agent, Product Data Sheet, 2010, pp. 2.
Mayzo, Inc., Benetex® OB Plus: Optical Brightener, Fluorescent Whitening Agent, Product Data Sheet, 2015, pp. 3.
Nubiola, "Ultramarine Blue", Safety Data Sheet, Sep. 7, 2015, pp. 6.
Phillips, David BSc, PhD, FRSC, "Polymer Photphysics, Luminescence, Energy Migration and Molecular Motion in Synthetic Polymers", Chapman and Hall, 1985, pp. 228.
Valeur et al., "Molecular Fluorescence: Principles and Applications", Appendix, Wiley-VCH Verlag GmbH, 2012, pp. 521-550.
Yamaguchi et al., "How the π Conjugation Length Affects the Fluorescence Emission Efficiency" JACS Communications, Published on Web Sep. 25, 2008, pp. 3.

* cited by examiner

COMPOSITIONS AND DEVICES FOR CONTAINING MEDICAL FLUIDS

CROSS REFERENCE TO RELATED APPLICATIONS AND INCORPORATION BY REFERENCE TO ANY PRIORITY APPLICATIONS

The present application claims the benefit of priority to U.S. Provisional Patent Application No. 63/086,918, filed Oct. 2, 2020, the entirety of which is hereby incorporated by reference herein. Any and all applications for which a foreign or domestic priority claim is identified in the Application Data Sheet as filed with the present application are hereby incorporated by reference under 37 CFR 1.57.

FIELD

Disclosed herein are polymer formulations, articles having improved properties comprising such polymer formulations (e.g., medical films, containers, etc.), methods of making such formulations and articles, and methods of using such formulations and articles.

BACKGROUND

Description of the Related Art

Polymers may be used as materials to provide various articles of manufacture. For example, polymers may be used to prepare polymer layers, films, devices comprising polymer layers and/or products comprising films (e.g., fluid bags), or other devices comprising polymer layers (e.g., fittings, tubing, containers, caps, etc.). The physical and material properties of the articles depend, in part, on the polymers and polymer additives used to prepare the materials.

SUMMARY

Several embodiments disclosed herein provide polymer compositions. In several embodiments, the polymer compositions have improved optical, material properties, and/or stability. Articles comprising such polymer compositions are provided, as are methods of making the polymer compositions and articles, and methods of using any one of the foregoing.

Some embodiments pertain to a medical fluid bag (e.g., comprising a polymer composition as disclosed herein). In several embodiments, the film is configured to allow visualization through the film. For example, in several embodiments, a fluid within the medical fluid bag is viewable. In some embodiments, the medical fluid bag comprises a light transmissive film. In several embodiments, the light transmissive film is a transparent film (or substantially transparent) and/or a translucent film. In some embodiments, the film defines an internal area of the fluid bag that is configured to hold a medical fluid. In some embodiments, the film comprises a polymer (e.g., poly(vinyl chloride)) at a concentration in weight percent ranging from 55% to 75% of the film. In some embodiments, the polymer comprises, consists of, or consists essentially of poly(vinyl chloride). In some embodiments, the film comprises an optical enhancer at a concentration in weight percent ranging from 0.001% to 0.10% of the film. In some embodiments, the optical enhancer is an aromatic compound. In some embodiments, the optical enhancer comprises at least two aromatic ring systems. In some embodiments, the aromatic ring systems are in conjugation with one another. In some embodiments, the optical enhancer converts an ultraviolet wavelength of light into a visible wavelength of light. In some embodiments, the optical enhancer is an optical brightener.

In some embodiments, the film comprises one or more stabilizers that are not optical enhancers. In several embodiments, the one or more stabilizers that are not optical enhancers comprises one or more metal soaps (e.g., metal stearates). In some embodiments, the one or more stabilizers that are not optical enhancers are present within the film at a concentration in weight percent ranging from 0.01% to 1.0% of the film. In some embodiments, the one or more stabilizers that are not optical enhancers comprise, consist of, or consist essentially of metal stearates.

In some embodiments, the yellowness index of the medical fluid bag as indicated by D65/10° is less than 0 after subjecting the medical fluid bag to thermal sterilization. In some embodiments, unexpectedly, the yellowness index of the medical fluid bag decreases after subjecting the medical fluid bag to the thermal sterilization. In some embodiments, the thermal sterilization conditions may include exposing the medical fluid bag to a temperature that is equal to or over 100° C. for a period of time that is equal to or at least 60 minutes. In some embodiments, the thermal sterilization includes exposing the medical fluid bag to a temperature of equal to or greater than 121° C. for a period of time that is equal to or at least 60 minutes. In some embodiments, the thermal sterilization conditions may include sterilization without light and/or in an absence of UV or visible light wavelengths (e.g., in the dark and/or a substantially light free environment).

In some embodiments, the medical fluid bag maintains a negative yellowness index under accelerated aging conditions. In some embodiments, accelerated aging conditions may include a temperature of equal to or at least 60° C. for period of time that is equal to or at least 30 days. In some embodiments, the change in yellowness index after exposure to a temperature of equal to or at least 60° C. for period of time that is equal to or at least 30 days is less than 6.

In several embodiments, the polymer composition (and/or an article comprising the polymer composition) is characterized by improved material properties. In some embodiments, the tensile strength of the film (e.g., a film comprising the polymer composition) is equal to or at least about 3.5 ksi. In some embodiments, the ultimate tensile strain of the film is equal to or at least about 300%. In some embodiments, the moisture permeability is equal to or at least about 1,500 g·mil/m²·d· atm at 90% relative humidity. In some embodiments, the film (e.g., a bag or container comprising the film) has a burst pressure of equal to or greater than 25 psig. In some embodiments, using a 2.5-inch, 24:1 single screw extruder equipped with a barrier screw, a 16-inch coat hanger sheet die set to a die gap of 0.025 inch, and/or a top/middle casting roll distance of about 4 inches, an extruder head pressure during extrusion of the film is equal to or less than 2,800 psig. In some embodiments, a total organic carbon of the film is less than or equal to 8 ppm. In some embodiments, the film has a static heat stability at 172° C. of equal to or at least about 75 minutes. In some embodiments, when exposed to a temperature of equal to or at least about 172° C., the medical fluid bag has a char time of equal to or greater than about 60 minutes.

In some embodiments, the film comprises one or more plasticizers at a concentration in weight percent ranging from 20% to 47.5% of the film. In some embodiments, the one or more plasticizers are present at a concentration in weight percent ranging from 31.25% to 33.5% of the film. In some embodiments, the one or more plasticizers comprises and/or consists of a first plasticizer and a second plasticizer. In some embodiments, the first plasticizer is present at a concentration in weight percent ranging from 20% to 35% of the film. In some embodiments, the first plasticizer is present at a concentration in weight percent ranging from 26.0% to 27.5% of the film. In some embodiments, the first plasticizer is present at a concentration in weight percent of 27.5% of the film. In some embodiments, the first plasticizer is bis(2-diethylhexyl) phthalate (DEHP). In some embodiments, the second plasticizer is present at a concentration in weight percent ranging from 2% to 12.5% of the film. In some embodiments, the second plasticizer is present at a concentration in weight percent ranging from 4.6% to 6.5% of the film. In some embodiments, the second plasticizer is present at a concentration in weight percent ranging from 5.25% to 6.5% of the film. In some embodiments, the second plasticizer is present at a concentration in weight percent of 6.0% of the film. In some embodiments, the second plasticizer is present at a concentration in weight percent of 6.5% of the film. In some embodiments, the second plasticizer is epoxidized linseed oil (ELO).

In some embodiments, the one or more plasticizers comprise, consist of, or consist essentially of a first and second plasticizer. In some embodiments, the first plasticizer comprises, consists of, or consists essentially of DEHP. In some embodiments, the second plasticizer comprises, consists of, or consists essentially of ELO.

In some embodiments, the poly(vinyl chloride) is present at a concentration in weight percent ranging from 62.5% to 70.0% of the film.

In some embodiments, the optical enhancer is present at a concentration in weight percent ranging from 0.005% to 0.015% of the film. In some embodiments, the optical enhancer is present at a concentration in weight percent ranging from 0.0075% to 0.011% of the film. In some embodiments, the optical enhancer is 2,5-bis(5-t-butyl-2-benzoxazolyl) thiophene. In some embodiments, the optical enhancer comprises, consists of, or consists essentially of 2,5-bis(5-t-butyl-2-benzoxazolyl) thiophene. In some embodiments, the optical enhancer comprises, consists of, or consists essentially of 1,4-bis(2-benzoxazolyl)naphthalene.

In some embodiments, the one or more metal soaps is present at a concentration in weight percent ranging from 0.01% to 0.1% of the film. In some embodiments, the one or more metal soap stabilizers comprise, consist of, or consist essentially of calcium stearate ($CaSt_2$), zinc stearate ($ZnSt_2$), or both. In some embodiments, the one or more metal soap stabilizers comprise, consist of, or consist essentially of $CaSt_2$ at a concentration in weight percent ranging from 0.05% to 0.07% of the film. In some embodiments, the one or more metal soap stabilizers comprise, consist of, or consist essentially of $ZnSt_2$ at a concentration in weight percent ranging from 0.05% to 0.07% of the film.

In some embodiments, the medical fluid bag further comprises one or more lubricants. In some embodiments, the one or more lubricants comprises, consists of, or consists essentially of N,N'-ethylene bis-stearamide wax. In some embodiments, the one or more lubricants is present at a concentration in weight percent ranging from 0.1% to about 2% of the film.

Some embodiments pertain to a medical fluid bag comprising a light transmissive film. In several embodiments, the film is configured to allow visualization through the film. For example, in several embodiments, a fluid within the medical fluid bag is viewable. In several embodiments, the film does not substantially obscure the view of the contents of the bag (e.g., making it possible to view the contents of the bag in their substantially current state, such as without significant color tinting etc.). In some embodiments, the light transmissive medical fluid bag is transparent (or substantially transparent) or translucent. In some embodiments, the film comprises poly(vinyl chloride) at a concentration in weight percent ranging from 61.0% to 70.0%. In some embodiments, the film comprises DEHP at a concentration in weight percent ranging from 25.0% to 30.0%. In some embodiments, the film comprises ELO at a concentration in weight percent ranging from 3.0% to 10.0%. In some embodiments, the film comprises $CaSt_2$ at a concentration in weight percent ranging from 0.05% to 0.07%. In some embodiments, the transparent film comprises $ZnSt_2$ at a concentration in weight percent ranging from 0.05% to 0.07%. In some embodiments, the film comprises N,N-ethylene bis-stearamide wax at a concentration in weight percent ranging from 0.1% to about 2%. In some embodiments, the film comprises 2,5-bis(5-t-butyl-2-benzoxazolyl) thiophene at a concentration in weight percent ranging from 0.001% to 0.015%. Alternatively or additionally, the film may comprise 1,4-bis(2-benzoxazolyl)naphthalene at a concentration in weight percent ranging from 0.001% to 0.015%.

In some embodiments, the yellowness index of the medical fluid bag as indicated by D65/10° is negative after exposure to thermal sterilization conditions. In some embodiments, the yellowness index of the medical fluid bag as indicated by D65/10° is negative after exposure to accelerated aging conditions that include at a temperature of equal to or at least 60° C. for period of time that is equal to or at least 30 days.

In some embodiments, the DEHP is present at a concentration in weight percent ranging from 26.0% to 27.5%. In some embodiments, the DEHP is present at a concentration in weight percent of 27.5%. In some embodiments, the ELO is present at a concentration in weight percent ranging from 5.25% to 6.5%. In some embodiments, the ELO is present at a concentration in weight percent ranging from 4.6% to 6.5%. In some embodiments, the ELO is present at a concentration in weight percent of 6.0%. In some embodiments, the ELO is present at a concentration in weight percent of 6.5%.

In some embodiments, the 2,5-bis(5-t-butyl-2-benzoxazolyl) thiophene is present at a concentration in weight percent ranging from 0.005% to 0.015% of the film.

Some embodiments provide a polymer layer (e.g., a film). In some embodiments, the polymer layer comprises poly (vinyl chloride) at a concentration in weight percent ranging from 55% to 75%. In some embodiments, the polymer layer comprises one or more plasticizers at a concentration in weight percent ranging from 20% to 47.5%. In some embodiments, the polymer layer comprises one or more stabilizers that are not optical enhancers (e.g., metal soap stabilizers) at a concentration in weight percent ranging from 0.01% to 1.0%. In some embodiments, the polymer layer comprises an optical enhancer at a concentration in weight percent ranging from 0.001% to 0.10%. In some embodiments, the optical enhancer is compound comprising one or more aromatic ring systems that converts a portion of ultraviolet light into a visible wavelength of light. In some embodiments, the yellowness index of the medical fluid bag as indicated by D65/10° is negative after subjecting the medical fluid bag to thermal sterilization conditions.

Some embodiments provide a fluid bag (e.g., a medical fluid bag). In some embodiments, the fluid bag comprises a light transmissive film providing an internal area, the internal area being configured to hold a medical fluid. In several embodiments, the film is configured to allow visualization through the film. For example, in several embodiments, a fluid within the fluid bag is viewable. In several embodiments, the light transmissive film is a transparent film (or substantially transparent) and/or a translucent film. In some embodiments, the film comprises a base polymer at a concentration in weight percent ranging from 55% to 75% of the film. In some embodiments, the film comprises one or more plasticizers at a concentration in weight percent ranging from 20% to 47.5% of the film. In some embodiments, the film comprises one or more stabilizers that are not optical enhancers (e.g., metal soap stabilizers) at a concentration in weight percent ranging from 0.01% to 1.0% of the film. In some embodiments, the film comprises an optical enhancer at a concentration in weight percent ranging from 0.001% to 0.10% of the film. In some embodiments, the optical enhancer comprises one or more aromatic ring systems and converts an ultraviolet wavelength of light into a visible wavelength of light. In some embodiments, the yellowness index of the medical fluid bag as indicated by D65/10° is less than 0 after subjecting the medical fluid bag to thermal sterilization conditions.

Some embodiments provide a polymer layer (e.g., film), comprising a base polymer at a concentration in weight percent ranging from 55% to 75%. In some embodiments, the polymer layer comprises one or more plasticizers at a concentration in weight percent ranging from 20% to 47.5%. In some embodiments, the polymer layer comprises one or more stabilizers that are not optical enhancers (e.g., metal soap stabilizers) at a concentration in weight percent ranging from 0.01% to 1.0%. In some embodiments, the polymer layer comprises an optical enhancer at a concentration in weight percent ranging from 0.001% to 0.10%. In some embodiments, the optical enhancer comprises one or more aromatic ring systems and converts a portion of ultraviolet light into a visible wavelength of light. In some embodiments, the yellowness index of the polymer layer as indicated by D65/10° is less than 0 after subjecting the medical fluid bag to thermal sterilization conditions.

Some embodiments provide an article comprising a polymer composition. In some embodiments, the polymer composition comprises a base polymer at a concentration in weight percent ranging from 55% to 99%. In some embodiments, the polymer composition comprises one or more stabilizers that are not optical enhancers (e.g., metal soap stabilizers) at a concentration in weight percent ranging from 0.01% to 1.0%. In some embodiments, the polymer composition comprises an optical enhancer at a concentration in weight percent ranging from 0.001% to 0.10%. In some embodiments, the optical enhancer comprises one or more aromatic ring systems and converts a portion of ultraviolet light into a visible wavelength of light.

In some embodiments, the yellowness index of the polymer composition as indicated by D65/10° is less than 0 after subjecting the article to thermal sterilization conditions. In some embodiments, the polymer composition of the article comprises one or more plasticizers at a concentration in weight percent ranging from 20% to 47.5%.

Some embodiments provide a method for manufacturing a polymer layer (e.g., a film). In some embodiments, the method comprises mixing a poly(vinyl chloride) resin with an optical enhancer to prepare a polymer blend. In some embodiments, the method comprises heating the polymer blend. In some embodiments, the method comprises extruding the polymer blend and/or molding the polymer blend to provide an extruded polymer or molded article. In some embodiments, the method comprises cooling the extruded polymer blend to provide the polymer layer (e.g., film).

Some embodiments provide a method for packaging and/or storing fluids (e.g., medical fluids). In some embodiments, a container comprising a polymer composition film or layer is provided. In some embodiments, the container comprises at least one port. In some embodiments, a fill tube is attached to the at least one port. In some embodiments, the container is filled with a predetermined volume of a fluid (e.g., a medical fluid). In some embodiments, the container is sealed after filling (e.g., with a cap, radiofrequency heat sealed, etc.).

BRIEF DESCRIPTION OF THE DRAWINGS

FIGS. 1A and 1B each provide target (nominal) and measured ingredient addition amounts for some embodiments disclosed herein, respectively. FIGS. 1A and 1B also provide a control composition (as JV-1 and "Control", respectively) lacking an optical enhancer. FIG. 1C shows data from FIG. 1A and FIG. 1B without the control noted.

FIG. 3A provides yellowness index data for embodiments of films disclosed herein prior to sterilization. FIG. 3B provides yellowness index data for embodiments of films disclosed herein after sterilization. FIG. 3C provides the change in yellowness index data for embodiments of films before and after sterilization.

FIG. 4A provides the change in yellowness index data versus time at 172° C. for embodiments of films disclosed herein. FIG. 4B is a photograph depicting the films of FIG. 4A at various time points. FIG. 4C provides the char time for embodiments of films disclosed herein at 172° C.

FIG. 5A provides data regarding the total organic carbon content for embodiments of films disclosed herein. FIG. 5B provides data regarding the film blocking force for embodiments of films disclosed herein. FIG. 5C provides data regarding the tensile strength for embodiments of films disclosed herein.

FIG. 5D provides data regarding the ultimate tensile strength for embodiments of films disclosed herein. FIG. 5E provides data regarding moisture vapor permeability for embodiments of films disclosed herein.

FIG. 6A reveals that post-sterilized film yellowness (b*) and redness (a*) after aging at 60° C. for 65 days. FIG. 6B provides an area given by product Δa*. Δb* as a function of Mayzo Benetex® optical brightener (OB) content.

DETAILED DESCRIPTION

Figure 1A:
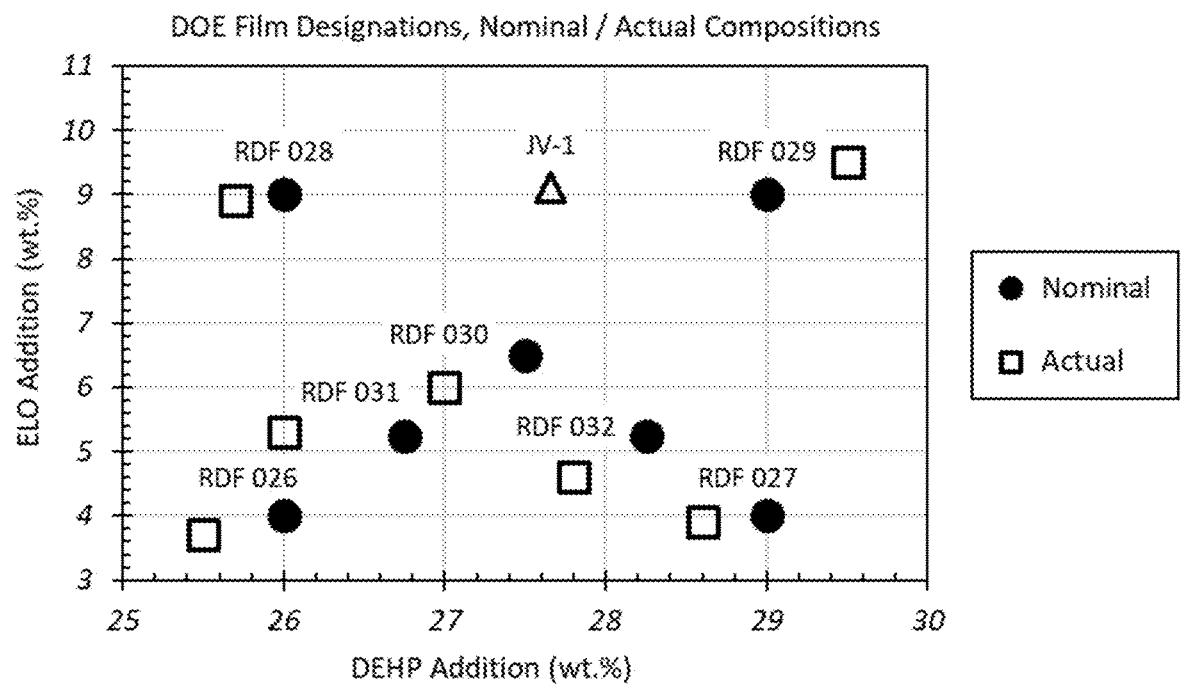
FIGS. 1A-1C provide information regarding the ingredients of various films and the processing parameters.

Some embodiments disclosed herein provide improved polymer compositions and their use in preparing articles (e.g., polymer layers, films, medical articles, such as medical fluid bags, etc.). The polymer compositions include one or more optical enhancing compounds that improve the visual appearance of the articles (e.g., polymer products). In some embodiments, the articles (which may comprise or consist of polymer layers, polymer films, etc.) have improved stability during processing, sterilization, and/or storage. Surprisingly, certain optical enhancing compounds improve one or more of the thermal stability of the articles, the light stability of the layers, and/or provide other benefits. In some embodiments, the improved visual appearance and/or improved stability may be evident by, for example, reduced perceived yellowness (e.g., by the naked eye) and/or a reduced yellowness index. In several embodiments, surprisingly, the yellowness of the polymer compositions actually decreases after heating of the polymer compositions (e.g., during sterilization processes, etc.). The following description provides context and examples, but should not be interpreted to limit the scope of the inventions covered by the claims that follow in this specification or in any other application that claims priority to this specification. No single component or collection of components is essential or indispensable. For example, some embodiments of polymer compositions may not include (or may lack) one or more additives, as disclosed herein. Any feature, structure, component, material, step, or method that is described and/or illustrated in any embodiment in this specification can be used with or instead of any feature, structure, component, material, step, or method that is described and/or illustrated in any other embodiment in this specification.

As used herein, the term "weight percent" (or "weight %," "wt %," etc.) when referring to a component of a composition, is the weight of the component divided by the weight of the composition that includes the component, multiplied by 100%. For example, the weight percent of component A when 5 grams of component A is added to 95 grams of component B is 5% (e.g., 5 g A/(5 g A+95 g B)×100%).

As used herein, when the term "collectively or individually" (and variations thereof) modifies an amount (e.g., a weight percent) of multiple component in a composition, this usage means that each individual component may be provided in the amount disclosed or that combined components may be provided in the amount disclosed. For example, if agents A and B are referred to as, collectively or individually, being present in a composition at a wt % of 5%, that means that A may be at 5 wt % in the composition (individually), B may be at 5 wt % in the composition (individually), or the combination of A and B may be present at a total of 5 wt % (A+B=5 wt %, e.g., collectively). Where A is present at 5 wt %, B may be absent. Where B is present at 5 wt %, A may be absent. Alternatively, where both A and B are present, A may be at 5 wt % (individually) and B may be at 5 wt % (individually), totaling 10 wt %.

When referring to various features, the terms "or ranges including and/or spanning the aforementioned values" may be used. These terms (and variations thereof) are meant to include any range that includes or spans any of the aforementioned values. For example, with regard to the concentration for an ingredient, the wt % of that ingredient may be expressed as "equal to or at least about: 1%, 5%, 10%, 20%, or ranges including and/or spanning the aforementioned values." This language includes not only the particular wt % provided and the range exceeding that value (e.g., equal to or at least about 1%, equal to or at least about 5%, equal to or at least about 10%, and equal to or at least about 20%) but also the wt % ranges for the ingredient spanning those values (e.g., from 1% to 20%, 1% to 10%, 1% to 5%, 5% to 20%, 5% to 10%, and 10% to 20%). Similarly, with regard to the concentration for an ingredient, the wt % of that ingredient may be expressed as "equal to or less than about: 1%, 5%, 10%, 20%, or ranges including and/or spanning the aforementioned values." This language includes not only the particular wt % provided and the range below that value (e.g., equal to or less than about 1%, equal to or less than about 5%, equal to or less than about 10%, and equal to or less than about 20%) but also the wt % ranges for the ingredient spanning those values (e.g., from 1% to 20%, 1% to 10%, 1% to 5%, 5% to 20%, 5% to 10%, and 10% to 20%).

As used herein, "ultraviolet light" or "UV light" is a form of electromagnetic radiation having a wavelength from about 10 nm to about 400 nm. UV light has a wavelength that is shorter than that of visible light but longer than X-rays. As used herein, ultraviolet A (UVA) light has a wavelength from 400 nm to 315 nm, ultraviolet B (UVB) light has a wavelength from 315 nm to 280 nm, ultraviolet C (UVC) light has a wavelength from 280 nm to 100 nm, near ultraviolet light (NUV) has a wavelength from 400 nm to 300 nm, middle ultraviolet light (MUV) has a wavelength from 300 nm to 200 nm, and far ultraviolet light (FUV) has a wavelength from 200 nm to 122 nm.

As used herein, "violet light" is a form of electromagnetic radiation within the visible spectrum and having a wavelength from about 400 nm to about 450 nm.

As used herein, "blue light" is a form of electromagnetic radiation within the visible spectrum and having a wavelength from about 450 nm to about 500 nm.

As used herein, the "blue region" of the visible spectrum is electromagnetic radiation having a wavelength from about 400 nm to about 485 nm.

As used herein, the "visible region" of the light spectrum is electromagnetic radiation having a wavelength from about 400 nm to about 740 nm.

As used herein, "luminescence" is the emission of light from a substance that occurs from electronically excited states of the compounds. Electronic excitation can be a result of electromagnetic radiation absorption (e.g., UV light, visible light, electrons, X-rays, gamma radiation), can occur through molecular collisions (thermal excitation, particle beams, etc.), or can result from energetic chemical reactions (e.g., chemical and biochemical fluorescence). Luminescence includes fluorescence, light emission from singlet excited state, and phosphorescence, or delayed fluorescence, which is light emission from triplet excited states.

As used herein, a "majority" is given its plain and ordinary meaning and refers to an amount that is greater than 50% of a total. A majority may include an amount that is greater than: 50%, 60%, 70%, 80%, 90%, 99%, 100%, or ranges including and/or spanning the aforementioned values. A majority may include an amount that is equal to: 51%, 60%, 70%, 80%, 90%, 99%, 100%, other values over 50%, or ranges including and/or spanning the aforementioned values.

As used herein, "yellowness index" is a number calculated from spectrophotometric data that describes the change in color of a test sample from clear or white to yellow.

Whenever a group is described as being "optionally substituted" that group may be unsubstituted or substituted with one or more of the indicated substituents. Likewise, when a group is described as being "unsubstituted or substituted" (or "substituted or unsubstituted") if substituted, the substituent(s) may be selected from one or more the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, aryl, heteroaryl, heterocyclyl, hydroxy, alkoxy, acyl, cyano, halogen, nitro, sulfenyl, sulfonyl, sulfoxyl, haloalkyl, haloalkoxy, an amino, a mono-substituted amine group, and a di-substituted amine group.

As used herein, "$C_a$ to $C_b$" in which "a" and "b" are integers refer to the number of carbon atoms in a group. The indicated group can contain from "a" to "b", inclusive, carbon atoms. Thus, for example, a "$C_1$ to $C_4$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—. If no "a" and "b" are designated, the broadest range described in these definitions is to be assumed.

As used herein, the term "alkyl" refers to a fully saturated aliphatic hydrocarbon group. The alkyl moiety may be branched or straight chain. Examples of branched alkyl groups include, but are not limited to, iso-propyl, sec-butyl, t-butyl and the like. Examples of straight chain alkyl groups include, but are not limited to, methyl, ethyl, n-propyl, n-butyl, n-pentyl, n-hexyl, n-heptyl and the like. The alkyl group may have 1 to 30 carbon atoms (whenever it appears herein, a numerical range such as "1 to 30" refers to each integer in the given range; e.g., "1 to 30 carbon atoms" means that the alkyl group may consist of 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, although the present definition also covers the occurrence of the term "alkyl" where no numerical range is designated). The "alkyl" group may also be a medium size alkyl having 1 to 12 carbon atoms. The "alkyl" group could also be a lower alkyl having 1 to 6 carbon atoms. An alkyl group may be substituted or unsubstituted. By way of example only, "$C_1$-$C_5$ alkyl" indicates that there are one to five carbon atoms in the alkyl chain, i.e., the alkyl chain is selected from methyl, ethyl, n-propyl, isopropyl, n-butyl, isobutyl, tert-butyl, pentyl (branched and straight-chained), etc. Typical alkyl groups include, but are in no way limited to, methyl, ethyl, propyl, isopropyl, butyl, isobutyl, tertiary butyl, pentyl and hexyl.

The term "alkenyl" used herein refers to a monovalent (e.g., a substituent) or bivalent (e.g., connecting to portions of the compound it is within across the double bond) or branched chain radical of from two to twenty carbon atoms containing a carbon double bond(s) including, but not limited to, 1-propenyl, 2-propenyl, 2-methyl-1-propenyl, 1-butenyl, 2-butenyl and the like. An alkenyl group may be unsubstituted or substituted.

The term "alkynyl" used herein refers to a monovalent (e.g., a substituent) or bivalent (e.g., connecting to portions of the compound it is within across the triple bond) straight or branched chain radical of from two to twenty carbon atoms containing a carbon triple bond(s) including, but not limited to, 1-propynyl, 1-butynyl, 2-butynyl and the like. An alkynyl group may be unsubstituted or substituted.

As used herein, "cycloalkyl" refers to a completely saturated (no double or triple bonds) mono- or multi-cyclic (such as bicyclic) hydrocarbon ring system. When composed of two or more rings, the rings may be joined together in a fused, bridged or spiro fashion. Cycloalkyl groups can contain 3 to 30 atoms in the ring(s), 3 to 20 atoms in the ring(s), 3 to 10 atoms in the ring(s), 3 to 8 atoms in the ring(s) or 3 to 6 atoms in the ring(s). A cycloalkyl group may be unsubstituted or substituted. Examples of mono-cycloalkyl groups include, but are in no way limited to, cyclopropyl, cyclobutyl, cyclopentyl, cyclohexyl, cycloheptyl and cyclooctyl. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl and norbornanyl; and examples of spiro cycloalkyl groups include spiro[3.3]heptane and spiro[4.5]decane.

As used herein, "cycloalkenyl" refers to a mono- or multi-cyclic (such as bicyclic) hydrocarbon ring system that contains one or more double bonds in at least one ring; although, if there is more than one, the double bonds cannot form a fully delocalized pi-electron system throughout all the rings (otherwise the group would be "aryl," as defined herein). Cycloalkenyl groups can contain 3 to 10 atoms in the ring(s), 3 to 8 atoms in the ring(s) or 3 to 6 atoms in the ring(s). When composed of two or more rings, the rings may be connected together in a fused, bridged or spiro fashion. A cycloalkenyl group may be unsubstituted or substituted.

As used herein, "aryl" refers to a carbocyclic (all carbon) monocyclic or multicyclic (such as bicyclic) aromatic ring system (including fused ring systems where two carbocyclic rings share a chemical bond) that has a fully delocalized pi-electron system throughout all the rings. The number of carbon atoms in an aryl group can vary. For example, the aryl group can be a $C_6$-$C_{14}$ aryl group, a $C_6$-$C_{10}$ aryl group or a $C_6$ aryl group. Examples of aryl groups include, but are not limited to, benzene, naphthalene and azulene. An aryl group may be substituted or unsubstituted. As used herein, "heteroaryl" refers to a monocyclic or multicyclic (such as bicyclic) aromatic ring system (a ring system with fully delocalized pi-electron system) that contain(s) one or more heteroatoms (for example, 1, 2 or 3 heteroatoms), that is, an element other than carbon, including but not limited to, nitrogen, oxygen and sulfur. The number of atoms in the ring(s) of a heteroaryl group can vary. For example, the heteroaryl group can contain 4 to 14 atoms in the ring(s), 5 to 10 atoms in the ring(s) or 5 to 6 atoms in the ring(s), such as nine carbon atoms and one heteroatom; eight carbon atoms and two heteroatoms; seven carbon atoms and three heteroatoms; eight carbon atoms and one heteroatom; seven carbon atoms and two heteroatoms; six carbon atoms and three heteroatoms; five carbon atoms and four heteroatoms; five carbon atoms and one heteroatom; four carbon atoms and two heteroatoms; three carbon atoms and three heteroatoms; four carbon atoms and one heteroatom; three carbon atoms and two heteroatoms; or two carbon atoms and three heteroatoms. Furthermore, the term "heteroaryl" includes fused ring systems where two rings, such as at least one aryl ring and at least one heteroaryl ring or at least two heteroaryl rings, share at least one chemical bond. Examples of heteroaryl rings include, but are not limited to, furan, furazan, thiophene, benzothiophene, phthalazine, pyrrole, oxazole, benzoxazole, 1,2,3-oxadiazole, 1,2,4-oxadiazole, thiazole, 1,2,3-thiadiazole, 1,2,4-thiadiazole, benzothiazole, imidazole, benzimidazole, indole, indazole, pyrazole, benzopyrazole, isoxazole, benzoisoxazole, isothiazole, triazole, benzotriazole, thiadiazole, tetrazole, pyridine, pyridazine, pyrimidine, pyrazine, purine, pteridine, quinoline, isoquinoline, quinazoline, quinoxaline, cinnoline and triazine. A heteroaryl group may be substituted or unsubstituted.

As used herein, "heterocyclyl" refers to three-, four-, five-, six-, seven-, eight-, nine-, ten-, up to 18-membered monocyclic, bicyclic and tricyclic ring system wherein carbon atoms together with from 1 to 5 heteroatoms constitute said ring system. A heterocycle may optionally contain one or more unsaturated bonds situated in such a way, however, that a fully delocalized pi-electron system does not occur throughout all the rings. The heteroatom(s) is an element other than carbon including, but not limited to, oxygen, sulfur and nitrogen.

As used herein, the term "hydroxy" refers to a —OH group.

As used herein, "alkoxy" refers to the Formula —OR wherein R is an alkyl, an alkenyl, an alkynyl, a cycloalkyl, a cycloalkenyl, aryl, heteroaryl, or heterocyclyl is as defined herein. A non-limiting list of alkoxys are methoxy, ethoxy, n-propoxy, 1-methylethoxy (isopropoxy), n-butoxy, iso-butoxy, sec-butoxy, tert-butoxy, and phenoxy. An alkoxy may be substituted or unsubstituted.

As used herein, "acyl" refers to a hydrogen, alkyl, alkenyl, alkynyl, aryl, heteroaryl, and heterocyclyl connected, as substituents, via a carbonyl group. Examples include formyl, acetyl, propanoyl, benzoyl and acryl. An acyl may be substituted or unsubstituted.

As used herein, a "cyano" group refers to a "—CN" group.

The term "halogen atom" or "halogen" as used herein, means any one of the radio-stable atoms of column 7 of the Periodic Table of the Elements, such as, fluorine, chlorine, bromine and iodine.

A "nitro" group refers to an "—$NO_2$" group.

A "sulfenyl" group refers to an "—SR" group in which R can be hydrogen, an alkyl, an alkenyl, an alkynyl, a cycloalkyl, a cycloalkenyl, aryl, heteroaryl, or heterocyclyl. A sulfenyl may be substituted or unsubstituted.

A "sulfonyl" group refers to an "$SO_2R$" group in which R can be the same as defined with respect to sulfenyl. A sulfonyl may be substituted or unsubstituted.

A "sulfoxyl" group refers to an "$SO_2OH$" group.

As used herein, "haloalkyl" refers to an alkyl group in which one or more of the hydrogen atoms are replaced by a halogen (e.g., mono-haloalkyl, di-haloalkyl, tri-haloalkyl and polyhaloalkyl). Such groups include but are not limited to, chloromethyl, fluoromethyl, difluoromethyl, trifluoromethyl, 1-chloro-2-fluoromethyl, 2-fluoroisobutyl and pentafluoroethyl. A haloalkyl may be substituted or unsubstituted.

As used herein, "haloalkoxy" refers to an alkoxy group in which one or more of the hydrogen atoms are replaced by a halogen (e.g., mono-haloalkoxy, di-haloalkoxy and tri-haloalkoxy). Such groups include but are not limited to, chloromethoxy, fluoromethoxy, difluoromethoxy, trifluoromethoxy, 1-chloro-2-fluoromethoxy and 2-fluoroisobutoxy. A haloalkoxy may be substituted or unsubstituted.

The terms "amino" and "unsubstituted amino" as used herein refer to a —$NH_2$ group.

A "mono-substituted amine" group refers to a "—NHRA" group in which $R_A$ can be an alkyl, an alkenyl, an alkynyl, a cycloalkyl, a cycloalkenyl, aryl, heteroaryl, or heterocyclyl, as defined herein. The $R_A$ may be substituted or unsubstituted. A mono-substituted amine group can include, for example, a mono-alkylamine group, a mono-$C_1$-$C_6$ alkylamine group, a mono-arylamine group, a mono-$C_6$-$C_{10}$ arylamine group and the like. Examples of mono-substituted amine groups include, but are not limited to, —NH(methyl), —NH(phenyl) and the like.

A "di-substituted amine" group refers to a "—$NR_AR_B$" group in which $R_A$ and $R_B$ can be independently an alkyl, an alkenyl, an alkynyl, a cycloalkyl, a cycloalkenyl, aryl, heteroaryl, or heterocyclyl, as defined herein. $R_A$ and $R_B$ can independently be substituted or unsubstituted. A di-substituted amine group can include, for example, a di-alkylamine group, a di-$C_1$-$C_6$ alkylamine group, a di-arylamine group, a di-$C_6$-$C_{10}$ arylamine group and the like. Examples of di-substituted amine groups include, but are not limited to, —$N(methyl)_2$, —N(phenyl)(methyl), —N(ethyl)(methyl) and the like.

Introduction

Polymer formulations can be used to prepare various articles of manufacture, including but not limited to layers, sheets, films, portions of devices, devices themselves, and/or other polymeric objects. Depending on the components within the composition, during manufacture, a polymer formulation may be extruded or molded. The resultant articles may be rigid (e.g., containers, bottles, syringes, connectors, inlets, and valves, etc.) or flexible (e.g., fluid bags, tubing, etc.). These resultant articles find use in a wide variety of applications, including use by everyday consumers, doctors, nurses, patients, and others. For example, articles may be used by consumers as water bottles, soda bottles, as drink or food containers (cups, cartons for food storage and reheating, etc.), and/or as other containers. Polymeric articles also find widespread use in the medical industry including as flexible containers and tubing for storing, transferring, distributing medical solutions (e.g., parenteral solutions such as intravenous solutions, dialysis solutions, drugs and medications, nutrition products, respiratory therapy products, blood, plasma, and other blood related products), in connectors and valves for intravenous or catheter-based delivery of fluids, as syringes, or otherwise.

Despite their widespread use, many challenges exist in providing polymer formulations that are suitable for a given application. There are numerous competing interests in the preparation of polymer formulations, many of which are at odds with each other, making choices of formulation constituents quite complicated. For instance, polymer formulations often include one or more polymers or copolymers and various other additives, such as plasticizers and lubricants. These additives aid in processing and manufacturing and/or help provide desired physical and material attributes to resultant articles of manufacture. To illustrate, some additives may help make an article sufficiently strong, allowing its transport without breakage, or leakage. Other additives may make an article more flexible, allowing its manipulation without cracking or contamination and easy distribution (e.g., allowing fluids inside a medical fluid bag to drain and collapse without creating vacuum in the head space). It is often desirable for a polymer formulation to be easily processed, so it is readily constructed into a finished product without damage and undue wear to production machinery. Factors such as production rates, material stabilization, particulate generation, are each considerations in determining the viability of a polymer composition for manufacture. Each of these aspects is intimately related to the additives and particular components of a polymer composition.

At the same time, because polymeric articles, such as medical fluid bags and drinking bottles, often contain items that will actually be introduced into a user or a patient (either by ingestion, injection, infusion, or other avenues), it is important for these articles to be free of or substantially free of extractables. If a polymer formulation includes leachable components (e.g., chemical additives, short polymer chains, degradable components, etc.), those components may find their way into the contained item (e.g., the consumable) and eventually the user or patient. Such components may be toxic and are a matter of concern. This issue is especially problematic in the medical product area (e.g., medical fluid bags), where consumables may be directly introduced into the circulatory system of a user. This concern is also relevant to articles outside the medical area, such as food containers (e.g., for beverages, etc.) where the contained consumable may be ingested.

Still other characteristics that are desirable or necessary for particular fields give rise to additional problems. For the medical field, for example, it may be desirable and/or necessary for an article to be sterilized and to maintain the consumable in a sterile environment until it is distributed. It also is advantageous (and often necessary), for a container to be clear, substantially clear, colorless, and/or substantially colorless to allow visualization and/or visual inspection of the consumable within (which may indicate to a user if the consumable has degraded or otherwise become unsuitable for use). However, thermal sterilization may cause degradation, hazing, and/or discoloration of the article obscuring or tainting the view of the consumable inside (e.g., by making the consumable appear colored, or otherwise degraded). Discoloration (manifested as yellowing) is not acceptable to patients and/or medical personnel. Alternatively, sterilization by radiation also causes adverse effects, such as deterioration, discoloration, and haziness (e.g., when subsequently exposed to water), and increased production of extractables. These concerns are may be applicable to fields outside the medical field. For instance, food products are often sterilized during production and then stored for periods of time in fluctuating environments.

Poly(vinyl chloride) ("PVC") is illustrative of the challenges encountered in developing polymer compositions. PVC is used often in the fabrication of polymer articles that contact materials that are administered to subjects. As a polymer additive in a polymer formulation, PVC has many desirable qualities. In the medical industry, for example, PVC is widely used in numerous applications including intravenous and drug delivery containers, dialysis containers, blood bags, solution administration sets, tubing and other molded articles. Various plasticizers, stabilizers and other additives have been relied upon in the processing and utilization of PVC for these medical uses but at the acceptance of some other potentially adverse properties. PVC's acknowledged weakness is thermal instability and instability to radiation during processing and use, resulting in dehydrochlorination and conjugated unsaturation, and leading to increasing discoloration as the length of the conjugation increases. Thermal degradation has been delayed by the adding of a combination of certain selected stabilizers. However, the addition of too much stabilizer leads to leaching and the addition of too little stabilizer leads to unacceptable visual and/or optical properties of PVC films.

Some embodiments disclose herein solve one or more of these problems or others. In some embodiments, provided herein are polymer compositions with optical enhancers and articles made therefrom (e.g., polymer layers, films, devices, etc.) that offer unexpected desirable optical properties (e.g., avoiding, impeding, and/or lowering the amount of discoloration, yellowing, blushing, and/or hazing) even after exposure to heat. In several embodiments, these desirable optical properties are achieved while maintaining desirable material and processing properties. A variety of polymer compositions are described below to illustrate various examples that may be employed to achieve one or more desired improvements. These examples are only illustrative and not intended in any way to restrict the general inventions presented and the various aspects and features of these inventions. Furthermore, the phraseology and terminology used herein is for the purpose of description and should not be regarded as limiting. Additionally, while several embodiments are described in reference to polymer formulations and/or polymer materials, any properties of such compositions and/or materials are also applicable to articles (e.g., medical products, containers, etc.) that include such formulations or materials.

Polymer Compositions

As disclosed elsewhere herein, some embodiments pertain to polymer compositions having various components (e.g., ingredients). These components may include one or more polymers, such as, a base polymer or base polymers and one or more optical enhancing compounds. It has been found that, surprisingly, certain optical enhancers provide polymer compositions with improved properties, such as increased stability (including thermal stability), improved resistance to degradation during processing and use, better visual appearance during after processing and storage, and/or others. In several variants, the optical enhancer comprises aromatic rings systems in conjugation (e.g., having shared delocalized electrons through a system of connected p orbitals). In several implementations, the optical enhancer is a wavelength conversion additive and/or is a luminescent compound (e.g., a fluorescent or phosphorescent molecule).

In some embodiments, the polymer compositions further comprise other components such as additives. In some embodiments, the additives may include one or more plasticizers, one or more lubricants, one or more stabilizers (e.g., stabilizers that are not optical enhancers as disclosed herein), or combinations of the foregoing. In some embodiments, these additives may confer desired material, optical, and/or processing properties to the polymer composition.

While several embodiments provide polymer compositions comprising one or more base polymers, one or more optical enhancers, one or more plasticizers, one or more lubricants, and one or more stabilizers, other embodiments may lack one or more of these components. For example, some embodiments provide a polymer composition comprising a base polymer, one or more optical enhancers, one or more plasticizers, and one or more lubricants, but lacking one or more stabilizers. Some embodiments provide a polymer composition comprising a base polymer, one or more optical enhancers, one or more lubricants, one or more stabilizers, but lacking one or more plasticizers. Some embodiments provide a polymer composition comprising a base polymer, one or more optical enhancers, one or more lubricants, one or more stabilizers, one or more plasticizers, but lacking one or more lubricants. In some embodiments, the polymer composition may lack any one or more of a plasticizer, a lubricant, and/or a stabilizer.

Optical Enhancers

As noted elsewhere herein, in several embodiments, an optical enhancer is provided in the polymer composition. In several embodiments, the optical enhancer is an aromatic compound and or comprising an aromatic system. In several embodiments, the optical enhancer is a compound comprising a conjugated π-system, wherein the conjugated π-system comprises at least a first aromatic ring and a second aromatic ring, wherein the first and second rings are in conjugation. In some embodiments, the optical enhancer is a luminescent molecule (e.g., a fluorescent molecule, a phosphorescent additive, or mixtures thereof). In several embodiments, the optical enhancer is a wavelength conversion additive (e.g., a fluorescent compound, a luminescent compound, etc.). In several embodiments, the optical enhancer absorbs a wavelength of light outside the visible wavelength (e.g., UV light) and fluoresces within the visible wavelength (e.g., as violet light and/or blue light). In several embodiments, the optical enhancer is an organic fluorophore.

Advantageously, unlike dyes, some optical enhancers disclosed herein offset a yellowish cast from polymer compositions and articles comprising them. Advantageously, some optical enhancers disclosed herein offset and/or prevent (or diminish) a yellowish cast from polymer compositions and articles comprising them. In some embodiments, at the same time, the optical enhancers improve the lightness of the item. For instance, in several embodiments, the optical enhancers have a bluing effect. In several embodiments, their bluing effect is not based on subtracting light from a different area of the visible spectrum (e.g., yellow-green light as for a typical bluing dye), but rather on emitting light in the blue region after it is absorbed primarily from an invisible region (e.g., UV light). In some embodiments, the optical enhancers are virtually colorless compounds which, when present on a substrate, absorb primarily invisible ultraviolet light in the 300-400 nanometer (nm) range and re-emit in the visible violet-to-blue fluorescent light (or luminesce in the violet-to-blue range). It is believed that one mechanism involves the excitation of electrons in the optical enhancer by UV light that raises the electron energy level from the ground state to a higher (excited) electronic state. As the molecule returns to its original (lower) electronic state, it releases energy in the form of fluorescence (in or primarily in the wavelength regions disclosed herein). In several embodiments, when optical enhancers are added to polymer compositions (and/or articles made therefrom), increased light is reflected. In some embodiments, the optical enhancer is not a dye and the ability of such a luminescent optical enhancer both to increase reflectance and impart blue tint separates it from standard dyes.

Certain chemical pigments (e.g., non-luminescent dyes, etc.) may not be soluble with plasticizers and/or may show a tendency to leach and extract into, for example, fluids contained in an article comprising the polymer composition. Some of these pigments also redistribute and/or coalesce in the film during processing (e.g., sterilization, etc.), making them disadvantageous. However, in some embodiments, dyes may be used. For example, a non-migratory blue dye may be used. Ultramarine blue, for example, is a mineral pigment based upon finely ground lapis lazuli and is non-migratory in aqueous solution and is the most color fast of the dyes/pigments. However, a blue dye by itself does not provide the aesthetic appeal of the optical enhancer. In some embodiments, blue pigments and dyes do impart a blue tint to the film that offsets yellowness to some extent. However, when exposed to sterilization, the films with chemical dyes begin to develop a gray shade rather than hold the blue tint as with the optical brightener. In several embodiments, a combination of an optical enhancer with blue dyes and pigments can offset some of these issues or others. For example, Ultramarine Blue with Mayzo Benetex OB may be used. In several embodiments, to avoid film yellowness and redness development after sterilization the optical enhancer content may be greater than about 110 ppm (or at a concentration as otherwise disclosed herein). In several embodiments, as an alternative to or in addition to an optical enhancer, a blue dye may be used. In other embodiments, a dye (e.g., blue, etc.) is not used and an optical enhancer is used in the polymer composition.

As disclosed elsewhere herein, in some embodiments, the optical enhancer luminesces in the blue region. In some embodiments, at least a portion of the light absorbed (and/or a majority of the light absorbed) by the optical enhancer is emitted from the optical enhancer in the blue region (e.g., through fluorescence). In several embodiments, the optical enhancer emits visible light (e.g., through luminescence, fluorescence, etc.) in a light wavelength region that is greater than or equal to about 400 nm and/or less than or equal to about: 420 nm, 440 nm, 450 nm, 470 nm, 480 nm, 485 nm, 500 nm, or ranges including and/or spanning the aforementioned values. In several embodiments, the optical enhancer may also emit light outside the blue region of the visible spectrum, however, a majority of the light emitted by the optical enhancer is emitted in the blue region. For instance, in some embodiments, a majority of the visible light emitted by the optical enhancer (e.g., through fluorescence, luminescence, etc.) is in a wavelength region that is greater than or equal to about 400 nm and/or less than or equal to about: 420 nm, 440 nm, 450 nm, 470 nm, 480 nm, 485 nm, 500 nm, or ranges including and/or spanning the aforementioned values. For example, in several embodiments, the emission spectrum of the optical enhancer is in (and/or a majority of the emission spectrum is in) the wavelength region from about 400 nm to about 500 nm, about 400 nm to 485 nm, and/or 420 nm to about 470 nm. In several embodiments, the optical enhancer emits light in (and/or a majority of the light it emits is in) the visible wavelength region.

In several embodiments, as disclosed elsewhere herein, the light absorbed by the optical enhancer (and/or a majority of the light absorbed by the optical enhancer) has a wavelength that is outside the blue region of the spectrum. In several embodiments, the light the light absorbed by the optical enhancer (and/or a majority of the light absorbed by the optical enhancer) has a wavelength that is outside the visible of the wavelength spectrum. In several embodiments, the light absorbed by the optical enhancer (and/or a majority of the light absorbed by the optical enhancer) is UV light. In several embodiments, some of (and/or a majority of) the light absorbed by the optical enhancer is within the UVA region, the UVB region, the UVC region, the NUV region, the MUV region, the FUV region, and/or combinations thereof. In several embodiments, the light absorbed by the optical enhancer (and/or a majority of the light absorbed by the optical enhancer) is light having a wavelength of equal to or less than about: 320 nm, 340 nm, 350 nm, 360 nm, 370 nm, 380 nm, 400 nm, or ranges including and/or spanning the aforementioned values. For example, in several embodiments, the light absorbed by the optical enhancer (and/or a majority of the light absorbed by the optical enhancer) is light ranging between 320 nm and 380 nm, 340 and 370 nm, 340 nm and 360 nm, between 320 nm and 400 nm, etc.

In some embodiments, the polymer composition comprises a single optical enhancer, while in other embodiments, it may contain a plurality of optical enhancers (e.g., 2, 3, 4, or more). In some embodiments, where a single optical enhancer is used, the weight percent of the optical enhancer in the polymer composition is equal to or less than about: 0.001%, 0.005%, 0.0075%, 0.010%, 0.050%, 0.100%, or ranges including and/or spanning the aforementioned values. In some embodiments, for example, the weight percent of optical enhancer present in the polymer composition ranges from 0.001% to 0.010%, from 0.001% to 0.100%, from 0.005% to 0.010%, from 0.005%, to 0.015%, from 0.001% to 0.05%, from 0.005% to 0.05%, or other ranges as disclosed above. In several embodiments, where a plurality of optical enhancers is used, the optical enhancers, collectively or individually, may be present in the polymer composition at a weight percent of equal to or less than about: 0.001%, 0.005%, 0.0075%, 0.01%, 0.05%, 0.1%, 0.2%, or ranges including and/or spanning the aforementioned values. For example, the weight percent of optical enhancers present in the polymer composition ranges from 0.001% to 0.010%, from 0.001% to 0.200%, from 0.005% to 0.010%, or other ranges as disclosed above. In several embodiments, where a plurality of optical enhancers is used, each may act within its own absorption/emission range. In several embodiments, the optical enhancers are provided in a combination that, in concert, provides a blended emission spectrum to accomplish a specific appearance color and optical performance.

In several embodiments, the concentration of the optical enhancer (or enhancers, collectively or individually) may be expressed as in parts per million (based on weight). In several embodiments, the concentration of the optical enhancer (or enhancers, collectively or individually) present in the polymer composition is equal to or less than about: 1 ppm, 10 ppm, 25 ppm, 50 ppm, 75 ppm, 150 ppm, 200 ppm, 300 ppm, 400 ppm, 500 ppm, or ranges including and/or spanning the aforementioned values (where ppm is mg/kg). In several embodiments, the concentration of the optical enhancer (or enhancers, collectively or individually) present in the polymer composition is equal to or greater than about: 1 ppm, 10 ppm, 25 ppm, 50 ppm, 75 ppm, 150 ppm, 200 ppm, 300 ppm, 400 ppm, 500 ppm, or ranges including and/or spanning the aforementioned values.

In several embodiments, as disclosed elsewhere herein, the optical enhancer is an aromatic compound. In several embodiments, the optical enhancer comprises one or more aromatic ring systems. In some embodiments, the optical enhancer comprises a plurality of aromatic ring systems (e.g., equal to or at least: two ring systems, three ring systems, four ring systems, five systems, six ring systems, or ranges including and/or spanning the aforementioned values). In several embodiments, an aromatic ring system may comprise or consist of an aryl ring(s) or a heteroaryl ring(s). In some embodiments, two or more ring systems of the optical enhancer are in conjugation with one another. In some embodiments, the ring systems of the optical enhancer are in conjugation with one another through an intervening conjugated species (e.g., the ring systems may be connected to one another via an alkenyl group, an alkynyl group, combinations thereof, etc.). In several embodiments, the optical enhancer has a plane of symmetry. In other embodiments, the optical enhancer is not symmetric.

In several embodiments, the ring system of the optical enhancer is or includes a benzoxazoline ring (e.g., a compound comprising at least one benzoxazole motif), shown below.

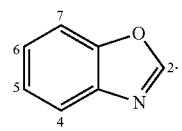

A benzoxazoline may be optionally substituted at any one or more of the 2, 4, 5, 6, or 7 positions (e.g., by replacing a —H with an optional substituent as disclosed elsewhere herein).

The benzoxazoline motif represents only a portion of a larger structure of the optical enhancer. For example, in some embodiments, the optical enhancer is a bis-benzoxazole (a molecule that can be split into two equal portions (e.g., symmetry), each having a benzoxazole motif), such as a bis-benzoxazolyl-thiophene or a bis-benzoxazolyl-stilbene, as shown below:

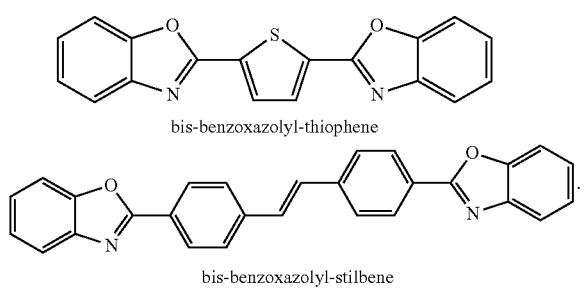

A bis-benzoxazolyl-thiophene comprises three heteroaryl rings in conjugation: a first benzoxazole, a thiophene, and a second benzoxazole. A bis-benzoxazolyl-stilbene comprises two heteroaryl rings, two aryl rings, and a bivalent alkenyl: a first benzoxazole, a first phenyl, the bivalent alkenyl group, a second phenyl, and a second benzoxazole.

In some embodiments, the composition comprises an optionally substituted di-benzoxazole (e.g., having two benzoxazole motifs but not necessarily having two equal portions). In several embodiments, bis-benzoxazoles (e.g., bis-benzoxazolyl-stilbene or a bis-benzoxazolyl-thiophene) or dibenzoxazoles can be optionally substituted (where a C—H bond is optionally replaced by a substituent). In several embodiments, bis-benzoxazoles, bis-benzoxazolyl-stilbenes, and/or bis-benzoxazolyl-thiophenes may be optionally substituted with one or more of $C_1$ to $C_6$ alkyl, $C_1$ to $C_6$ alkenyl, $C_1$ to $C_6$ alkynyl, $C_3$ to $C_6$ cycloalkyl, hydroxy, $C_1$ to $C_6$ alkoxy, cyano, halogen, nitro, and/or $C_1$ to $C_6$ haloalkyl. In several embodiments, the optical enhancer may be selected from 2,2'-(2,5-thiophenediyl)bis(5-tert-butylbenzoxazole) and bis-benzoxazolyl-stilbene, as shown below:

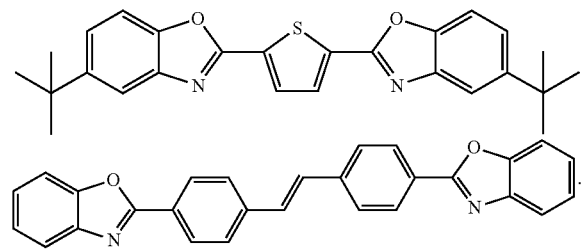

In several embodiments, the optical enhancer may be 1,4-bis(2-benzoxazolyl)naphthalene, as shown below:

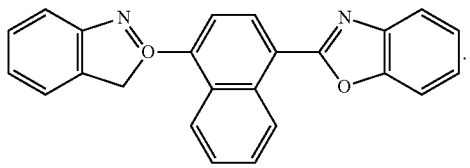

In several embodiments, the benzoxazoline may be represented by Formula 1, shown below:

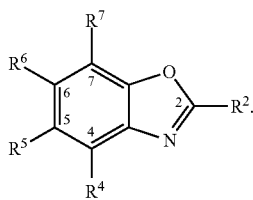

Formula 1

In several embodiments, as indicated elsewhere herein, the benzoxazoline is merely a portion of a larger structure that is the optical enhancer. For instance, a remainder of a larger optical enhancer structure may be functionalized to a benzoxazoline of Formula 1 via the 2 position (as $R^2$) in a benzoxazoline-based optical enhancer. In some embodiments, $R^4$, $R^5$, $R^6$, and/or $R^7$ of the benzoxazoline may be independently —H, $C_1$ to $C_6$ alkyl, $C_1$ to $C_6$ alkenyl, $C_1$ to $C_6$ alkynyl, $C_3$ to $C_6$ cycloalkyl, hydroxy, $C_1$ to $C_6$ alkoxy, cyano, halogen, nitro, and/or $C_1$ to $C_6$ haloalkyl. In some embodiments, when any of $R^4$, $R^5$, $R^6$, and/or $R^7$ is $C_1$ to $C_6$ alkyl, $C_1$ to $C_6$ alkenyl, $C_1$ to $C_6$ alkynyl, $C_3$ to $C_6$ cycloalkyl, $C_1$ to $C_6$ alkoxy, or $C_1$ to $C_6$ haloalkyl, any of these substituents may be optionally substituted with a halogen or hydroxyl. In some embodiments, $R^4$, $R^5$, $R^6$, and/or $R^7$ of the benzoxazoline may be independently —H, $C_1$ to $C_6$ alkyl, or halogen.

In several embodiments, as disclosed elsewhere herein, the benzoxazoline-based optical enhancer may be a bis-benzoxazoline (having two equal portions) or may be a di-benzoxazoline (e.g., a structure having two benzoxazoline groups but not necessarily two equal portions). In several embodiments, a bis-benzoxazoline or di-benzoxazoline be represented by the Formula 1 where $R^2$ is represented by Formula 2:

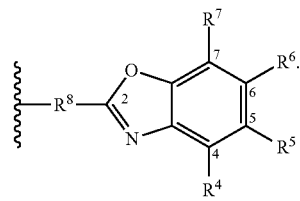

Formula 2

In several embodiments, $R^8$ provides a group that provides a conjugated path from the first benzoxazoline (of Formula 1) to the second benzoxazoline (of Formula 2). In several embodiments, $R^8$ comprises one or more optionally substituted $C_6$-$C_{10}$ aryl groups, one or more optionally substituted heteroaryl having 5 to 10 ring members having 1 to 3 heteroatoms, an alkenyl, an alkynyl, or combinations thereof. In some embodiments, the aryl or heteroaryl is connected to the first and/or the second benzoxazoline rings via one or more $C_1$ to $C_6$ alkylene groups. In some embodiments, where more than one aryl or heteroaryl are provided, an alkylene may bridge the one or more aryl or heteroaryl rings. In some embodiments, $R^8$ comprises a thiophene. In some embodiments, $R^8$ comprises two $C_6$ aryl structures. In some embodiments, $R^8$ is may be any of the following:

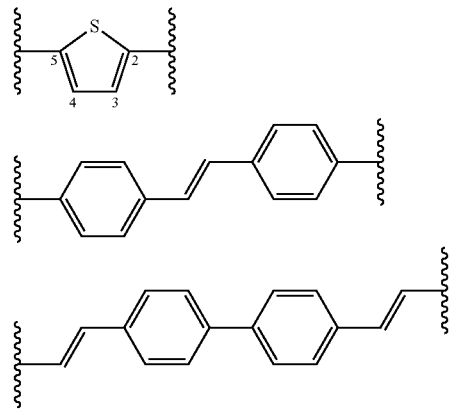

where any —H at a C—H position may be replaced by an optional substitution. In some embodiments, the optional substitution (replacing the H in C—H) is optionally substituted $C_1$ to $C_6$ alkyl, $C_1$ to $C_6$ haloalkyl, halogen, and/or hydroxyl. In some embodiments, where substituted with $C_1$ to $C_6$ alkyl, the $C_1$ to $C_6$ alkyl is optionally substituted with halogen or hydroxyl.

In several embodiments, $R^4$, $R^5$, $R^6$, and $R^7$ for Formula 2 are as disclosed elsewhere herein. In some embodiments, where the structure is a bis-benzoxazoline, each instance of $R^4$ of Formula 1 and 2 is the same, each instance of $R^5$ of Formula 1 and 2 is the same, each instance of $R^6$ of Formula 1 and 2 is the same, and each instance of $R^7$ of Formula 1 and 2 is the same. Where the optical enhancer is not a bis-benzoxazoline (e.g., where it lacks two identical portions) and/or is asymmetric, each instance of $R^4$ may be different (e.g., the instance of $R^4$ from Formula 1 may be different from the instance from Formula 2), each instance of $R^5$ may be different, each instance of $R^6$ may be different, and each instance of $R^7$ may be different. To illustrate, an optical enhancer is not a di-benzoxazoline but not a bis-benzoxazoline may have each instance of $R^4$ be the same, each instance of $R^5$ be the same, each instance of $R^6$ be the same, and each instance of $R^7$ be different. In some embodiments, the optical enhancer lacks a benzoxazoline.

In some embodiments, the optical enhancer is a biphenyl having a core comprising the Formula 3:

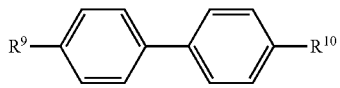

Formula 3 where $R^9$ and $R^{10}$ independently comprise one or more optionally substituted $C_6$-$C_{10}$ aryl groups, one or more optionally substituted heteroaryl having 5 to 10 ring members having 1 to 3 heteroatoms, or combinations thereof. In some embodiments, $R^9$ and $R^{10}$ further comprise alkenyl group that provides a conjugation path between the $C_6$-$C_{10}$ aryl or heteroaryl (or combination thereof) and biphenyl core of Formula 3.

In some embodiments, any —H of a C—H of the biphenyl core of Formula 3 may be independently replaced by an optional substituent selected from $C_1$ to $C_6$ alkyl, $C_1$ to $C_6$ haloalkyl, halogen, and/or hydroxyl. In several embodiments, $R^9$ and $R^{10}$ are independently optionally substituted $C_6$ aryl. In some embodiments, $R^9$ and $R^{10}$ are independently optionally substituted with $C_1$ to $C_6$ alkyl, $C_1$ to $C_6$ alkoxy, $C_1$ to $C_6$ haloalkyl, halogen, hydroxyl, sulfenyl, and/or sulfoxyl. In some embodiments, Formula 3 is a bis(styryl) biphenyl. In some embodiments, Formula 3 is represented by one of the following structures (4,4'-bis (2-sulfostyryl)-biphenyl disodium salt, 4,4'-bis (2-methoxystyryl)-1,1'-biphenyl):

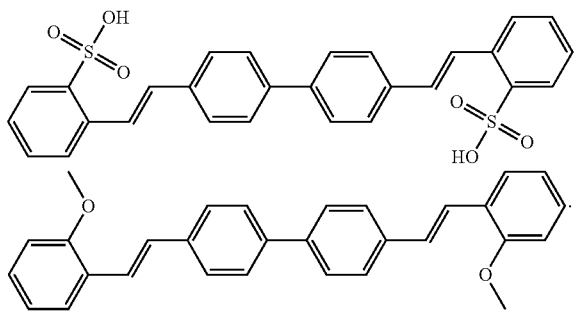

In several embodiments, the optical enhancer is selected from benzotriazole-phenylcoumarins, naphtotriazole-phenylcoumarins, and/or triazinephenylcoumarins. In some embodiments, the optical enhancer is selected from the group consisting of tinopal SFP (also known as 2,2'-(1,2-Ethenediyl)bis[5-[[4-(diethylamino)-6-[(2,5-disulfophenyl)amino]-1,3,5-triazin-2-yl]amino]benzenesulfonic acid] hexasodium salt, hexasodium 2,2'-[vinylenebis[(3-sulfonato-4,1-phenylene)imino[6-(diethylamino)-1,3,5-triazine-4,2-diyl]imino]]bis [benzene-1,4-disulfonate], etc.) and tinopal MSP (also known as 2,2'-(1,2-Ethenediyl)bis[5-[[4-(diethylamino)-6-[(2,5-disulfophenyl)amino]-1,3,5-triazin-2-yl]amino]benzenesulfonic acid] hexasodium salt, hexasodium 2,2'-[vinylenebis[(3-sulfonato-4,1-phenylene)imino[6-(diethylamino)-1,3,5-triazine-4,2-diyl]imino]]bis [benzene-1,4-disulfonate], etc.), both shown below. In several embodiments, other fluorescent compounds may be used as optical enhancers, including but not limited to fluorescent acridines (e.g., acridine orange, proflavine, N-(3-sulfopropyl)acridinium, etc.), fluorescent amino acids (phenylalanine, tryptophan, tyrosine, etc.), fluorescent aromatic hydrocarbons and derivatives (e.g., anthracene, 9-cyanoanthracene, 9,10-diphenylanthracene, naphthalene, 1-anilino-8-naphthalene sulfonate, etc.), 6-propionyl-2-(dimethylaminonaphthalene), perylene, phenanthrene, pyrene, pyranine, p-quaterphenyl, p-terphenyl, etc.), fluorescent arylmethane dyes (e.g., auramine O, etc.), bodipy dyes (e.g., pyrromethene derivatives, 1,3,5,7,8-pentamethylpyrromethene-difluoroborate, disodium-1,3,5,7,8-pentamethylpyrromethene-2,6-disulfonate-difluoroborate, 1,3,5,7,8-pentamethyl-2,6-diethylpyrromethene-difluoroborate, 8-acetoxymethyl-2,6-diethyl-1,3,5,7-tetramethyl pyrromethene fluoroborate, etc.), coumarins (e.g., 4-methyl-7-diethylaminocoumarin, 7-ethylamino-6-methyl-4-methylcoumarin, 7-hydroxy-4-methylcoumarin, 3-(2'-benzothiazolyl)-7-diethylaminocoum-arin, 3-(2'-benzimidazolyl)-7-N,N-diethylaminocoumarin, 2,3,5,6-1H,4H-tetrahydro-8-methylquinolizino-[9,9a,1-gh]-coumarin, 7-amino-4-methylcoumarin, 7-Amino-4-trifluoromethylcoumarin, 7-Dimethylamino-4-trifluoromethylcoumarin, 7-Diethylamino-4-trifluoromethylcoumarin, 2,3,5,6-1H,4H-tetrahydro-8-trifluormethylquinolizino-[9,9a,1-gh]coumarin, 7-Diethylaminocoumarin, 7-Ethylamino-4-trifluormethylcoumarin, etc.), cyanines, oxazines, oxazoles (e.g., 2,5-Bis-(4-biphenylyl)-1,3,4-oxadiazole, 2,5-Bis-(4-biphenylyl)-oxazole, 2-(1-Naphthyl)-5-phenyloxazole, 2-(4-Biphenylyl)-6-phenylbenzoxazole, 1,4-Di[2-(5-phenyloxazolyl)]benzene, 2,5-Diphenyloxazole, etc.), thiazines, xanthene dyes (e.g., eosin Y, erythrosine B, fluorescein disodium salt uranin, dichlorofluorescein disodium salt, tetrachlorotetraiodofluorescein, pyronine Y, pyronine B, rhodamine B, rhodamine 6G, rhodamine 101, rhodamine 110, sulforhodamine, sulforhodamine 101, Tetramethylrhodamine, etc.), quinine sulfate, DAPI, N-methylcarbazole, N-acetyl-L-tryptophanamide, and combinations thereof. In several embodiments, the optical enhancer is selected from POPOP (1,4-bis(5-phenyloxazol-2-yl) benzene), quinine, fluorescein, acridine orange, rhodamine B, Pyridine 1, and combinations of any of the foregoing. In several embodiments, the optical enhancer is selected from solvent blue 97, copper (II) phthalocyanine blue, solvent blue 104, and ultramarine blue.

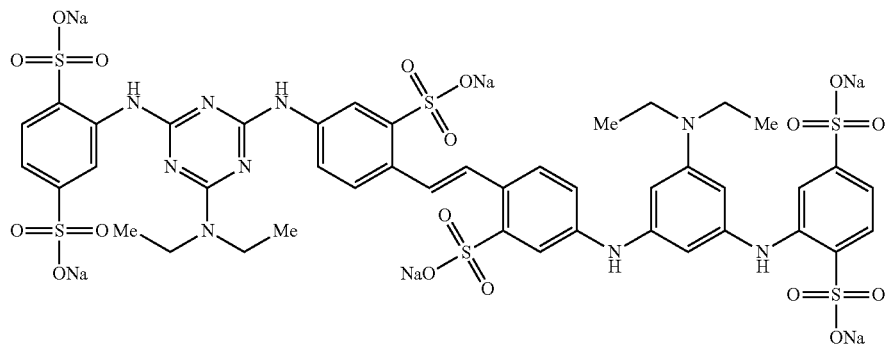

BASF TINOPAL® SFP

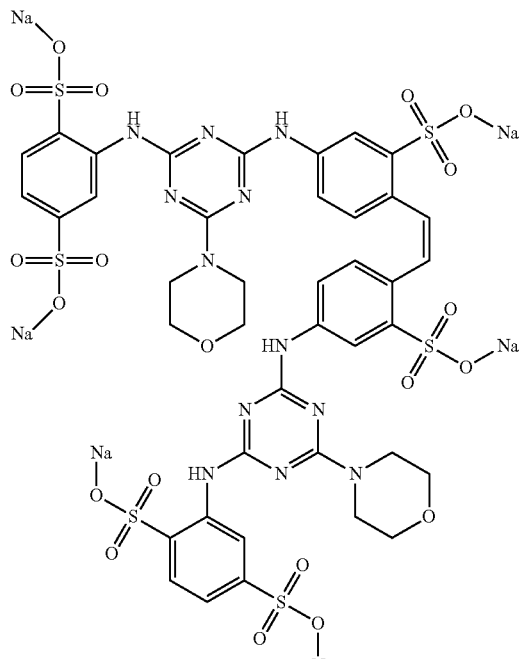

BASF TINOPAL® MSP

In several embodiments, as disclosed elsewhere herein, combinations of optical enhancers may be used. In several embodiments, the optical enhancer is a fluorescent brightening agent, a fluorescent whitening agent, an optical whitener, and/or an optical brightener.

While optical enhancing compounds can be organic (e.g., fluorophores or other compounds as disclosed elsewhere herein), in some embodiments, the optical enhancer is an inorganic compound or a metal-organic compound (e.g., transition metal complexes, metal-organic salts, organometallics, etc.). In several embodiments, fluorescent compounds could be present as side-groups on polymer chains (e.g., polymer additives or the base polymer itself). In several embodiments, any optical enhancer disclosed herein may be provided as a side-group on a polymer chain (e.g., polymer additives or the base polymer itself). It should also be understood that, when referring to the absorption and emission of light for embodiments of the optical enhancers, these measures are intended to be in ambient light environments (e.g., in normal conditions, such as in natural lighting, normal room lighting, etc.).

In several embodiments, the optical enhancers may be selected based on their log Kow value. This value stands for the octanol/water partition coefficient. The octanol/water partition coefficient is the equilibrium ratio or distribution of a given solute's concentrations in n-octanol and water contacted phases. Values for log $K_{ow}$ for most substances in aqueous solutions range from −4 for hydrophilic compounds to +10 for hydrophobic compounds. The test substance is added to N-octanol ("O" in log Kow) and water ("W" in log Kow) to determine the value. In several embodiments, the log Kow for the optical enhancer is equal to or greater than about: 2.5, 4.0, 5.0, 7.5, 10.0, or ranges including and/or spanning the aforementioned values. In several embodiments, the optical enhancers may be selected based on their log Sw value. This value is indicative of the water solubility of a species. Log $K_{ow}$ and log $S_w$ values are commonly used measures in the pharmaceutical industry to characterize a drug substance's bioavailability in vivo and in vitro, respectively. In several embodiments, the log Sw for the optical enhancer is equal to or less than about: −2.5, −5, −7.5, −10.0, or ranges including and/or spanning the aforementioned values. For example, 2-bis (5-methyl-2-benzoxazole) ethylene (Fluorescent Brightener 367) has a threshold for log $K_{ow}$ of equal to or greater than 5 and a log $S_w$ of less than or equal to about −5.

Base Polymers

As disclosed elsewhere herein, the polymer composition comprises at least one base polymer. In several embodiments, a base polymer (or base polymers) of the polymer composition is selected based on its bulk material properties. In some embodiments, a base polymer may be the most abundant polymer component in the polymer composition. In some embodiments, multiple base polymers are used in a particular polymer composition. In other embodiments, a single base polymer is used.

In some embodiments, the base polymer is selected from the group consisting of PVC, polyolefins (e.g., polyethylene and polypropylene, including, low-density polyethylene (LDPE), high-density polyethylene (HDPE), and/or linear low-density polyethylene (LLDPE)), polyethers, ethylene vinyl acetate, copolyester ether, polyethylene terephthalate (PET), engineering plastics (e.g. polyesters, polycarbonate, polyamides and acrylics), thermoplastic polyurethanes, styrene homo- or copolymers, polyacrylates, rubber, polyisoprene, other organic polymers or copolymers, copolymers of the foregoing, and/or combinations of any of the foregoing.

In some embodiments, where a single base polymer is used in a polymer composition, the weight percent of the base polymer in the polymer composition is equal to or less than about: 40%, 50%, 55%, 60%, 61%, 62.5%, 65%, 67.5%, 70.0%, 72.5%, 75%, 80%, 85%, 95%, 99%, or ranges including and/or spanning the aforementioned values. For example, in some embodiments, the base polymer is present in the polymer composition at a weight percent ranging from 40% to 85%, from 55% to 75%, from 61.0% to 70.0%, from 62.5% to 67.5%, or other ranges as disclosed herein.

In several embodiments, where a plurality of base polymers are used to in the polymer composition, the polymers, collectively or individually, may be present in the polymer composition at a weight percent of equal to or at least about: 5%, 10%, 15%, 25%, 40%, 50%, 55%, 60%, 70%, 75%, 80%, 85%, or ranges including and/or spanning the aforementioned values. Thus, for example, in a composition comprising two polymers, both polymers may be present individually at a weight percent of 25% for a collective weight percent of 50%. Alternatively, one polymer may be present at a weight percent of 5% and the other at a weight percent of 80%, for a total weight percent of 85%. In still another embodiment, one polymer may be present at a weight percent of 5% and the other at a weight percent of 85%, for a total weight percent of 90%.

In some embodiments, the base polymer is PVC and/or a copolymer of PVC. In several embodiments, PVC is the only polymer present in the polymer composition. In some embodiments, the PVC is one that is plasticized with citrates. In some embodiments, the weight percent of PVC in the polymer composition is equal to or less than about: 50%, 55%, 60%, 61%, 62.5%, 65%, 67.5%, 70%, 72.5%, 75%, 80%, 85%, or ranges including and/or spanning the aforementioned values. For example, in some embodiments, the PVC is present in the polymer composition at a weight percent ranging from 40% to 85%, from 55% to 75%, from 61.0% to 70.0%, from 62.5% to 67.5%, or other ranges as disclosed herein. In several embodiments, the PVC may be selected based on its molecular weight.

In some embodiments, where used as a base polymer (or as the only polymer) within the polymer composition, the PVC is selected to have a specific molecular weight range. In several embodiments, the PVC has a molecular weight (e.g., a weight average molecular weight (Mw)) of equal to or at least about: 50,000 g/mol, 60,000 g/mol, 65,000 g/mol, 78,000 g/mol, 80,000 g/mol, 101,000 g/mol, 160,000 g/mol, or ranges including and/or spanning the aforementioned values. For example, in some embodiments, for flexible film and tubing, a Mw ranging from 78,000 g/mol and 160,000 g/mol may be used. In several embodiments, as another example, for flexible injection molded parts a Mw ranging from 40,000 g/mol and 101,000 g/mol may be used. As another example, in some embodiments, PVC having a molecular weight (e.g., Mw) between about 50,000 g/mol and 60,000 g/mol is suitable for injection molding and preparing injection molded products. As yet another example, in some embodiments, PVC having a molecular weight (Mw) between about 60,000 g/mol and 80,000 g/mol is suitable for extruded films, tubing, etc. An alternative measure of PVC molecular weight is the Fikentscher K-value, or K-value as it is usually called. The K-value can be calculated using the following equation:

$$ln(\eta/\eta_o)=(cK/1000)(75K/(1.5cK+1000)+1)$$

where $\eta$ is the solvent viscosity, $\eta_o$ is the polymer solution viscosity, c is the polymer solution concentration, and K is the K value with the dimensions of reciprocal concentration. With given values for $\eta$, $\eta_o$, and c, the value of K may be calculated iteratively using an appropriate solution procedure such as successive approximations or Newton's method.

In some embodiments, the PVC is a suspension grade poly(vinyl chloride) resin with a molecular weight of 60≤K≤80. In some embodiments, the PVC is from an Occidental Petroleum Oxyvinyls® 500F PVC resin having a K-value in the range of 70 to 72. In some embodiments, the PVC is a Westlake 2110M which has a K-value of 74. In several embodiments, the PVC has a K value of equal to or at least about: 50, 60, 65, 70, 75, 80, 85, 90, 100, or ranges including and/or spanning the aforementioned values.

In some embodiments, thermoset and thermoplastic polymers can be used as base polymers. In some embodiments, the polymer composition is a thermoplastic or elastic polymer composition. Thermoplastic polymer compositions may be reversibly transformable from a certain temperature range. In some embodiments, the polymer composition is a non-crosslinked polymer or an optionally crosslinkable polymer composition, for example, for the production of elastomers. In several embodiments, linear or crosslinked PVC is used as a base polymer. In several embodiments, PVC with incorporated long-chain branching is used as a base polymer (e.g., an intermediate between linear and crosslinked PVC in rheological behavior).

Plasticizers

In some embodiments, as disclosed elsewhere herein, the polymer composition may further comprise one or more plasticizers. Plasticizers (e.g., dispersants, etc.) are additives that can be employed to increase the plasticity and/or decrease the viscosity of the polymer(s) of the material (though plasticizers need not be used within each polymer composition). In some embodiments, plasticizers alter the physical properties of a polymer within the polymer composition. In some embodiments, a single plasticizer is used while in other embodiments, a plurality of plasticizers (e.g., 2, 3, 4, or more) is used in the polymer composition. In some embodiments, the polymer composition lacks a plasticizer.

In some embodiments, the one or more plasticizers is selected from the group consisting of one or more phthalates (e.g., phthalate esters), one or more epoxidized oils (e.g., epoxidized vegetable oils), one or more nonphthalate plasticizers, one or more adipates, one or more glutarates, one or more azelates, one or more pelargonates, one or more sebecates, one or more ester products of aliphatic dicarboxylic acids and/or alcohols, one or more citrates (e.g., triesters of citric acid), one or more benzoate esters (e.g., esterification products of alcohols and/or diols with benzoic acid), one or more polyesters, one or more chlorinated pariffins, one or more alkyl sulfonic acid esters, one or more phosphates, one or more polymeric plasticizers, and/or combinations thereof. In some embodiments, the one or more plasticizer(s) is selected from the group consisting of bis(2-diethylhexyl) phthalate (DEHP), di(2-ethylhexyl) terephthalate) (DEHT), dibutyl phthalate (DBP), diisononyl phthalate (DINP), diisodecyl phthalate (DIDP), trimellitic acid, tris (2-ethylhexyl) trimellitate (TOTM), butyryltrihexylcitrate (BTHC), cyclohexane-1,2-dicarboxylic acid diisononylester (DINCH), epoxidized soybean oil (ESO), epoxidized linseed oil (ELO), trioctyl phosphate, poly(propylene glycol) esters, and/or combinations of the foregoing.

In several embodiments, the one or more plasticizer(s) includes a bio-based plasticizer (e.g., in addition to or as an alternative to epoxidized oils and triglycerides (ELO, ESO, etc.)). Bio-based plasticizers include but are not limited to virgin and epoxidized vegetable oils, cardanol, castor oil derivatives, vegetable fatty acids and fatty acid esters, acetylated-fatty acid methyl ester-citric acid esters, fatty acid alkanolamides, esterification products of isosorbide and plant-based fatty acids (e.g. Roquette POLYSORB® ID et al.), glycerol, and/or combinations thereof.

In some embodiments, the collective weight percent of plasticizer in the polymer composition (whether the polymer includes a single or multiple plasticizers) is equal to or less than about: 2%, 4.6%, 10%, 15%, 20%, 30%, 47.5%, 50%, 55%, or ranges including and/or spanning the aforementioned values. For example, in some embodiments, where a single plasticizer is used, the weight percent of plasticizer present in the polymer composition may range from 2% to 47.5%, from 20% to 47.5%, from 15% to 55%, from 20% to 55%, or other ranges as disclosed above. Alternatively, in some embodiments, the collective weight percent of plasticizer where multiple plasticizers are present in the polymer composition may range from 2% to 47.5%, 20% to 47.5%, from 15% to 55%, from 20% to 55%, or other ranges as disclosed above.

In several embodiments, where a plurality of plasticizers is used, the plasticizers, collectively or individually, may be present in the polymer composition at a weight percent of equal to or less than about: 2%, 4.6%, 5.25%, 6.0%, 6.5%, 10%, 12.5%, 15%, 20%, 25%, 26%, 27.5%, 31.25%, 33.5%, 35%, 40%, 47.5%, 50%, 55%, or ranges including and/or spanning the aforementioned values. For example, one plasticizer may be provided at a weight percent ranging from 20% to 35%, from 20% to 27.5%, from 26% to 27.5%, or from 26% to 35% (or other ranges as disclosed above) and another plasticizer may be provided at a weight percent ranging from 2% to 12.5%, from 4.6% to 6.5%, from 5.25% to 6.5%, or from 6.0% to 6.5%, (or other ranges as disclosed above).

In some embodiments, the polymer composition comprises at least a first plasticizer and at least a second plasticizer. In some embodiments, the weight percent of the first plasticizer in the polymer composition is equal to or less than about: 15%, 20%, 25%, 26%, 27.5%, 30%, 35%, or ranges including and/or spanning the aforementioned values. For example, the first plasticizer may be provided at a weight percent ranging from 20% to 35%, from 20% to 27.5%, from 26% to 27.5%, from 26% to 35%, etc. In some embodiments, the first plasticizer is a diester formed from an oxo alcohol and an aromatic or aliphatic dianhydride or dicarboxylic acid. In some embodiments, the first plasticizer is a phthalate (e.g., DEHP, DEHT, DBP, DINP, DIDP, etc.). In some embodiments, the first plasticizer is bis(2-diethylhexyl) phthalate (DEHP). In some embodiments, the weight percent of the second plasticizer in the polymer composition is equal to or less than about: 2%, 3%, 4%, 5%, 5.25%, 6.0%, 6.5%, 7%, 7.5%, 8.0%, 10.0%, 12.5%, or ranges including and/or spanning the aforementioned values. For example, the first plasticizer may be provided at a weight percent ranging from 2% to 12.5%, from 5.25% to 6.5%, from 6.0% to 6.5%, etc. In some embodiments, the second plasticizer is an epoxidized vegetable oil (e.g., ESO, ELO, etc.). In some embodiments, the second plasticizer is epoxidized linseed oil (ELO).

In several embodiments, the first and second plasticizers have different mechanisms of action. For instance, the first plasticizer may be a primary plasticizer. The second plasticizer may be a proton scavenger with plasticization activity. In several embodiments, the plasticizers may have different, complementary plasticization activity and compatibility.

Lubricants

In some embodiments, as disclosed elsewhere herein, the polymer composition may further comprise one or more lubricants. Lubricants, as polymer additives, may assist in the internal lubrication for a resin and reduce friction between a polymer melt and a surface. These features may aid in preventing adhesion to mold surfaces, etc. Lubricants may also offer a nonsticky or slippery quality to the surface of a polymer composition. In several embodiments, lubricants can include waxes. In some embodiments, a single lubricant is used while in other embodiments, a plurality of lubricants (e.g., 2, 3, 4, or more) is used in the polymer composition.

In some embodiments, the one or more lubricants is a wax (ethylene-bis-stearamide waxes, such as N,N-ethylene bis-stearamide wax, erucamide waxes, oleamide waxes, montan, carnauba, paraffin, stearic acid, etc.). In some embodiments, the one or more lubricants is selected from the group consisting of N,N-ethylene bis-stearamide wax, cetyl and/or stearyl alcohols, fatty acid esters, polyethylene glycol esters of fatty acids where the fatty acid is C12 or greater, esters of montanic acids with multifunctional alcohols (e.g., Clariant Licowax® E), and/or combinations of the foregoing. In some embodiments, where a single lubricant is used, the lubricant is N,N-ethylene bis-stearamide wax.

In some embodiments, where an individual lubricant is used (e.g., N,N-ethylene bis-stearamide wax), the weight percent of lubricant in the polymer composition may be equal to or less than about: 0.01%, 0.05%, 0.08%, 0.1%, 0.2%, 0.25%, 0.3%, 0.4%, 0.5%, 0.7%, 1.0%, 2.0%, 5.0%, or ranges including and/or spanning the aforementioned values. For example, in some embodiments, where a single lubricant is used, the weight percent of lubricant present in the polymer composition may range from 0.1% to 2%, from 0.2% to 0.3%, from 0.01% to 0.3%, or other ranges as disclosed above.

In several embodiments, where a plurality of lubricants is used, the lubricants, collectively or individually, may be present in the polymer composition at a weight percent of equal to or less than about: 0.01%, 0.1%, 0.2%, 0.25%, 0.3%, 0.4%, 0.5%, 1.0%, 2.0%, 5.0%, or ranges including and/or spanning the aforementioned values. For example, in some embodiments, where two lubricants are used, the weight percent of the first lubricant in the polymer composition may range from 0.1% to 5%, from 0.2% to 1.0%, or from 0.01% to 0.3% (or other ranges as disclosed above) and the weight percent of the second lubricant in the polymer composition may range from 0.5% to 5%, from 0.2% to 2.0%, or from 0.01% to 0.3% (or other ranges as disclosed above).

Stabilizers

In some embodiments, as disclosed elsewhere herein, the polymer composition may further comprise one or more stabilizers. In some embodiments, the one or more stabilizers are not themselves optical enhancers as disclosed elsewhere herein. For example, the stabilizers may not, themselves, improve the optical qualities of the polymer composition and or article they are in. In some embodiments, the stabilizers lack color and/or do not emit wavelengths in the visible wavelength spectrum (e.g., as fluorescent light or as color). In some embodiments, a stabilizer may be an acid scavenger. In some embodiments, the stabilizer is an acid scavenger configured to scavenge acid produced during radiation exposure of a film (e.g., acid created through UV treatment of PVC). In some embodiments, the stabilizer is a metallic soap. In some embodiments, the stabilizer is a metal stearate. In some embodiments, a metal soap is a salt of a metal (e.g., lead, cadmium, barium, calcium, zinc, or combinations thereof) and a fatty acid. In several embodiments, the fatty acid is a short chain, medium chain, or long chain fatty acid. In several embodiments, the fatty acid is a $C_6$ to $C_{21}$ fatty acid (e.g., caprylic acid, capric acid, lauric acid, stearic acid, arachidic acid, etc.). In several embodiments, the stabilizer may be selected from one or more of an organic acid salts (liquid or solid comprising any one or more of barium, calcium, cadmium, and zinc) or $C_8$ to $C_{18}$ straight chain or branched chain aliphatic carboxylic acids. In some embodiments, the salt of the fatty acid is stearate. In several embodiments, a single stabilizer is used while in other embodiments, a plurality of stabilizers (e.g., 2, 3, 4, or more) is used in the polymer composition. In some embodiments, the polymer composition lacks a stabilizer that is not an optical enhancer.

In some embodiments, the collective weight percent of the stabilizer in the polymer composition (whether the polymer composition includes a single or multiple stabilizers) is equal to or less than about: 0.01%, 0.1%, 0.14%, 0.2%, 0.3%, 0.5%, 1.0%, 2.0%, or ranges including and/or spanning the aforementioned values. For example, in some embodiments, the collective weight percent of stabilizer present (whether one or more stabilizers is used) in the polymer composition ranges from 0.1% to 2%, from 0.2% to 0.3%, from 0.01% to 0.3%, from 0.1 to 0.14%, or other ranges as disclosed above.

In several embodiments, where a plurality of stabilizers is used, the stabilizers, collectively or individually, may be present in the polymer composition at a weight percent of equal to or less than about: 0.01%, 0.05%, 0.06%, 0.07%, 0.08%, 0.1%, 0.14%, 0.2%, 0.3%, 0.5%, 1.0%, 2.0%, or ranges including and/or spanning the aforementioned values. For example, in some embodiments, the collective weight percent of stabilizer present in the polymer composition ranges from 0.1% to 2%, from 0.2% to 0.3%, from 0.01% to 0.3%, from 0.1 to 0.14%, or other ranges as disclosed above. For further illustration, in some embodiments, calcium stearate ($CaSt_2$) and zinc stearate ($ZnSt_2$) are used in combination. In such an embodiment, $CaSt_2$ may be provided at a weight percent ranging from 0.01% to 1.0%, from 0.1 to 0.14%, from 0.05% to 0.07% (or other ranges as disclosed above) and $ZnSt_2$ at a weight percent ranging from 0.01% to 1.0%, from 0.1 to 0.14%, from 0.05% to 0.07% (or other ranges as disclosed above).

Polymer Composition Characteristics

As disclosed elsewhere herein, in several embodiments, the disclosed polymer compositions may have enhanced and/or improved properties, including optical properties. For example, the polymer compositions (and/or polymer layers, polymer films, or other articles comprising such polymer compositions) are configured to allow visualization of an item within the article (e.g., container), such as visualization of a fluid in a medical fluid bag. In some embodiments, the article (e.g., a medical fluid bag), the polymer layer, and/or the polymer films are light transmissive. In some embodiments, the article (e.g., a medical fluid bag), the polymer layer, and/or the polymer films are partially transparent, substantially transparent, and/or transparent. In several embodiments, for example, a fluid within the medical fluid bag comprising the film is viewable. In several embodiments, the film does not substantially obscure or distort a product contained within the film (e.g., making it possible to view the product in its substantially current state, such as, without significant color distortion, without significant hazing, etc.). In some embodiments, a light transmissive film is transparent and/or a translucent. In some embodiments, the film is configured to not impart a colored hue to a product behind the film. In some embodiments, the film is configured to not impart a yellow or red hue to a product behind the film (such as a liquid inside a medical fluid bag comprising the film). In several embodiments, using conventional haze measuring techniques, the haze is less than or equal to: 25%, 30%, 35%, 40%, or ranges including and/or spanning the aforementioned values. In several embodiments, a light transmissive film is configured to allow viewing of a material contained within the film (e.g., for accurate visual inspection and/or assessment of the quality of the material therein). In several embodiments, a transparent or partially transparent film is configured to allow viewing of a material contained within the film (e.g., for visual accurate inspection and/or assessment of the quality of the material therein).

Several embodiments provided herein provide polymer compositions with low yellowness indices (as measured by CIE Standard Illuminant D65 with a supplementary 100 observer, or D65/10° as designated hereinafter). As noted elsewhere herein, the yellowing of articles may be unacceptable from an end user standpoint. Yellowing also may block or hinder a medical practitioner's (or other person's) ability to evaluate whether an item within a polymer article has degraded and/or should be rejected or discarded. In several embodiments, the polymer composition (e.g., a polymer layer, film, or other article) has a D65/10° yellowness index that is negative. In several embodiments, the polymer composition (e.g., a polymer layer, film, or other article) has a D65/10° yellowness index that is equal to or less than about: 0, −1.0, −2.5, −5.0, −6.0, −7.0, −8.0, −9.0, −10.0, −12.0, or ranges including and/or spanning the aforementioned values.

Several embodiments provided herein provide polymer compositions with low redness indices (as measured by CIE Standard Illuminant D65 with a supplementary 10° observer, or D65/10° as designated hereinafter). As noted elsewhere herein, the reddening of articles may be unacceptable. Like yellowing, reddening also may block or hinder a medical practitioner's (or other person's) ability to evaluate whether an item within a polymer article has degraded and/or should be rejected or discarded. In several embodiments, the polymer composition (e.g., a polymer layer, film, or other article) has a D65/10° redness index that is negative. In several embodiments, the polymer composition (e.g., a polymer layer, film, or other article) has a D65/10° redness index that is equal to or less than about: 0, −1.0, −2.5, −5.0, −6.0, −7.0, −8.0, −9.0, −10.0, −12.0, or ranges including and/or spanning the aforementioned values.

In several embodiments, the polymer compositions disclosed herein have surprisingly improved stability as indicated in part by yellowness index and/or redness index. For example, in some embodiments, the polymer compositions disclosed herein (and/or polymer layers, polymer films, or other articles comprising such polymer compositions) have a D65/10° yellowness index (and/or redness index) that is less than 0 after subjecting the composition to sterilization conditions (e.g., thermal, UV sterilization, or combinations thereof) and/or to accelerated aging testing. Surprisingly, in several embodiments, the yellowness index (as measured by D65/10°) and/or redness index of the polymer composition disclosed herein actually decreases after exposure to sterilization conditions.

Thermal sterilization includes heating an article (e.g., an article comprising the polymer composition) to a temperature sufficient to kills microbes for a period of time sufficiently long to kill such microbes. In several embodiments, thermal sterilization includes exposing and/or heating a polymer composition (or an article comprising the polymer composition) to a temperature of equal to or at least about: 100° C., 121° C., 140° C., 150° C., 172° C., or ranges including and/or spanning the aforementioned values. In several embodiments, the thermal sterilization (e.g., exposing and/or heating the composition or article to sterilization temperatures) is performed for a time period of equal to or at least about: 10 minutes, 15 minutes, 30 minutes, 60 minutes, or ranges including and/or spanning the aforementioned values. For example, in some embodiments, the polymer composition (or an article comprising the polymer composition) maintains a yellowness index (in D65/10°) that is less than 0 or that decreases after sterilization at a temperature of 100° C. for equal to or at least 10 minutes, equal to or at least 15, equal to or at least 30 minutes, equal to or at least 60 minutes, etc. In some embodiments, the polymer composition (or an article comprising the polymer composition) maintains a yellowness index (in D65/10°) that is less than 0 or that decreases after sterilization at a temperature of 121° C. for equal to or at least 10 minutes, equal to or at least 15, equal to or at least 30 minutes, equal to or at least 60 minutes, etc. In some embodiments, the polymer composition (or an article comprising the polymer composition) maintains a redness index (in D65/10°) that is less than 0 or that decreases after sterilization at a temperature of 100° C. for equal to or at least 10 minutes, equal to or at least 15, equal to or at least 30 minutes, equal to or at least 60 minutes, etc. In some embodiments, the polymer composition (or an article comprising the polymer composition) maintains a redness index (in D65/10°) that is less than 0 or that decreases after sterilization at a temperature of 121° C. for equal to or at least 10 minutes, equal to or at least 15, equal to or at least 30 minutes, equal to or at least 60 minutes, etc. In some embodiments, thermal sterilization can be carried out in a darkened chamber (e.g., one lacking a light source or light exposure from an outside light source). In some embodiments, the thermal sterilization is performed without light and/or in an absence of UV or visible light wavelengths.

In several embodiments, the polymer composition (e.g., a polymer layer, film, or other article) has a D65/10° yellowness index after sterilization that is equal to or less than about: 0, −1.0, −2.5, −5.0, −6.0, −7.0, −8.0, −9.0, or ranges including and/or spanning the aforementioned values. In several embodiments, the D65/10° yellowness index of a polymer composition (e.g., a polymer layer, film, or other article) as disclosed herein decreases after sterilization by equal to or at least about: 0, 0.5, 1.0, 1.5, 2.0, 2.5, or ranges including and/or spanning the aforementioned values. In several embodiments, after sterilization, the D65/10° yellowness index of a polymer composition (e.g., a polymer layer, film, or other article) as disclosed herein changes by equal to or less than about: 0.5, 1.0, 1.5, 2.0, 2.5, or ranges including and/or spanning the aforementioned values.

In several embodiments, the polymer composition (e.g., a polymer layer, film, or other article) has a D65/10° redness index after sterilization that is equal to or less than about: 0, −1.0, −2.5, −5.0, −6.0, −7.0, −8.0, −9.0, or ranges including and/or spanning the aforementioned values. In several embodiments, the D65/10° redness index of a polymer composition (e.g., a polymer layer, film, or other article) as disclosed herein decreases after sterilization by equal to or at least about: 0, 0.5, 1.0, 1.5, 2.0, 2.5, or ranges including and/or spanning the aforementioned values. In several embodiments, after sterilization, the D65/10° redness index of a polymer composition (e.g., a polymer layer, film, or other article) as disclosed herein changes by equal to or less than about: 0.5, 1.0, 1.5, 2.0, 2.5, or ranges including and/or spanning the aforementioned values.

In several embodiments, the polymer compositions as disclosed herein maintain a negative yellowness index (and/or redness index) after exposure to accelerated aging conditions. In several embodiments, accelerated aging conditions include exposing and/or heating a polymer composition (or an article comprising the polymer composition) to a temperature of 60° C. for a time period of equal to or at least about: 10 days, 16 days, 30 days, 52 days, 65 days, or ranges including and/or spanning the aforementioned values. In several embodiments, after exposure to accelerated aging conditions, the D65/10° yellowness index (and/or redness index) of a polymer composition (e.g., a polymer layer, film, or other article) as disclosed herein is equal to or less than about: 0, −0.5, −1.0, −1.5, −2.0, −2.5, or ranges including and/or spanning the aforementioned values. In several embodiments, after exposure to accelerated aging conditions, the D65/10° yellowness index (and/or redness index) of a polymer composition (e.g., a polymer layer, film, or other article) as disclosed herein changes by equal to or less than about: 0.5, 1.0, 1.5, 2.0, 2.5, 5.0, 6.0, 8.0, or ranges including and/or spanning the aforementioned values.

In several embodiments, the yellowness index is measured before or after sterilization. In several embodiments, the sterilization is thermal sterilization. In several embodiments, the yellowness index is measured after sterilization that involves exposing the composition (and/or an article comprising the composition, such as a film or medical fluid bag) to a temperature that is over 100° C. for a period of time that is equal to or at least 60 minutes. In some embodiments, the yellowness index is measured after sterilization that involves exposing the composition (and/or an article comprising the composition, such as a film or medical fluid bag) to a temperature of 121° C. for a period of time that is equal to or at least 60 minutes.

In several embodiments, the redness index is measured before or after sterilization. In several embodiments, the sterilization is thermal sterilization. In several embodiments, the redness index is measured after sterilization that involves exposing the composition (and/or an article comprising the composition, such as a film or medical fluid bag) to a temperature that is over 100° C. for a period of time that is equal to or at least 60 minutes. In some embodiments, the redness index is measured after sterilization that involves exposing the composition (and/or an article comprising the composition, such as a film or medical fluid bag) to a temperature of 121° C. for a period of time that is equal to or at least 60 minutes.

Several embodiments provided herein provide polymer compositions with acceptable and/or low levels of haze. Haze is measured as the percentage of incident light scattered by more than 2.5° through the plastic specimen. There are several factors responsible for light scattering such as: impurities contained in the polymer material, surface roughness and internal optical irregularities caused by crystallization or material's level of crystallinity, inhomogeneities (density difference, fillers, pigments . . . ), and porosity, crystal size structure (crosslinked), mechanical and chemical degradation, etc. Environmental factors such as weathering or surface abrasion may also lead to hazing. In several embodiments, the polymer composition (e.g., a polymer layer, film, or other article) has a haze that is equal to or less than about: 35%, 40%, 45%, 47.5%, 50%, or ranges including and/or spanning the aforementioned values.

In several embodiments, the glass transition temperature (in ° C.) a film of the disclosed compositions is less than or equal to about: −15, −10, −5, 0, 10, 20, 30, 35, or ranges including and/or spanning the aforementioned values.

In several embodiments, the stability of the disclosed polymer compositions may be expressed as a measure of static heat stability. In several embodiments, static heat stability testing may be performed by exposing and/or heating a polymer composition (or an article comprising the polymer composition) to a temperature of equal to or at least about: 140° C., 150° C., 172° C., or ranges including and/or spanning the aforementioned values. In some embodiments, static heat stability testing may be performed by exposing an a polymer composition (or an article comprising the polymer composition) to a temperature of 172° C. until the article chars. The static heat stability is noted as the time required for the article to char. In some embodiments, char time of the polymer composition (e.g., at a temperature of 172° C. or another static heat stability testing temperature, as disclosed elsewhere herein) is equal to or at least about: 50 minutes, 60 minutes, 75 minutes, 90 minutes, 105 minutes, 120 minutes, 140 minutes, 160 minutes, 180 minutes, or ranges including and/or spanning the aforementioned values.

In several embodiments, the polymer compositions disclosed herein have a low content of leachable materials. Total organic carbon (TOC) is a measure of the total amount of carbon in organic compounds in pure water and aqueous systems. TOC has become an important parameter used to monitor overall levels of organic compounds present. TOC can be measured using film samples (or other articles) comprising a polymer composition to be tested. Briefly, samples may be immersed as a 2.5-inch square films in TOC-free water (e.g., 40 mL). These samples are capped and placed into an oven maintained at 82° C. overnight (e.g., for 12 hours). In several embodiments, these samples are capped and placed into an oven maintained at a temperature of equal to or at least 70° C., 80° C., 82° C., 90° C., or 95° C. (or temperature ranges including and/or spanning the aforementioned values) for a period of equal to or at least 10 hours, 12 hours, 15 hours, or 24 hours (or time ranges including and/or spanning the aforementioned values). The samples are removed from the oven and allowed to equilibrate for 24 hours at room temperature until analyzed. In several embodiments, under testing conditions disclosed herein, the TOC of a polymer composition (e.g., a polymer layer, film, or other article) as disclosed herein is equal to or less than about: 0.5 ppm, 1.0 ppm, 1.5 ppm, 2.5 ppm, 5.0 ppm, 8.0 ppm, 10.0 ppm, or ranges including and/or spanning the aforementioned values.

In several embodiments, surprisingly, the addition of an optical enhancer to a polymer film as disclosed herein provides a film that leaches less total organic carbon than a film lacking an optical enhancer. In several embodiments, under the same conditions, when compared to a control lacking the optical enhancer, the TOC of a polymer composition (e.g., a polymer layer, film, or other article) as disclosed herein is reduced by greater than or equal to about: 0.1 ppm, 0.2 ppm, 0.3 ppm, 0.4 ppm, 0.5 ppm, 1.0 ppm, 1.5 ppm, 2.5 ppm, 5.0 ppm, 8.0 ppm, 10.0 ppm, or ranges including and/or spanning the aforementioned values (where ppm is mg/L). As mentioned elsewhere herein, TOC measurements may be performed using standard methods. In several embodiments, samples may be immersed as a 2.5-inch square films in TOC-free water (e.g., 35 mL or 40 mL). In several embodiments, these samples are capped and placed into an oven maintained at 82° C. overnight (e.g., for 12 hours). In several embodiments, these samples are capped and placed into an oven maintained at a temperature of equal to or at least 70° C., 80° C., 82° C., 90° C., or 95° C. (or temperature ranges including and/or spanning the aforementioned values) for a period of equal to or at least 10 hours, 12 hours, 15 hours, or 24 hours (or time ranges including and/or spanning the aforementioned values). In several embodiments, the samples are removed from the oven and allowed to equilibrate for 24 hours at room temperature until analyzed. In several embodiments, samples may be immersed as a 2.5-inch square films in parenteral solution (e.g., 35 mL or 40 mL).

In several embodiments, TOC testing results are normalized to a 1000 mL bag equivalent. In several embodiments, normalization is done by weighing out 1000 mL bags and averaging the weight. The reported TOC equivalent to 1000 mL bag is the [TOC (measured)/gram of film sample then multiplied by the average bag weight]/1000. In several embodiments, the weight of the bag is calculated such that it includes only the wetted surface area for the 1000 mL bag (non-fluid contacting portions are not included, e.g., seams etc.).

In several embodiments, surprisingly, the TOC reduction using an optical enhancer is dependent or related to the amount of optical enhancer present (e.g., the concentration) in the polymer composition. In several embodiments, TOC is reduced and or minimized at a concentration of optical enhancer equal to or at least about: 0.001%, 0.005%, 0.0075%, 0.010%, 0.050%, 0.100%, or ranges including and/or spanning the aforementioned values). In several embodiments, TOC is reduced and or minimized at a concentration of optical enhancer equal to or at least about: 1 ppm, 10 ppm, 25 ppm, 50 ppm, 75 ppm, 150 ppm, 200 ppm, 300 ppm, or ranges including and/or spanning the aforementioned values (where ppm is mg/kg).

As disclosed elsewhere herein, polymer compositions must have sufficient, appropriate, and/or adequate material properties in order to be useful for their designed purpose. Several embodiments provided herein pertain to bags with high tensile strengths, high tensile strain, low moisture permeability, high burst pressures. In some embodiments, a film of a polymer composition as disclosed herein has a tensile strength (in ksi) that is equal to or greater than about: 2.0, 2.5, 3.0, 3.25, 3.5, 4.0, 4.5, 5.0, or ranges including and/or spanning the aforementioned values. In some embodiments, a film of a polymer composition as disclosed herein has a tensile strain that is equal to or greater than about: 250%, 300%, 350%, 400%, 450%, 500%, 550%, or ranges including and/or spanning the aforementioned values. In some embodiments, a film of a polymer composition as disclosed herein has a moisture permeability (in g·mil/m²·d·atm at 90% relative humidity) that is equal to or less than about: 750, 1000, 1250, 1500, 1750, 2000, 2500, or ranges including and/or spanning the aforementioned values. In several embodiments, the moisture permeability (in g·mil/m²·d·atm at 90% relative humidity) is relative to the lowest bound of total plasticizer addition (e.g., which is 26.0 wt. % for a composition comprising 26.0 wt. % DEHP and 4.0 wt. % ELO). In some embodiments, a film of a polymer composition as disclosed herein has a burst pressure (in psig) that is equal to or greater than about: 5, 10, 25, 30, 35, 50, or ranges including and/or spanning the aforementioned values.

In several embodiments, testing conditions disclosed herein may be in accordance with ASTM standards (e.g., D882, D3354, E308, E313, F1249, and F1980-02). In several embodiments, testing of yellowness index is in the CIE XYZ color space and is recorded for a film sample. In some embodiments, yellowness is measured at D65 illumination set for a 100 observer.

As noted elsewhere herein, in some embodiments, a method of manufacture is provided. In some embodiments, a method of making a film is provided. In some embodiments, the method includes mixing a polymer, an optical enhancer, and one or more additives and heating the mixture. In some embodiments, the heated mixture is extruded using an extruder (e.g., a single screw extruder, etc.). In several embodiments, extruder head pressure must be maintained below a certain value in order to allow processing of polymer composition films without damaging manufacturing equipment. In several embodiments, the extruder head pressure during processing of a film of a polymer composition as disclosed herein is less than or equal to: 1,500 psig, 1750 psig, 2000, psig, 2500 psig, 2800 psig, or ranges including and/or spanning the aforementioned values. In several embodiments, the extruder head pressure is measured using a 2.5-inch, 24:1 single screw extruder equipped with a barrier screw, a 16-inch coat hanger sheet die set to a die gap of 0.025 inch, and/or a top/middle casting roll distance of about 4 inches.

In several embodiments, the dynamic thermal stability of the disclosed polymer compositions is improved. In several embodiments, the dynamic heat stability may be expressed using torque rheometry (e.g., Brabender torque rheometry). In several embodiments, testing may be performed by exposing and/or heating a polymer composition melt to a temperature of equal to or at least about: 180° C., 190° C., 200° C., or ranges including and/or spanning the aforementioned values. In several embodiments, the polymer (e.g., PVC) melt is then masticated and sheared between the roller blades in the mixing bowl. In several embodiments, heat stability testing may be performed by exposing an a polymer composition to these conditions until degradation of the polymer composition occurs (e.g., de-chlorination of PVC). The heat stability may be noted as the time required for the article to degrade. In some embodiments, the time to degradation during mixing of the melt for the polymer composition (e.g., at a temperature of 180° C., 190° C., 200° C., or ranges including and/or spanning the aforementioned values) is equal to or at least about: 50 minutes, 60 minutes, 75 minutes, 90 minutes, 105 minutes, 120 minutes, 140 minutes, 160 minutes, 180 minutes, or ranges including and/or spanning the aforementioned values.

Methods of Manufacture and Articles Comprising Polymer Compositions

As disclosed elsewhere herein, several embodiments pertain to methods of preparing polymer compositions as disclosed herein and/or methods of preparing articles comprising such polymer compositions. In certain implementations, the articles comprising such polymer compositions are provided.

In some embodiments, the method of manufacture includes obtaining one or more base polymers (or base polymers). In some embodiments, the base polymer (or base polymers) is a resin (e.g., resin powder, beads, pellets, processed regrind, etc. In some embodiments, the base polymer (or base polymers) is heated to form a flowable fluid (e.g., a viscous liquid) or polymer melt. In some embodiments, the fluid is mixed (e.g., by stirring). In several embodiments, the polymer fluid comprises one or more additives and an optical enhancer. In several implementations, the polymer fluid is shaped into an article (e.g., a three-dimensional form). In some embodiments, the article is prepared from the fluid mixture by a variety of means, such as, injection molding, extrusion, rotational molding, blow molding, thermoforming, or other polymer processing methods. In some embodiments, the polymer may be a thermoset polymer or thermoplastic polymer and the polymer fluid may be processed by thermosetting or thermoplastic shaping techniques, respectively.

In some embodiments, an optical enhancer (or optical enhancers) is mixed with the base polymer (or combination of base polymers) to provide the polymer fluid (e.g., polymer melt). In some embodiments, for example, an optical enhancer is mixed with base polymer resin prior to heating to provide the fluid polymer. In other embodiments, the polymer resin is heated to provide a fluid and the optical enhancer is added thereafter. In some embodiments, the polymer and optical enhancer are mixed until a homogeneous or substantially homogeneous distribution of optical enhancer in the polymer fluid is achieved.

In some embodiments, in addition to the optical enhancer (or optical enhancers), one or more polymer additives (e.g., plasticizers, lubricants, stabilizers, etc.) can be added to provide the polymer fluid. In some embodiments, the one or more additives are before adding the optical enhancer, with the enhancer, after the enhancer has been added, or combinations thereof. For example, some additives may be added prior to the addition of the optical enhancer and others may be added after. In some embodiments, additives are mixed with base polymer resin(s) prior to heating. In some embodiments, additives are added to the polymer after it is heated to a fluid. In some embodiments, the fluid and additives are mixed until a homogeneous or substantially homogeneous distribution is achieved.

In several implementations, upon preparing a polymer composition fluid as disclosed herein, the composition may be shaped to provide an article. The article may be a shaped object with a three-dimensional spatial form. In several embodiments, the melt and/or flowable liquid comprising the polymer, optical enhancer, and additive(s) is molded using a mold. In some embodiments, the mold is removed to afford an article. In several embodiments, the melt and/or flowable liquid comprising the polymer, optical enhancer, and additive(s) is blow molded. The article may be a portion of a final structure (e.g., a side wall of a medical fluid bag). In some embodiments, the melt and/or flowable liquid is extruded (e.g., using an extruder) to provide an article (e.g., a film). In some embodiments, the molded or extruded material is cooled to provide the article.

In several embodiments, the article may be a polymer layer, a film, a fluid bag (e.g., a fluid bag's walls, inlet, outlet, etc.), a container, a connector (e.g., male or female fittings for fluid transfer, etc.), a cap (e.g., for a container), a container (e.g., a bottle, bag, case, etc.), coatings, tubing, syringes (e.g., plungers and barrels), other medical disposables, or portions of any one of the foregoing. In several embodiments, articles may include laminates, coatings, or other extrudable articles. The advantageous characteristics of the polymer compositions disclosed herein can provide articles having an array of benefits for multiple uses.

In some embodiments, the polymer composition is provided as a single layer film or as a multilayer film. Polymer films can include single or multiple polymer layers, some or all of which may be a polymer layer comprising a polymer composition as disclosed herein (e.g., with an optical enhancer). In other words, where a multilayer film is provided, the film may include a single polymer layer with one or more optical enhancers, multiple layers having optical enhancers, or all the layers may comprise optical enhancers as disclosed herein.

In some embodiments, as will be apparent from the disclosure herein, multiple shaped bodies (e.g., an extruded film, a connector, etc.) may be combined to provide final article. For example, an extruded film (or multiple extruded films) may be cut into shapes (e.g., such as a fluid bag wall shapes). The shapes can then be paired and welded at the edges to define a space within a fluid bag (e.g., a medical fluid bag). In some embodiments, fittings (e.g., inlets, outlets, other fittings, and/or valves) could be welded to and/or within the fluid bag walls to provide a completed product (e.g. a medical fluid bag). In some embodiments, the fluid bag is filled (e.g., with a medical fluid), capped, and/or stored. In some embodiments, the fittings are molded articles also comprising then polymer composition.

In some embodiments, the polymer composition may be extruded shapes other than a film. For example, in some embodiments, the polymer composition is extruded to provide tubing. In some embodiments, the tubing could be configured to engage a fitting of a fluid bag to provide a device for dispensing medical fluid. As disclosed elsewhere herein, other shaped articles may be formed by injection molding using a mold. For example, an article (e.g., a cap or a connector) may be provided by injecting the polymer melt into a shaped mold. In some embodiments, upon curing the article is removed from the mold to provide the article. In some embodiments, the polymer composition melt may be blow molded to provide a container (e.g., a beverage bottle) comprising a polymer layer. In some embodiments, caps configured could be combined with the bottle to seal the container (e.g., bottle).

In some embodiments, as disclosed elsewhere herein, the polymeric materials (and the articles made therefrom) have enhanced properties. In several embodiments, the stability of the disclosed polymer compositions and articles made therefrom makes them suitable for use in the medical field. For example, these articles may be readily sterilized without visually discernable (e.g., visually detectable) damage or degradation to the polymer compositions. In several embodiments, the method of manufacture may include a sterilization step (wherein sterilization conditions may include those disclosed elsewhere herein or others). Additionally, the articles may be stored for longer periods of time without damage or degradation to the polymer compositions. These features and others make them especially suitable in applications and for devices used by medical practitioners, patients, and/or consumers.

In some embodiments, as disclosed elsewhere herein, the article is a medical article, including but not limited one or more a medical fluid bag (e.g., i.v. bags, saline bags, bags including one or more medicines, etc.), syringes (e.g., syringe barrels, plungers, etc.), syringe fittings (e.g., syringe filters, plastic portion needle portions), catheters, tubing, drug delivery containers, dialysis containers, blood bags, solution administration sets, and the like.

Some embodiments provide a method for packaging and/or storing fluids (e.g., medical fluids). In some embodiments, a container comprising a polymer composition film is provided. In some embodiments, the container comprises at least one port. In some embodiments, a fill tube is attached to the at least one port. In some embodiments, the container is filled with a predetermined volume of a fluid (e.g., a medical fluid). In some embodiments, the container is stored (e.g., for equal to or at least about 3 months, 6 months, 12 months, 2 years, or longer). In several embodiments, the bag maintains a negative yellowness index during storage.

Methods of Use

Some embodiments pertain to methods of using articles as disclosed herein. Any device or structure illustrated or described in this specification can be used with any method in this specification. In some embodiments, the method includes the step of obtaining a medical fluid bag. In some embodiments, the method includes the step of attaching the medical fluid bag to tubing (e.g., tubing for a catheter or a needle for i.v. administration). In some embodiments, the method includes the step of obtaining a syringe or device capable of holding a medical fluid. In some embodiments, a method includes the step of attaching the syringe or other device to a connector. In some embodiments, a method includes the step of introducing medical fluid into a connector and/or tubing and/or a catheter using the syringe or other medical fluid bag. In several embodiments, a fluid from the medical fluid bag or the syringe is introduced to a patient. In several embodiments, a kit may be provided. In several embodiments, the kit may include instructions for use.

In several embodiments, the method of use involves acquiring a container comprising a polymer composition as disclosed herein. In several embodiments, the container is filled with a consumable (e.g., a solid or liquid). In some embodiments, the container is sealed. In some embodiments, the consumable is distributed to a subject or patient. In some embodiments, the consumable is consumed by the subject. In several embodiments, a kit may be provided. In several embodiments, the kit may include instructions for use.

The following examples are given for the purpose of illustrating various embodiments of the disclosure and are not meant to limit the present disclosure in any fashion. One skilled in the art will appreciate readily that the present disclosure is well adapted to carry out the objects and obtain the ends and advantages mentioned, as well as those objects, ends and advantages inherent herein. Changes therein and other uses which are encompassed within the spirit of the disclosure as defined by the scope of the claims will occur to those skilled in the art.

EXAMPLES

Example 1. Film Preparation

Flexible PVC films of various compositions comprising 2-diethylhexyl phthalate (DEHP), epoxidized linseed oil (ELO), and an optical enhancer were prepared and extruded.

Experiment Design

A 2×2 full factorial experiment design (DOE) was run varying DEHP and ELO at nominal loadings of 26.0 wt. % and 29.0 wt. %, and 4.0 wt. % and 9.0 wt. %, respectively, in addition to a midpoint composition, and two additional lower quadrant midpoint compositions. Two-dimensional composition space plots were used to visualize the data and to infer directionality and magnitude of compositional impact on each of the film properties and attributes within the defined composition space. As indicated in Table 1, the actual composition space is broadened relative to the nominal DOE composition space, as shown in FIG. 1A. Property values are plotted in the actual composition space to provide a true representation of trends with DEHP and ELO concentration changes.

As shown in Table 1 and FIG. 1A, the target concentration of DEHP and ELO for PVC film 1 (RDF026) was 26.00 wt. % and 4.00 wt. %, respectively. The target concentration of DEHP and ELO for PVC film 2 (RDF027) was 29.00 wt. % and 4.00 wt. %, respectively. The target concentration of DEHP and ELO for PVC film 3 (RDF028) was 26.00 wt. % and 9.00 wt. %, respectively. The target concentration of DEHP and ELO for PVC film 4 (RDF029) was 29.00 wt. % and 9.00 wt. %, respectively. The target concentration of DEHP and ELO for PVC film 5 (RDF030) was 27.50 wt. % and 6.50 wt. %, respectively. The target concentration of DEHP and ELO for PVC film 6 (RDF031) was 26.75 wt. % and 5.25 wt. %, respectively. The target concentration of DEHP and ELO for PVC film 7 (RDF032) was 28.25 wt. % and 5.25 wt. %, respectively. A constant loading of optical brightener 2,5-bis(5-t-butyl-2-benzoxazolyl) thiophene (e.g., 2,5-bis(5-t-butyl-2-benzoxazolyl) thiophene; sold commercially as Mayzo Benetex®) at 75 ppm (0.0075 wt. %) loading was used in all DOE films. The control (JV-1) lacked the OB and had a target concentration of DEHP and ELO was 27.66 wt. % and 9.10 wt. %, respectively. It was prepared with JV-1 resin.

TABLE 1

PVC resin formulations and films prototypes produced for characterization.

| Resin Formulation | PVC Film | Target DEHP Addition (wt. %) | Target ELO Addition (wt. %) | Actual DEHP Added (wt. %) | Actual ELO Added (wt. %) |
|---|---|---|---|---|---|
| 1 | 1 | 26.00 | 4.00 | 25.5 | 3.7 |
| 2 | 2 | 29.00 | 4.00 | 28.6 | 3.9 |
| 3 | 3 | 26.00 | 9.00 | 25.7 | 8.9 |
| 4 | 4 | 29.00 | 9.00 | 29.5 | 9.5 |
| 5 | 5 | 27.50 | 6.50 | 27.0 | 6.0 |
| 6 | 6 | 26.75 | 5.25 | 26.0 | 5.3 |
| 7 | 7 | 28.25 | 5.25 | 27.8 | 4.6 |
| Control | Control | 27.66 | 9.10 | 27.0 | 7.2 |

Figure 1B:
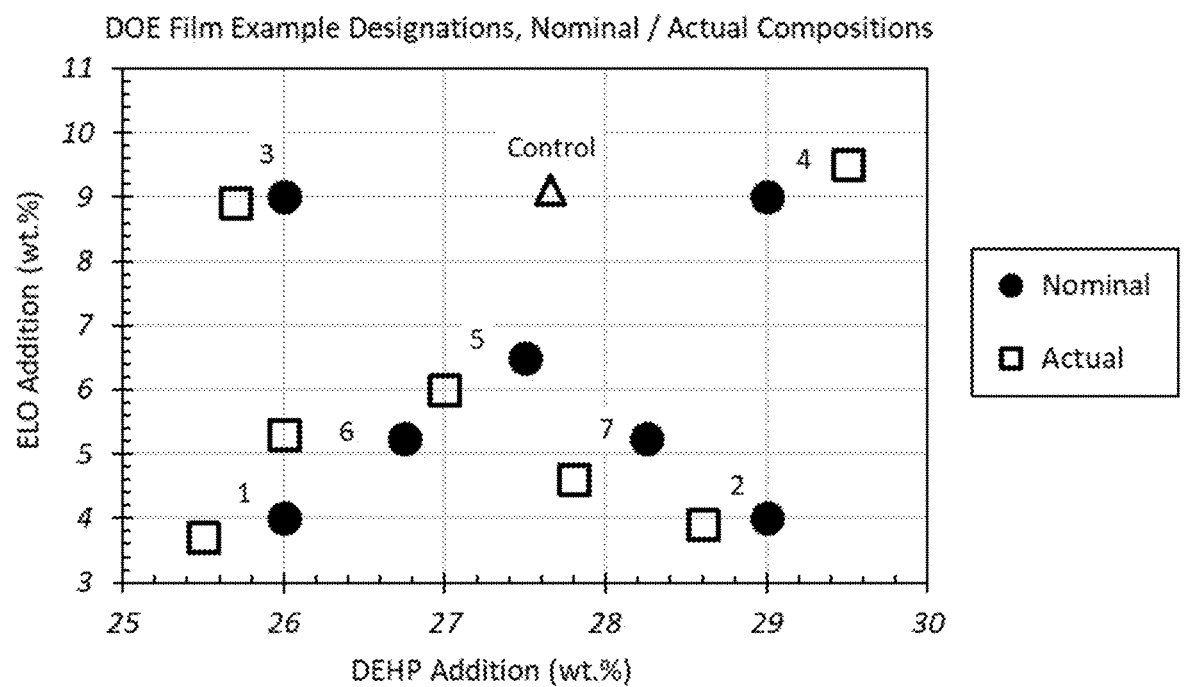
Figure 1C:
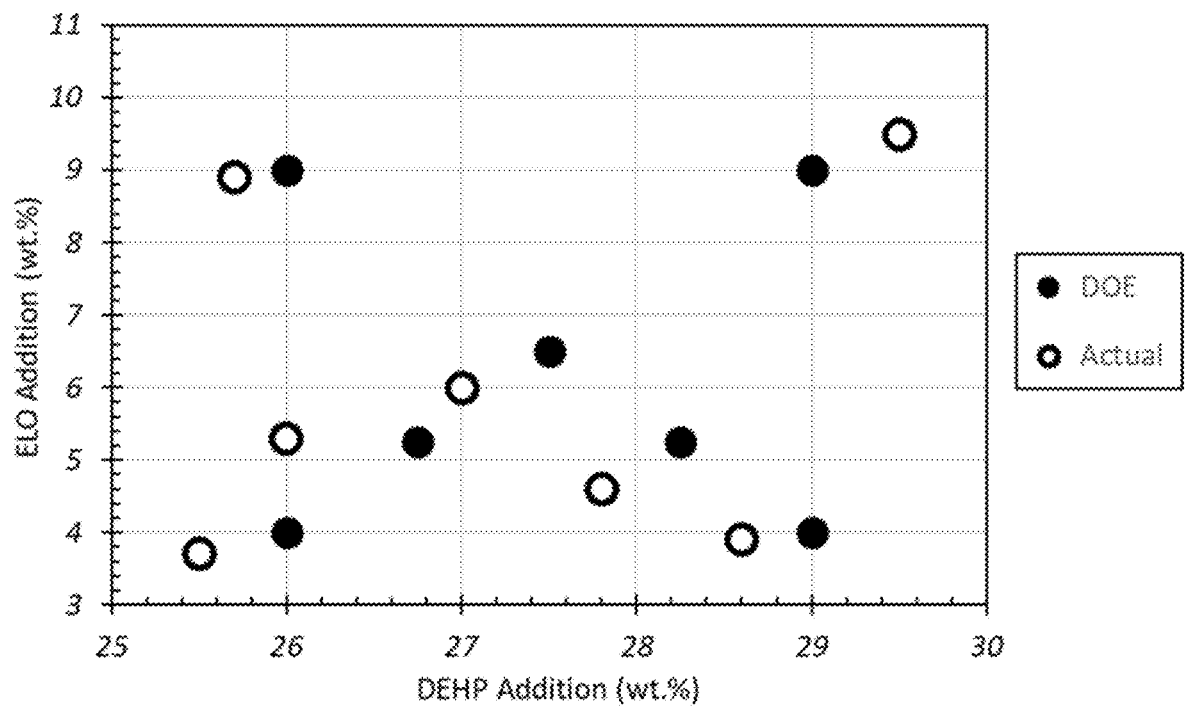

Actual DEHP and ELO levels in film were confirmed using gradient elution HPLC (deionized water/acetonitrile). The actual loadings are shown in the final two columns of Table 1 and two dimensionally in FIG. 1B. FIG. 1C shows a comparison of nominal and actual DEHP and ELO concentrations for the seven DOE films produced in this study.

Di-2-Ethylhexyl Phthalate (DEHP) Content in Film

The content of di-2-ethylhexyl phthalate (DEHP) in film was determined using gradient elution HPLC (C8 analytical column) with an ultraviolet (UV) detector at 210 nm at 50° C. and a 0.7 mL/min mobile phase comprising deionized water and acetonitrile.

Epoxidized Linseed Oil (ELO) Content in Film

The content of epoxidized linseed oil (ELO) in film was measured using gradient elution HPLC (C4 analytical column) with a charged aerosol detector (CAD) at 50° C. and a 0.7 mL/min mobile phase comprising deionized water and acetonitrile Resin Mixing PVC resin pellets were received as formulated from the resin supplier. The base PVC resin was an emulsion-polymerized grade with a K-value of 70-72. The base resin was compounded by the resin supplier with a constant heat stabilizer package (0.0696 wt. % $CaSt_2$ and 0.0696 wt. % $ZnSt_2$) and processing aid, N,N'-ethylene bis-stearamide wax (0.278 wt. %). As noted above, a constant loading of optical brightener 2,5-bis(5-t-butyl-2-benzoxazolyl) thiophene (e.g., 2,5-bis(5-t-butyl-2-benzoxazolyl) thiophene at 75 ppm (0.0075 wt. %) loading was used. The addition of these additives with 1,2-diethylhexyl phthalate (DEHP) and epoxidized linseed oil (ELO) was performed according to the schedule in Table 1, with the remainder of the weight of the composition being PVC. PVC compounds 1 through 4 were used as received from the PVC resin compounder to extrude films.

PVC formulation blend components (base resin and masterbatches) were weighed using a Mettler Toledo IND 236, Model BBA236-4B30 weighing scale with an operating range of 0.2 kg to 30 kg maximum, and a mass resolution of 0.01 kg. Blends 5 through 7 were prepared as pellet dry blends using a KLUTCH™ 4.1 ft³ portable cement mixer (0.5 hp, 120V, 1720 rpm). Pellet dry blends were mixed for at least 15 min before discharging into a 5-gal plastic bucket and feeding to the extruder feed hopper for film extrusion.

Film Extrusion

PVC films were extruded using the compounds and dry blends listed in Table 1 in a US Extruders 2.5-inch, 24:1 single screw extruder equipped with a barrier screw with a Maddock mixing section and a 16-inch Nordson ULTRA-FLEX™ coat hanger sheet die set to a die gap of 0.025 inch, and a top/middle casting roll (Parker and Williamson roll stand) distance of about 4 inches. Extrusion conditions were held relatively constant, according to the nominal set point conditions listed in Table 2.

TABLE 2

PVC films extrusion conditions used in the production of prototype films.

| Extruder/Die/Roll Stand Zone | Set Point Value | Units |
|---|---|---|
| Feed Throat Cooling (water) | 100 | ° F. |
| Barrel Zone 1 | 330 | ° F. |
| Barrel Zone 2 | 340 | ° F. |
| Barrel Zone 3 | 320 | ° F. |
| Barrel Zone 4 | 320 | ° F. |
| Die Zone 1 | 320 | ° F. |
| Die Zone 2 | 320 | ° F. |
| Die Zone 3 | 320 | ° F. |
| Screw Speed | 98.0 | rpm |
| Die Exit-Casting Roll Gap | 4.0 | in |
| Top Casting Roll Temperature | 240 | ° F. |
| Middle Casting Roll Temperature | 210 | ° F. |
| Bottom Casting Roll Temperature | 85 | ° F. |
| Middle/Top Casting Roll Speed | 33.5 | ft/min |
| Chill Rolls Temperatures (First/Second) | 70/70 | ° F. |
| Wound Film Width | 13.9 | in |

Table 3 provides relevant film extrusion process and property/attribute targets for the DOE films and packages produced and tested in this study. Note: Ambient represents the nominal environmental conditions in the film extrusion laboratory, subject to venting and ingress of plant air.

TABLE 3

Relevant film extrusion process and property/attribute targets for the DOE films and packages produced and tested in this study.

| Measured Process/Film Property/Attribute | Temperature (° C.) | Relative Humidity (%) | Value(s) | Units |
|---|---|---|---|---|
| Film Thickness | Ambient | 50 ± 5 | 13.5-15.5 | mils |
| Extrusion Head Pressure | Ambient | — | <2,800 | psig |
| Container Burst Pressure | Ambient | — | ≥25 | psig |
| Blocking Force (ASTM D3354) | 23 | 50 ± 5 | ≤0.12 | $lb_f$ |
| Total Organic Carbon (USP <661.1>) | 25 | — | ≤5.0 | ppm |
| Static Thermal Heat Stability (0-120 min; 10-min increments) | 172 | — | ≥75 | min |
| Pre-Sterilization Yellowness Index (D65/10°, ASTM E308) | 60 | — | ≤0 | — |
| Post-Sterilization Yellowness Index (ASTM E308, ASTM E313, ASTM F1980-02) | 60 | — | ≤0 | — |
| 65-day Change in Yellowness Index (ASTM E308, ASTM E313, ASTM F1980-02) | 60 | — | ≤6 | — |
| Moisture Vapor Permeability (ASTM F1249) | 23 | 50 ± 5 | — | g · mil/m² · d · atm |
| Tensile Strength (MD and TD, ASTM D882) | 23 | 50 ± 5 | — | ksi |
| Tensile Strain at Break (MD and TD, ASTM D882) | 23 | 50 ± 5 | — | % |

Film take-up and winding speeds were set to achieve a film thickness in the range of 14.5±0.5 mils. Film thickness was set by the combination of extrusion rate and casting roll speed. The film extrusion rate was maintained constant at 98 rpm, however, line speed was varied slightly as needed to account small variations in film density resulting from the composition differences of the DOE formulations. A constant, compounded draw ratio of 1.05 was maintained for subsequent downstream bottom casting and chill driven rolls. Film thicknesses for the seven DOE films are summarized in Table 4. For the DOE films, density decreases slightly as the total liquid loading DEHP and ELO in the resin formulation increases.

TABLE 4

Measured film thicknesses for the seven DOE films and control film generated in this study.

| Example Film | Measured Thickness (mil) |
|---|---|
| 1 | 14.5 |
| 2 | 14.3 |
| 3 | 14.3 |
| 4 | 14.4 |
| 5 | 14.5 |
| 6 | 14.5 |
| 7 | 14.3 |
| Control | 14.5 |

Figure 1D:
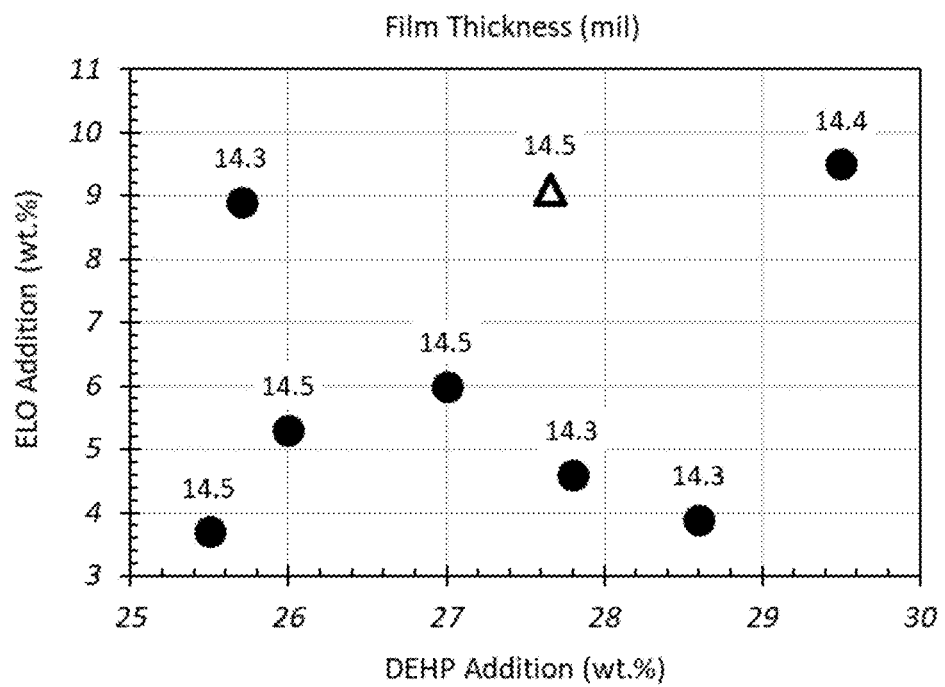
FIG. 1D provides data on the film thickness of the films of FIGS. 1A-C.

FIG. 1D shows a plot of the measured film thicknesses for the seven DOE films generated in this study.

Figure 1E:
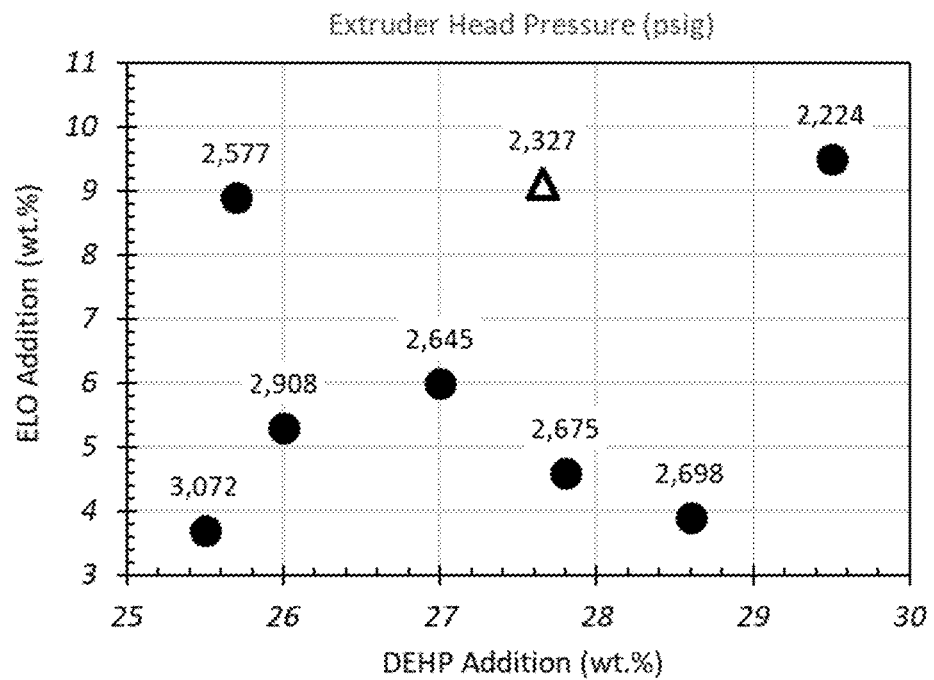
FIG. 1E provides data for extruder head pressure during the extrusion of the films of FIGS. 1A-1C.

DOE and control films were produced at a relatively constant extrusion rate of about 232 $lb_m$/hr. Head pressures measured at constant throughput should provide an indication of the impact of plasticizer liquid loading (DEHP and ELO) on melt shear viscosity. Extruder head pressures for the extrusion of the seven DOE films and control film are given in Table 5 and plotted in FIG. 1E. The tabulated data and plot reveal how increase liquid loading leads to a decrease in PVC melt viscosity and extrusion head pressure. A ±1 wt. % change in ELO corresponds to about a ±97 psig change in head pressure, whereas a ±1 wt. % change in DEHP yields approximate ±121 psig change in head pressure. The data for extruder head pressure for each film is shown in FIG. 1E.

TABLE 5

Extruder head pressures measured at constant extruder throughput (232 $lb_m$/hr) for the seven DOE films and control film generated in this study. The control film was run at 217 $lb_m$/hr.

| Example Film | Extruder Head Pressure (psig) |
|---|---|
| 1 | 3,072 |
| 2 | 2,698 |
| 3 | 2,577 |
| 4 | 2,224 |
| 5 | 2,645 |
| 6 | 2,908 |
| 7 | 2,675 |
| Control | 2,327 |

Example 2. Film Characterization

The flexible PVC films extruded in Example 1 were tested to evaluate film processing, mechanical properties, appearance and color stability with respect to post-sterilization film brightness and color stability relative to the Yellowness Index (D65, 10°) defined for the CIE XYZ color space.

Measurement of PVC Glass Transition Temperature Using Differential Scanning Calorimetry The glass transition temperature of extruded PVC film samples for the seven DOE and Control films was measured using differential scanning calorimetry (DSC). Briefly, a 5-10 mg sample of polymer was sliced from the extruded film and placed into a standard aluminum DSC pan and crimped. An identical empty, covered aluminum pan was used as a reference. Both pans were placed into the autosampler unit of a TA Instruments DSC 2500 Differential Scanning Calorimeter. The unit was programmed to equilibrate the sample at −50° C., and ramp sample and reference pans at 10° C./min to 195° C. to complete the analysis. The instrument was ramped at −10° C./min to 40° C. to complete the test cycle.

Figure 1F:
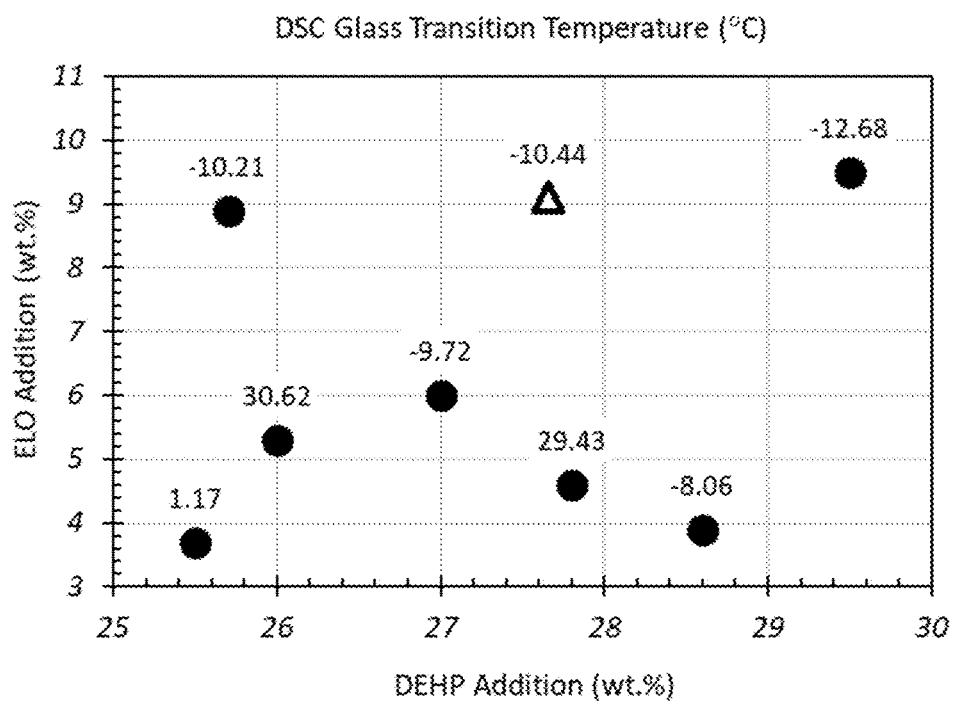
FIG. 1F provides data for the glass transition temperature of the films of FIGS. 1A-C.

The location of the glass transition temperature of the PVC sample was identified at the endotherm inflection point where the value of the second derivative is zero. The measured glass transition temperature for the DOE and Control films are summarized in Table 6 below. FIG. 1F also shows the results.

This DSC testing conforms with ASTM E794-06 "Standard Test Method for Melting and Crystallization Temperatures by Thermal Analysis," ASTM E1356-08 "Standard Test Method for Assignment of the Glass Transition Temperatures by Differential Scanning Calorimetry," and ASTM D7426-08 "Standard Test Method for Assignment of the DSC Procedure for Determining the Tg of a Polymer or an Elastomeric Compound."

TABLE 6

Glass transition temperatures for the seven DOE films as measured by DSC.

| PVC Film | Glass Transition Temperature (° C.) |
|---|---|
| 1 | 1.17 |
| 2 | −8.06 |
| 3 | −10.21 |
| 4 | −12.68 |
| 5 | −9.72 |
| 6 | −5.40 |
| 7 | −6.98 |
| Control | −10.44 |

Film Haze

Figure 2:
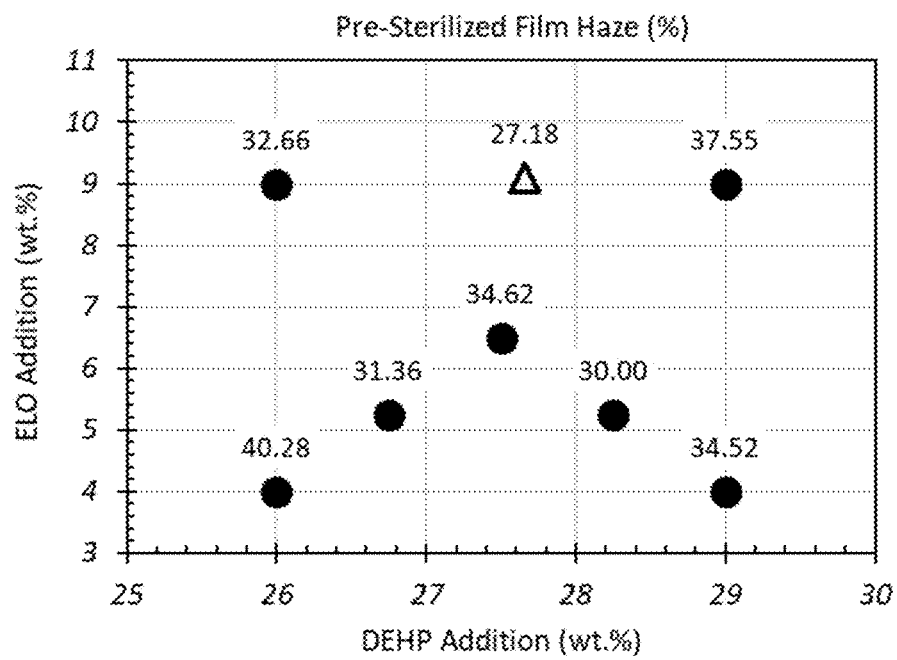
FIG. 2 provides film haze data for some embodiments of films as disclosed herein.

Film haze prior was measured prior to heat treatment. Haze was lowest for RDF032 as shown in FIG. 2. However, each bag provided an acceptable level of hazing.

Color Measurements

The CIELAB XYZ D65/10° yellowness index values computed according to ASTM E313 are tabulated in Table 7 for the seven DOE films and the control film for the pre-sterilized and post-sterilized, 60° C. aging conditions. An UltraScan® Pro from HunterLab was used to determine the color of "as-extruded" (non-sterilized) films, films exposed to accelerated aging after sterilization, and films subjected to static heat stability testing. The UltraScan® Pro uses a D65/10° (Illuminant/Observer). All tristimulus integrations are calculated per Paragraph 7.3.1 of ASTM Standard E308. Testing was performed in reflectance mode using the 0.780" aperture for non-sterilized and sterilized films and a 0.390" aperture for films tested via static heat stability. The serial number for the sensor and the corresponding standards is USP 2263. All film samples are referenced to the White Tile Standard, USP 2263. The CIELAB color scale and CIE XYZ color space were recorded for each film sample tested.

Figure 3A:
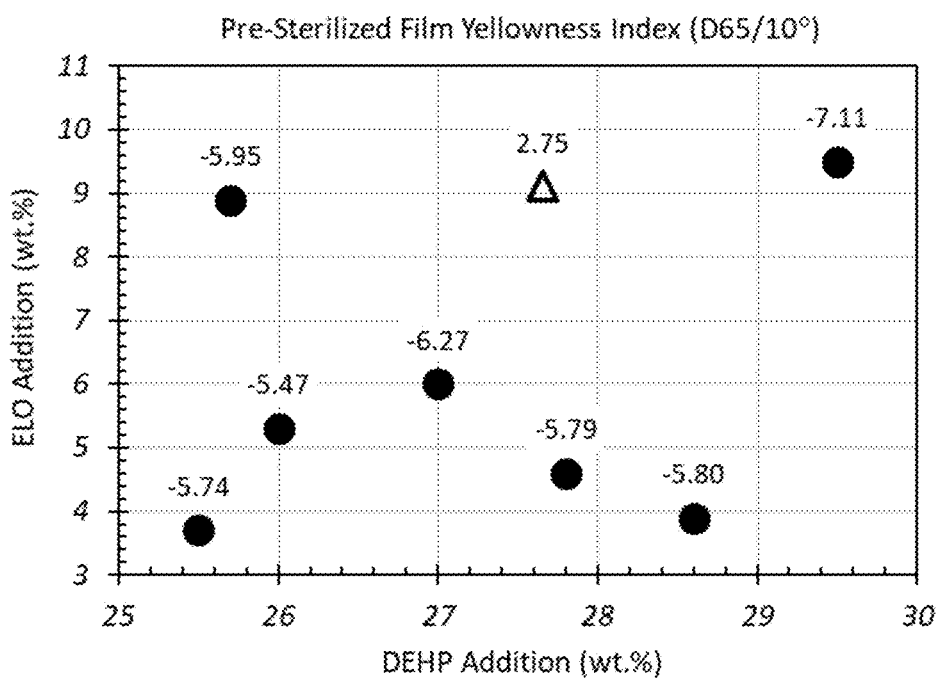
FIGS. 3A-3C provide yellowness index data for embodiments of films disclosed herein versus a control.

The recorded output from the UltraScan® Pro are the L*, a*, b*, ΔELAB, X, Y, Z, and ΔEXYZ. The yellowness index (YI) for each film sample is calculated by using the CIE XYZ color space as defined in ASTM E313. The YI is calculated by using the following equation:

$$YI = (100 * (C_x * X - C_z * Z))/Y$$

where YI is the D65/10° yellowness index, X, Y, and Z are the recorded values for the CIE XYZ color space, and $C_x$ and $C_z$ are constants. The constants $C_x$ and $C_z$ are 1.3013 and 1.1498, respectively, when using a D65/10° (Illuminant/Observer) in accordance with ASTM E313. The data for the films prior to heat treatment is shown in FIG. 3A. All films containing OB were blue (YI<0) prior to sterilization (green-filled circles). JV-1 (27.7 wt. % DEHP, 9.1 wt. % ELO) contains no OB (red-filled circle) and had a yellowness index of 2.75.

Sterilization Testing

Figure 3B:
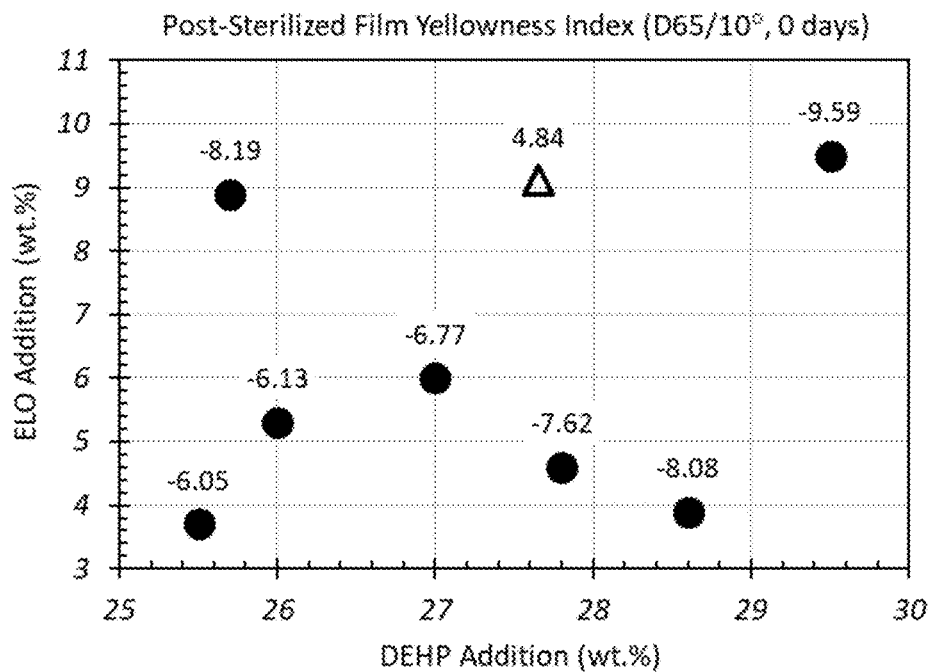
Figure 3C:
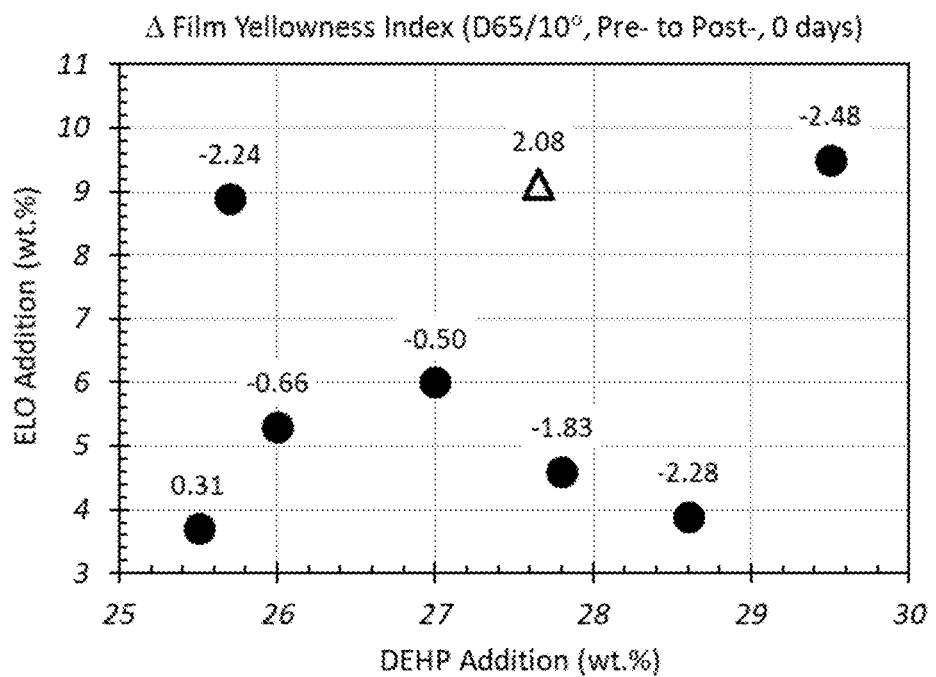
Figure 3D:
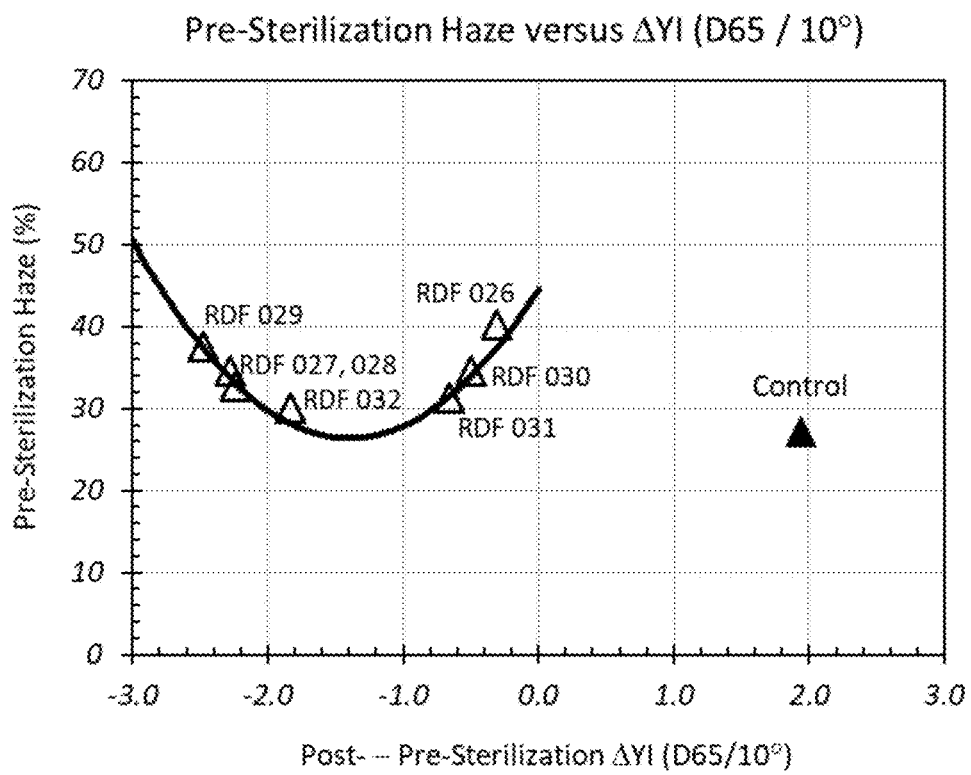
FIG. 3D provides a plot of pre-sterilization haze and pre-to post-sterilization change in yellowness index for embodiments of films disclosed herein.

Film color stability following a one-hour sterilization cycle at 121° C. was monitored at four intervals (during post-sterilization storage at 60° C. over a period of 65 days). The data for that testing is shown as FIG. 3B, where the numbers shown are the YI is the D65/10° yellowness index. As shown, sterilization surprisingly appears to increase film blueness and/or decrease film yellowness for GB-modified films, whereas for films containing no OB, yellowness is increased. The change in yellowness index is shown in FIG. 3C. FIG. 3D shows a regression trend for pre-sterilization haze and post to pre sterilization change in yellowness index. The regression equation is as follows:

$$\text{Haze (\%)} = 55.6 + 26.2\,YI + 9.37\,YI^2 \quad R^2 = 0.994$$

The data trend from FIG. 3D appears to indicate a possible shift in formulation phase segregation behavior near YI=−1.40. Table 7 below shows the yellowness index before and after sterilization.

Accelerated Aging of DOE Films

Figure 3E:
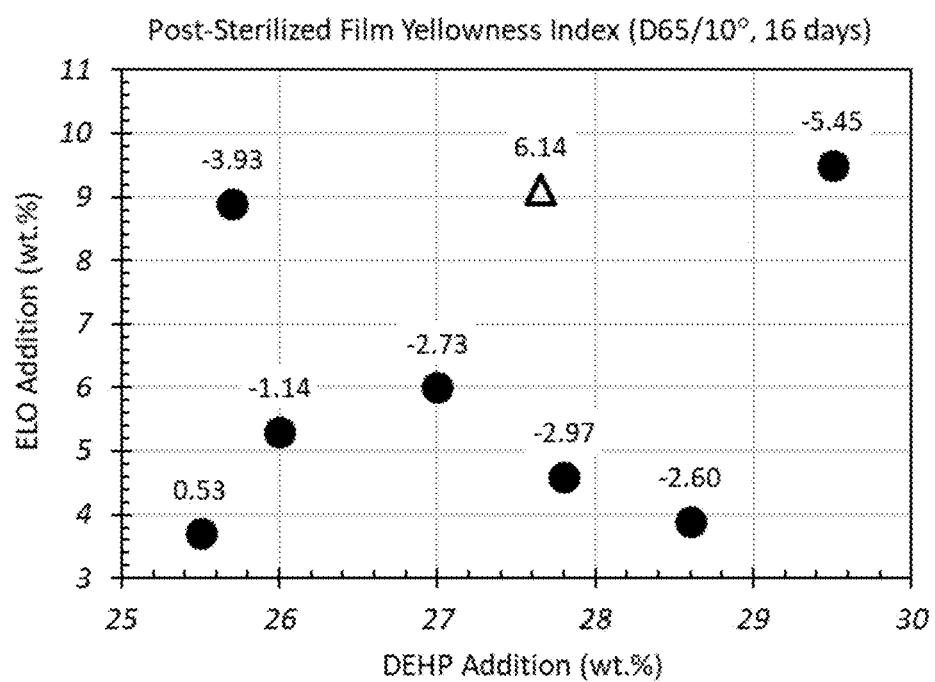
FIGS. 3Ei-3Hii provide yellowness index data for embodiments of films disclosed herein during accelerated aging testing.
Figure 3F:
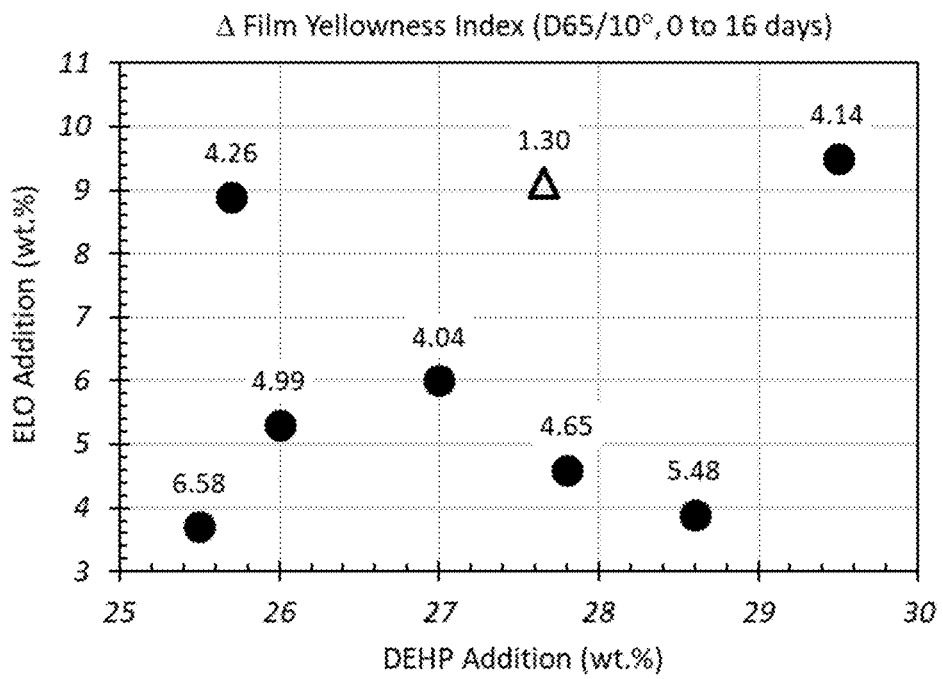
Figure 3F:
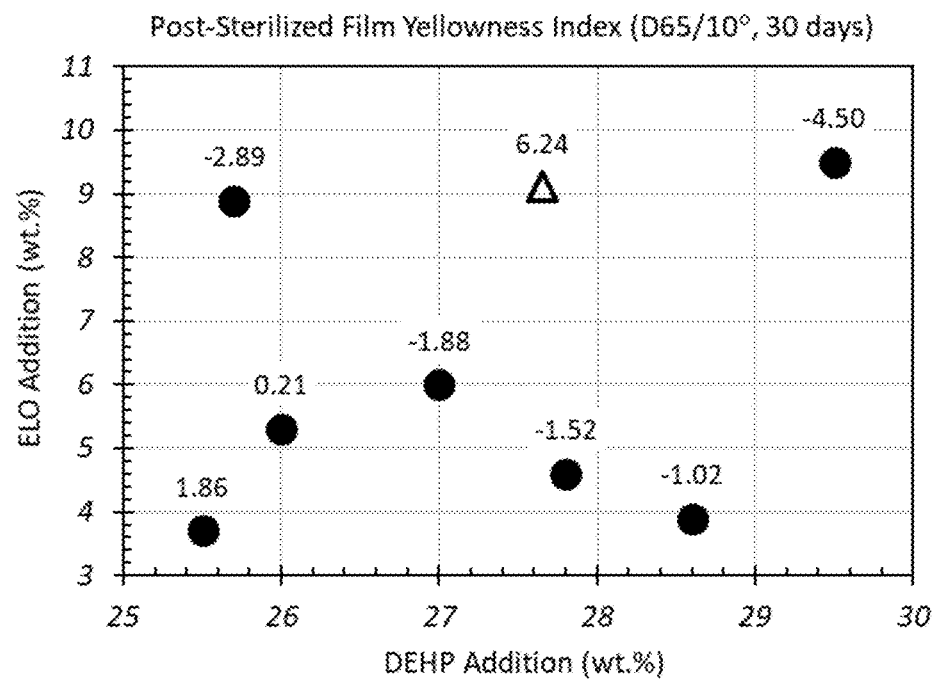
Figure 3G:
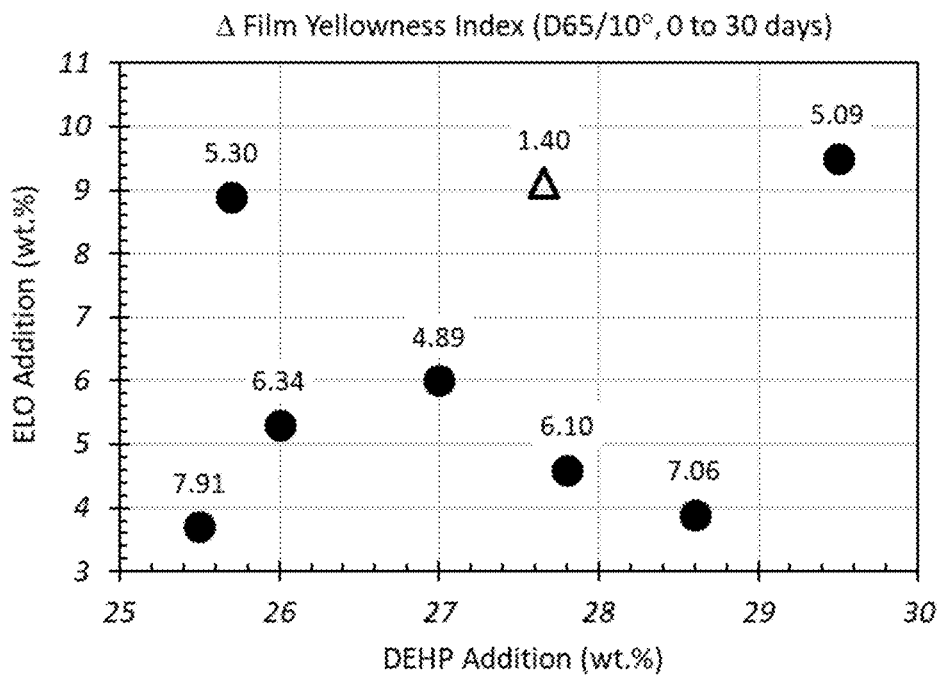
Figure 3G:
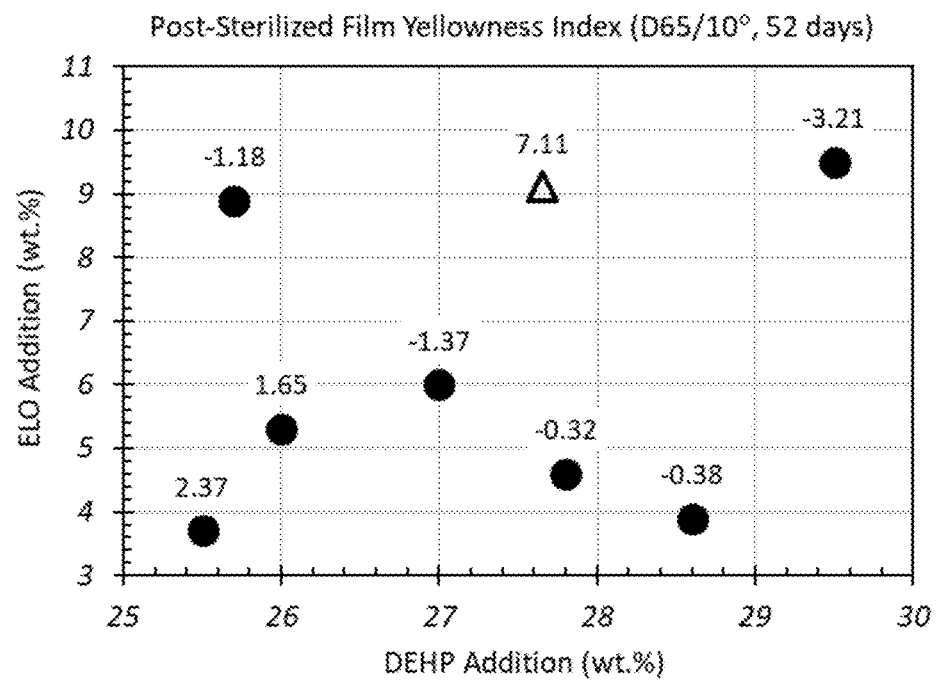
Figure 3H:
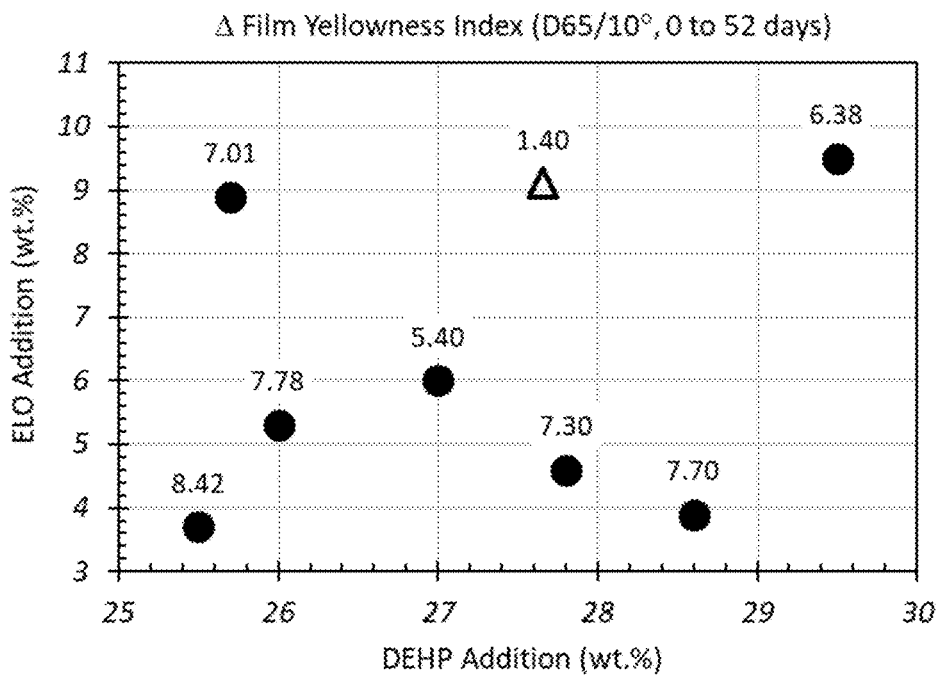
Figure 3H:
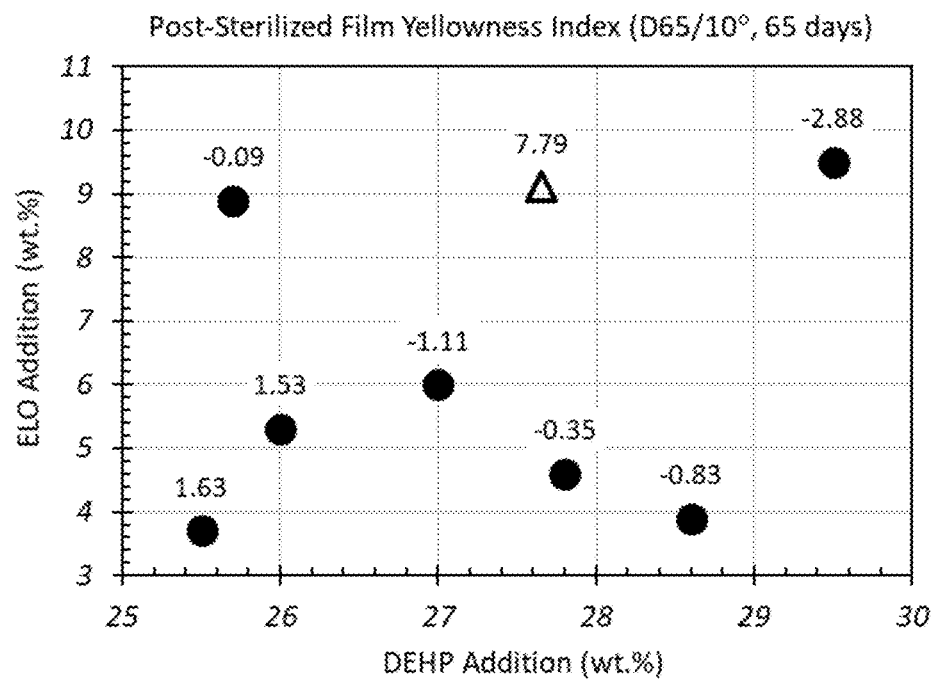

Accelerated aging of extruded DOE films was evaluated by sterilizing film samples and then aging the sterilized films at 60° C. for 65 days, in accordance with ASTM F1980-02 (data is shown in FIG. 6). As indicated above, prior to aging, the film samples were sterilized at 121° C. for 60 minutes using the Yamato Autoclave unit SQ810C. The sterilized samples (data in FIG. 3B) were placed in a VWR Vacuum Oven manufactured by Sheldon Manufacturing Inc., Model 1430M at 60° C. Color of the aged film samples were measured at the 0 (FIG. 3B), 16 (FIG. 3Ei, with change in yellowness from time 0 indicated in FIG. 3Eii), 30 (FIG. 3Fi, with change in yellowness from time 0 indicated in FIG. 3Fii), 52 (FIG. 3Gi, with change in yellowness from time 0 indicated in FIG. 3Gii), and 65-day (FIG. 3Hi, with change in yellowness from time 0 indicated in FIG. 3Hii) time point exposures at 60° C. Color measurements were performed using the method described in the "Color Measurements" section.

Except for the control film for which the yellowness index increased following sterilization, the yellowness index values for all DOE films decreased (increased in blueness) following sterilization. Once the DOE films were sterilized and aging at 60° C. had commenced, all DOE films began to yellow, but at varying rates. The development of yellowness appeared to progress more rapidly for the DOE films comprising lower DEHP and ELO content. The slowest progression of yellowness seemed to occur near the midpoint of the composition range with Example Film 5. After 65 days of aging at 60° C., Example film 5 was more than 9.22 units bluer in shade than the control film.

TABLE 7

Pre- and post-sterilization yellowness index following aging at 60° for the seven DOE films and the control film generated in this study.

| | Yellowness Index (D65/10°) | | | | | |
|---|---|---|---|---|---|---|
| Film | Pre- | Post-Day 0 | Post-Day 16 | Post-Day 30 | Post-Day 52 | Post-Day 65 |
| 1 | −5.74 | −6.05 | 0.53 | 1.86 | 2.37 | 1.63 |
| 2 | −5.80 | −8.08 | −2.60 | −1.02 | −0.38 | −0.83 |
| 3 | −5.95 | −8.19 | −3.93 | −2.89 | −1.18 | −0.09 |
| 4 | −7.11 | −9.59 | −5.45 | −4.50 | −3.21 | −2.88 |
| 5 | −6.27 | −6.77 | −2.73 | −1.88 | −1.37 | −1.11 |

TABLE 7-continued

Pre- and post-sterilization yellowness index following aging at 60°
for the seven DOE films and the control film generated in this study.

| | Yellowness Index (D65/10°) | | | | |
|---|---|---|---|---|---|
| Film | Pre- | Post-<br>Day 0 | Post-<br>Day 16 | Post-<br>Day 30 | Post-<br>Day 52 | Post-<br>Day 65 |
| 6 | −5.47 | −6.13 | −1.14 | 0.21 | 1.65 | 1.53 |
| 7 | −5.79 | −7.62 | −2.97 | −1.52 | −0.32 | −0.35 |
| Cont. | 2.75 | 4.84 | 6.14 | 6.24 | 7.11 | 7.79 |

Table 8 lists the change in yellowness index for each film, DOE and control, for each of the sampling time intervals. As previously mentioned, the rate of change in the yellowness index for Example Film 5 was noticeably slower than for the other DOE films. This result is surprising, since the yellowness change from pre-sterilization to post-sterilization was the lowest shift to blue (−0.50) except for Example Film 1 (−0.31). The cause-effect relationship for this surprising result is unknown, but it may be related to an unexpected synergy induced by the reduction in the rate of yellowness increase by ELO at 60° C. due to the slowing of polyconjugation and the bluing contribution of DEHP near the midpoint of the composition space. The presence of the optical enhancer (e.g., the optical brightener 2,5-bis(5-t-butyl-2-benzoxazolyl) thiophene) provides fluorescent blueness that may amplify this effect near the midpoint.

TABLE 8

Pre- and post-sterilization yellowness index following aging at 60° C.
for the seven DOE films and the control film produced for this study.

| | Change in Yellowness Index (D65/10°) | | | | |
|---|---|---|---|---|---|
| Film | Pre- to<br>Post-<br>Day 0 | Post-<br>Days<br>0 to 16 | Post-<br>Days<br>0 to 30 | Post-<br>Days<br>0 to 52 | Post-<br>Days<br>0 to 65 |
| 1 | 0.31 | 6.58 | 7.91 | 8.42 | 7.68 |
| 2 | −2.28 | 5.48 | 7.06 | 7.70 | 7.25 |
| 3 | −2.24 | 4.26 | 5.30 | 7.01 | 8.10 |
| 4 | −2.48 | 4.14 | 5.09 | 6.38 | 6.71 |
| 5 | −0.50 | 4.04 | 4.89 | 5.40 | 5.66 |
| 6 | −0.66 | 4.99 | 6.34 | 7.78 | 7.66 |
| 7 | −1.83 | 4.65 | 6.10 | 7.30 | 7.27 |
| Cont. | 2.08 | 1.30 | 1.40 | 2.27 | 2.95 |

Static Heat Stability of DOE Films at 172° C.

Figure 4A:
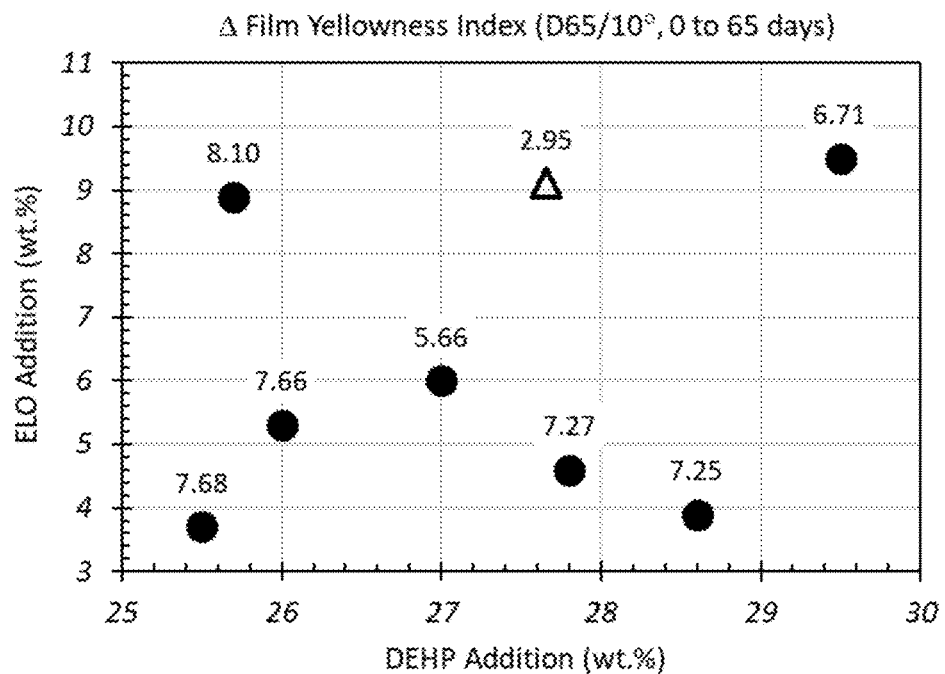
FIGS. 4A-4C provide data on yellowness index and char time for film embodiments exposed to elevated temperature.
Figure 4A:
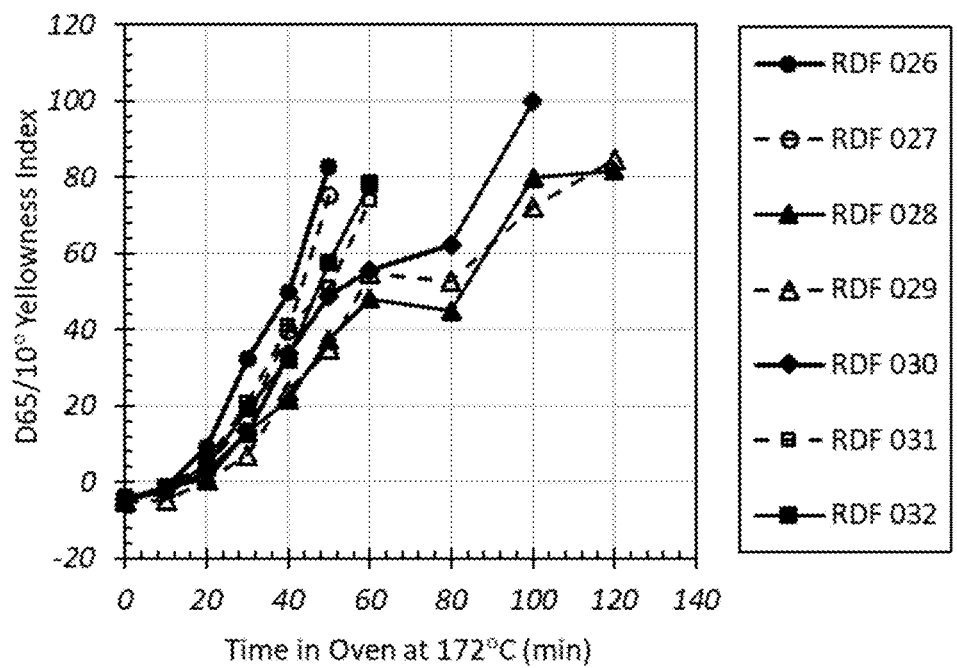

The static heat/color stability of extruded DOE films were evaluated by subjecting film samples to elevated temperatures that are utilized during cast film extrusion at various time increments. A VWR Vacuum Oven manufactured by Sheldon Manufacturing Inc., Model 1450M was used to control the temperature during testing. All film samples (2.5"×2.0", L×W) were tested at a temperature of 172° C. for time intervals of 0, 10, 20, 30, 40, 50, 60, 80, 100, and 120 minutes. The film samples were evaluated for color stability by visual appearance and utilization of the UltraScan® Pro colorimeter from HunterLab. FIG. 4A shows the D65/10° Yellowness Index as a function of time. Curves are terminated at the point of charring initiation. Charring onset time is increases with ELO loading and is not significantly affected by DEHP content. Data acquisition for RDF 028 and 029 films was terminated after 120 min in the oven.

Results for static thermal heat stability at 172° C. are compiled in Table 9. The data show that static thermal stability is not affected appreciably by increasing or decreasing DEHP in the formulation. However, increasing the ELO content in the formulation dramatically increases the char time beyond an addition level of about 4.6 wt. % up to about 6.0 wt. %. In this region of the composition space the increase in char time is approximately 29 min per weight percent ELO added. As the ELO content rises above 6 wt. %, the increase in char time is less at about 11 min per weight percent ELO added. Therefore, an ELO content near 6 wt. % appears to provide the greatest enhancement of thermal stability (time to char) per amount added.

TABLE 9

Static thermal stability char times at 172° C. for the seven
DOE films and control film generated in this study.

| Example Film | Static Thermal<br>Stability Time<br>(min) |
|---|---|
| 1 | 55 |
| 2 | 55 |
| 3 | >120 |
| 4 | >120 |
| 5 | 100 |
| 6 | 60 |
| 7 | 60 |
| Control | >120 |

Figure 4B:
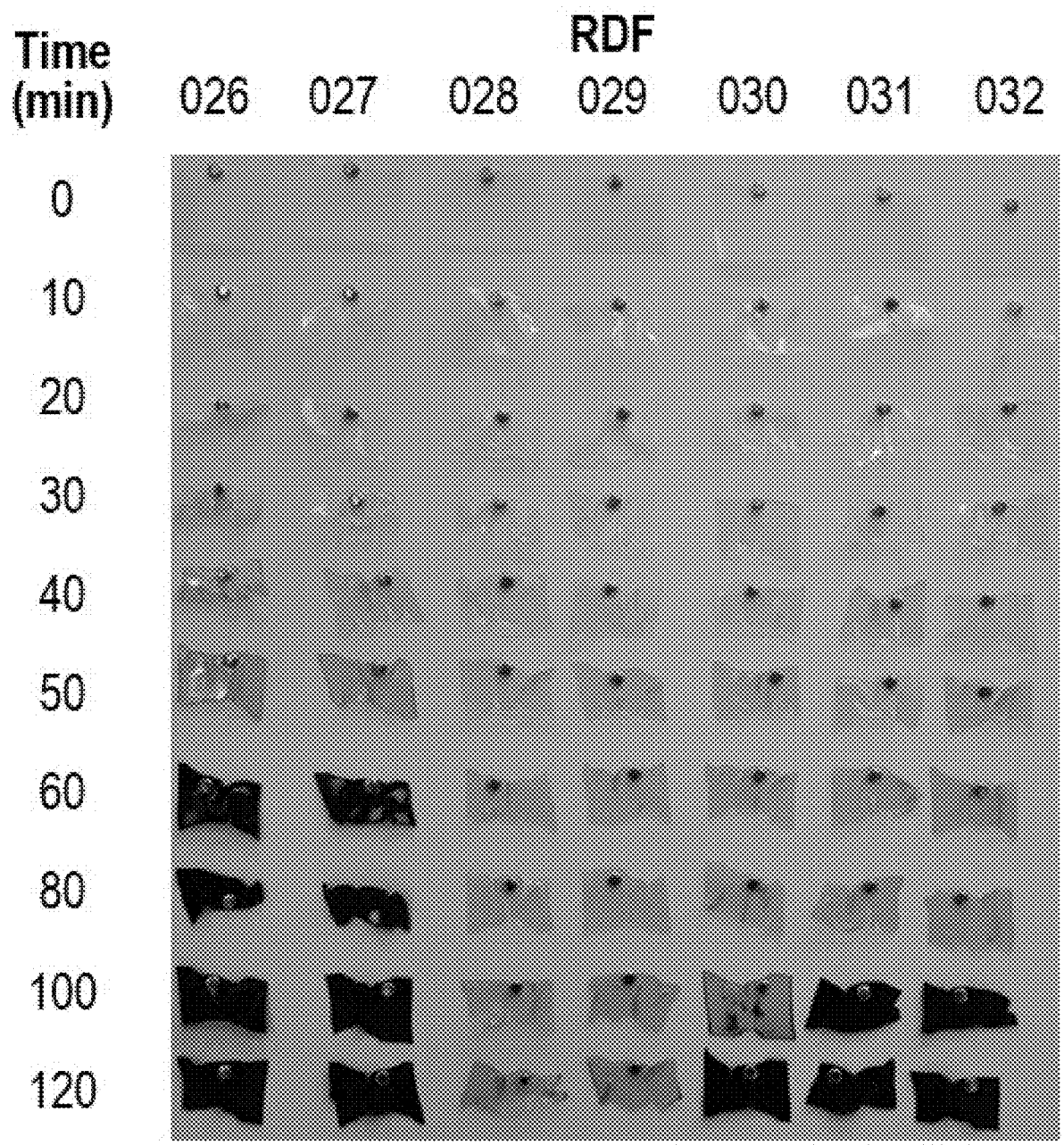
Figure 4C:
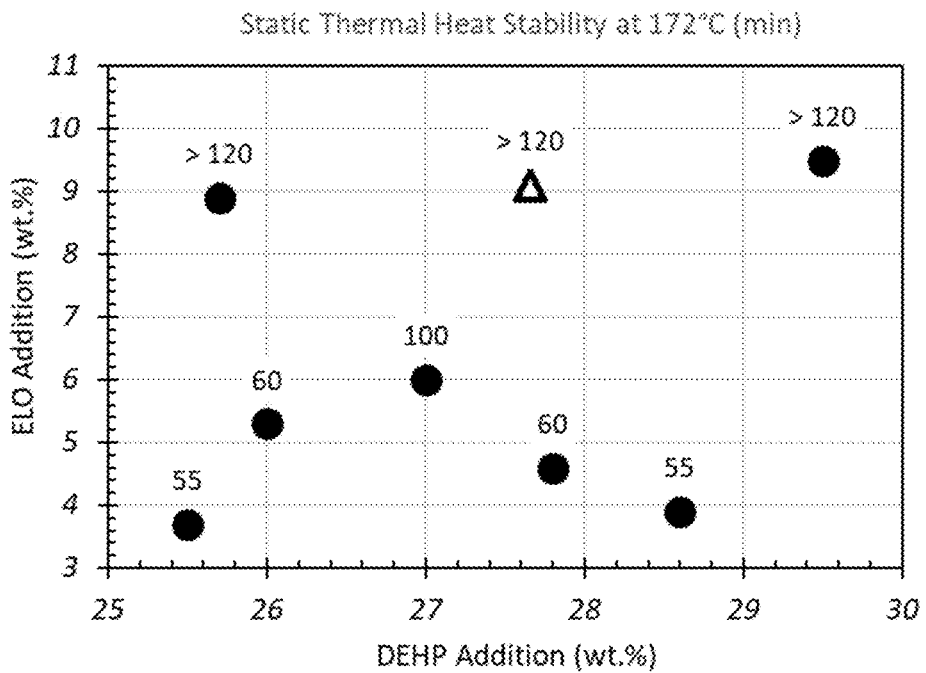

FIG. 4B shows the films during different stages of heat stability testing. FIG. 4C static heat stability time at 172° C. for the seven DOE films and control film produced in this study.

TOC Content

The determination of total organic carbon (TOC) was evaluated using a Sievers M9 Laboratory TOC analyzer. Film samples were analyzed for TOC content by immersing a 2.5-inch square in TOC free water. Sample preparation was performed using square pieces of test film cut to approximately 2.5 inches. Each test piece was accurately weighed and transferred to a 40 mL TOC-free vial for analysis. Exactly 40 mL of water was transferred into each vial using a Class A volumetric pipet. Next, samples were capped and placed into an oven maintained at 82° C. overnight (e.g., 12 hours or more). Next, the vials were removed from the oven and allowed to equilibrate for 24 hours at room temperature until analyzed. TOC results were compared for all films.

Figure 5A:
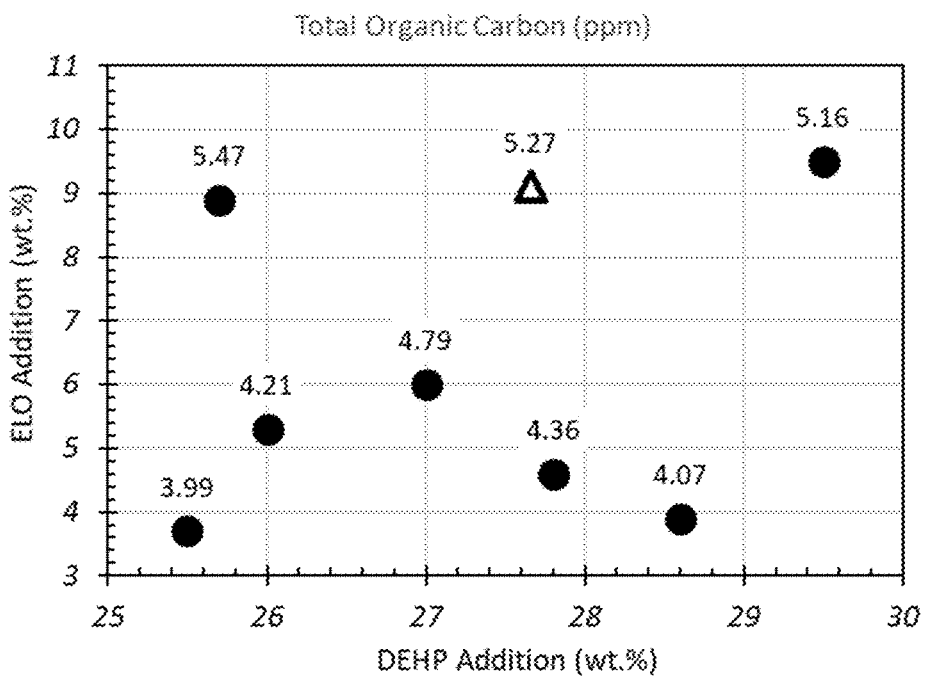
FIGS. 5A-5E provide data regarding certain material properties of embodiments of films disclosed herein.

The results of these measurements are tabulated in Table 10, and plotted in FIG. 5A indicate that TOC is relatively invariant with changing DEHP content, but trends proportionately with ELO addition. These results may be explained in part by the values of the octanol-water partition coefficients for DEHP and ELO, which are $10^{-8.82}$ and $10^{-6.2}$, respectively. The higher solubility of ELO in water compared to DEHP may contribute to higher TOC as the ELO loading in the flexible PVC resin formulation is increased. TOC levels under 5 ppm are favored by holding DEHP and ELO concentrations at or below the midpoint of the DOE composition space.

TABLE 10

Measured total organic carbon for packaged (1000-mL) water-
for-injection (WFI) for the seven DOE films generated in this study.

| Example<br>Film | Total Organic<br>Carbon (ppm) |
|---|---|
| 1 | 3.99 |
| 2 | 4.07 |
| 3 | 5.47 |
| 4 | 5.16 |

TABLE 10-continued

Measured total organic carbon for packaged (1000-mL) water-for-injection (WFI) for the seven DOE films generated in this study.

| Example Film | Total Organic Carbon (ppm) |
|---|---|
| 5 | 4.79 |
| 6 | 4.21 |
| 7 | 4.36 |
| Control | 5.27 |

FIG. 5A shows the total organic carbon (in ppm) per film.

Film Blocking Test (ASTM D3354)

Figure 5B:
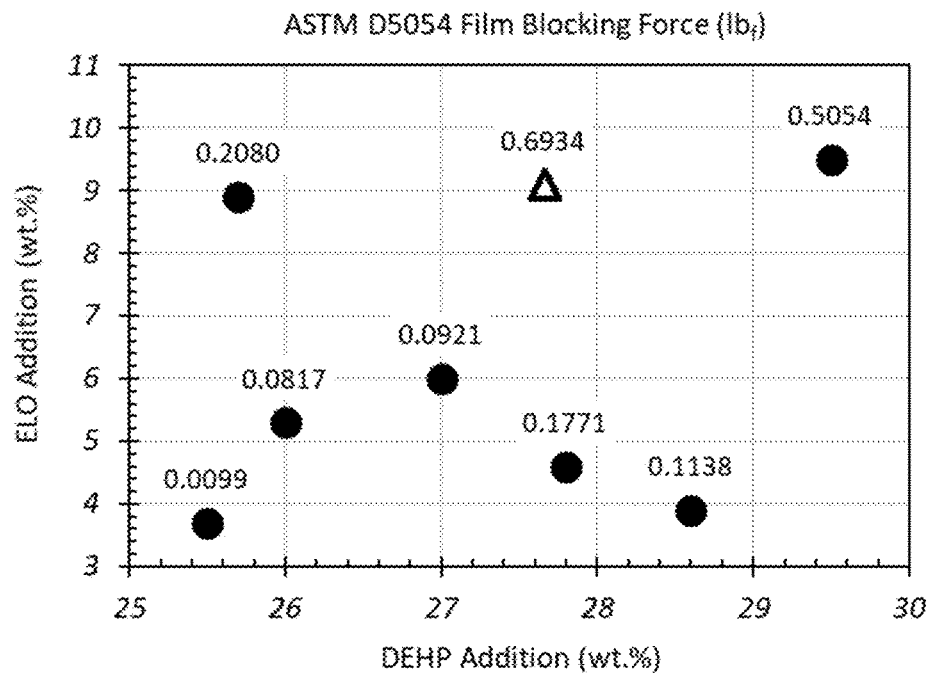

Film blocking load was characterized using the standard test method ASTM D3354. The diffusive snaking motions of chains within their entanglement constraints are the phenomena that govern container fabrication processes such as sealing, viscous flow and relaxation, and interfacial healing or blocking. Increase plasticizer content increases chain solvation and facilitates greater chain mobility through diffusion. Lower plasticizer content decreases the rate of these motions, leading to longer chain interfacial diffusion times. This behavior is evident in the data provided in Table 11 and plotted in FIG. 5B.

TABLE 11

ASTM D3354 film blocking forces for the seven DOE films generated in this study.

| Example Film | ASTM D3354 Film Blocking Force ($lb_f$) |
|---|---|
| 1 | 0.0099 |
| 2 | 0.1138 |
| 3 | 0.2080 |
| 4 | 0.5054 |
| 5 | 0.0921 |
| 6 | 0.0817 |
| 7 | 0.1771 |
| Control | 0.6934 |

Lower liquid plasticizer loading favor reduced blocking or tackiness of flexible PVC films, whereas higher liquid contents enhance the formation of chain entanglements across the layer interface inducing film blocking. Longer contact time times under pressure may lead to welding of layers in some instances. In this work, a threshold blocking force of 0.12 $lb_f$ has been identified as the upper limit of acceptable performance for unwinding and slitting of flexible PVC films. The data in Table 11 and FIG. 5B suggest this criterion is met in the region just above the midpoint and into the lower left quadrant of the DOE composition space.

Tensile Testing (ASTM D882)

Tensile testing of the flexible PVC DOE films was performed using ASTM D882 as a guideline at a temperature of 23±2° C. and a relative humidity of 50±5%. Tensile strengths at break for the DOE films decrease with increasing individual (ELO or DEHP) and overall plasticizer (DEHP+ELO) content. Machine-direction (MD) tensile strength is slightly higher than the corresponding transverse-direction (TD) value because the drawdown from the die exit to the middle casting roll is about 2.78. The web simultaneously contracts in the transverse direction over this distance and thins because the deformation is volume-preserving (Poisson's ratio is approximately equal to 0.5). Therefore, film orientation in the MD is greater than the TD due to increased chain orientation imparted by MD drawdown. Table 12 provides the MD and TD data for tensile strength.

TABLE 12

Measured machine-direction (MD) and transverse-direction (TD) tensile strengths for the seven DOE films and control film generated in this study.

| Example Film | MD Tensile Strength (ksi) | TD Tensile Strength (ksi) |
|---|---|---|
| 1 | 5.03 | 4.23 |
| 2 | 4.61 | 3.79 |
| 3 | 4.44 | 3.71 |
| 4 | 3.77 | 3.25 |
| 5 | 4.39 | 3.72 |
| 6 | 4.85 | 3.90 |
| 7 | 4.71 | 3.80 |
| Control | 4.98 | 3.65 |

Figure 5C:
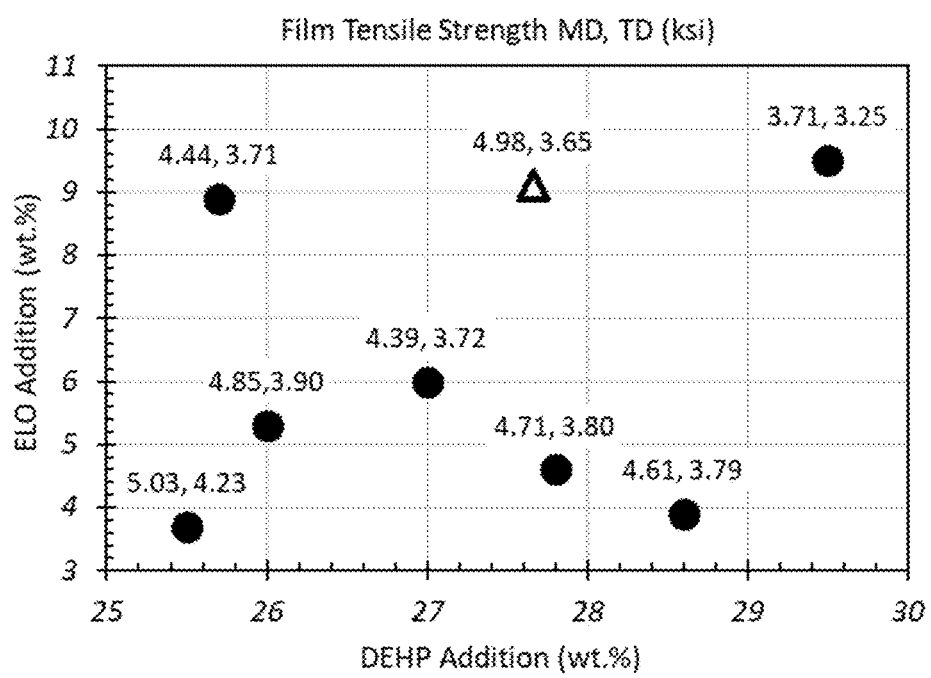

FIG. 5C provides machine-direction (MD) and transverse direction (TD) tensile strength pairs (MD, TD) at 23° C. for the seven DOE films and control film produced in this study.

Tensile strains at break for the DOE films decrease with increasing individual (ELO or DEHP) and overall plasticizer (DEHP+ELO) content. MD tensile strain at break is lower than the TD tensile strain because the drawdown from the die exit to the middle casting roll is about 2.78. The web simultaneously contracts in the transverse direction over this distance and thins because the deformation is volume-preserving (Posisson's ratio is approximately equal to 0.5). Therefore, film extensibility in the MD is less than the TD due to increased chain orientation imparted by MD drawdown. Table 13 provides the MD and TD tensile strain data.

TABLE 13

Tensile strain at break for the seven DOE films and control film generated in this study.

| Example Film | MD Tensile Strain at Break (%) | TD Tensile Strain at Break (%) |
|---|---|---|
| 1 | 326.0 | 573.1 |
| 2 | 312.0 | 576.0 |
| 3 | 341.5 | 592.2 |
| 4 | 357.0 | 618.8 |
| 5 | 318.8 | 568.4 |
| 6 | 317.5 | 555.3 |
| 7 | 351.6 | 582.0 |

Figure 5D:
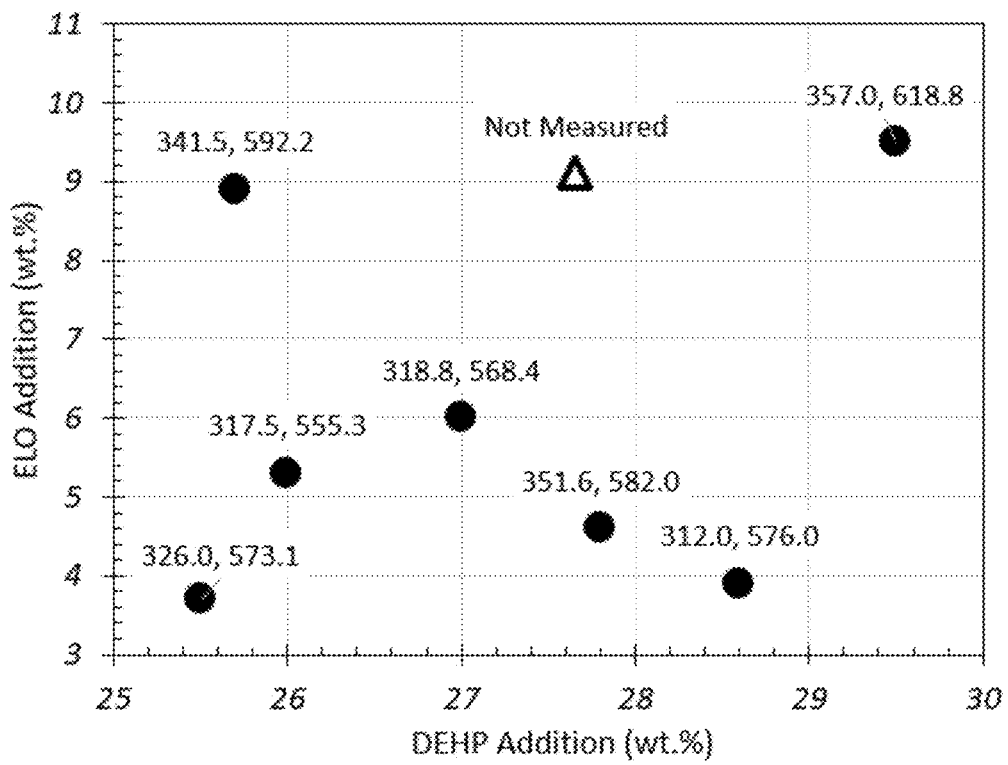

FIG. 5D provides the machine-direction (MD) and transverse-direction (TD) tensile strain pairs (MD, TD) for the seven DOE films and control film produced in this study.

Moisture Vapor Permeability (ASTM F1249)

Water vapor transmission measurements were conducted using a MOCON Permatran-W®, Model 3/34 according to ASTM F1249. Measurements were performed at 25° C. and 90% relative humidity. Moisture vapor permeability values for the DOE and control films are generally reduced as liquid plasticizer content (DEHP and ELO) is increased in the PVC formulation. Compared to other medical packaging polymers such as polypropylene, the moisture vapor permeabilities of flexible PVC films is 5-10 times higher. Over the composition space considered in this study, the moisture vapor permeabilities of the DOE films ranged from 1,137 g·mil/m²·d·atm (25.5 wt. % DEHP, 3.7 wt. % ELO) to 2,101 g·mil/m²·d·atm (29.5 wt. % DEHP, 9.5 wt. % ELO). Table 14 provide the moisture vapor permeabilities at 25° C. and 90% relative humidity for the seven DOE films and control film considered in this study.

TABLE 14

Moisture vapor permeabilities at 25° C. and 90% relative humidity for the seven DOE films and control film considered in this study.

| Example Film | Moisture Vapor Permeability (g · mil/m² · d · atm at 25° C., 90% RH) |
| --- | --- |
| 1 | 1,137 |
| 2 | 1,492 |
| 3 | 1,688 |
| 4 | 2,101 |
| 5 | 1,588 |
| 6 | 1,315 |
| 7 | 1,530 |
| Control | 1,998 |

Figure 5E:
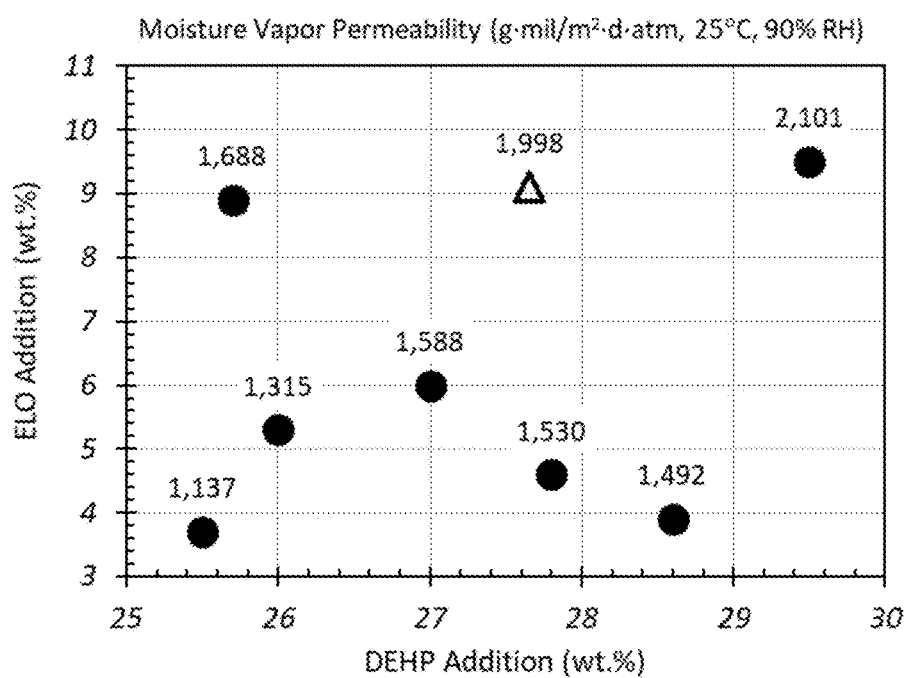

Data regarding the moisture vapor permeability is shown in FIG. 5E. FIG. 5E provides moisture vapor permeability (25° C., 90% RH) for the seven DOE films and control film produced in this study.

Example 3: Effect of Optical Enhancer Addition on Film CIELAB Yellowness (b*) and Redness (a*)

Cast film extrusion of nominal 14-mil flexible PVC films using the R&D extrusion line was performed in order to determine the influence of optical enhancer (e.g., optical brightener (OB)) loading on select film properties including color, yellowness, blocking (tackiness), heat stability, and aging after sterilization. The control base formulation (0 ppm OB) was utilized to produce OB loadings of 0, 25, 50, 75, and 150 ppm using an OB masterbatch containing 3,750 ppm. Extrusion was performed with a screw speed of 100 rpm, a line speed of 31 ft/min, and with the top and middle chill rolls set at 240° F. and 210° F., respectively. The CIELAB color vector was characterized for the "as-produced", sterilized films and the D65/10° yellowness index was computed in accordance with ASTM E313. The yellowness index decreased (shifted to bluer shades) with increasing OB content. Without OB, the control film exhibits a significant positive yellowness index value at the outset of accelerated aging testing.

Sterilized aging studies at 60° C. and CIELAB color measurements for films produced at the various optical brightener levels (0 ppm, 25 ppm, 50 ppm, 75 ppm, and 150 ppm) were performed at 16, 30, 52, and 65-day intervals. Aging the films at 60° C. for a 65-day time interval is in accordance with ASTM F-1980-02. The CIELAB color measurements of the unaged, sterilized films were also included for comparative purposes (0-day time point after sterilization). With the control resin serving as the base resin, the D65/10° yellowness index decreases with an increase in optical enhancer (e.g., 2,5-bis(5-t-butyl-2-benzoxazolyl) thiophene). The redness of the films and comparison relative to a white background was examined for the 65-day sample. Film yellowness and redness values are plotted in FIG. 6A.

Figure 6A:
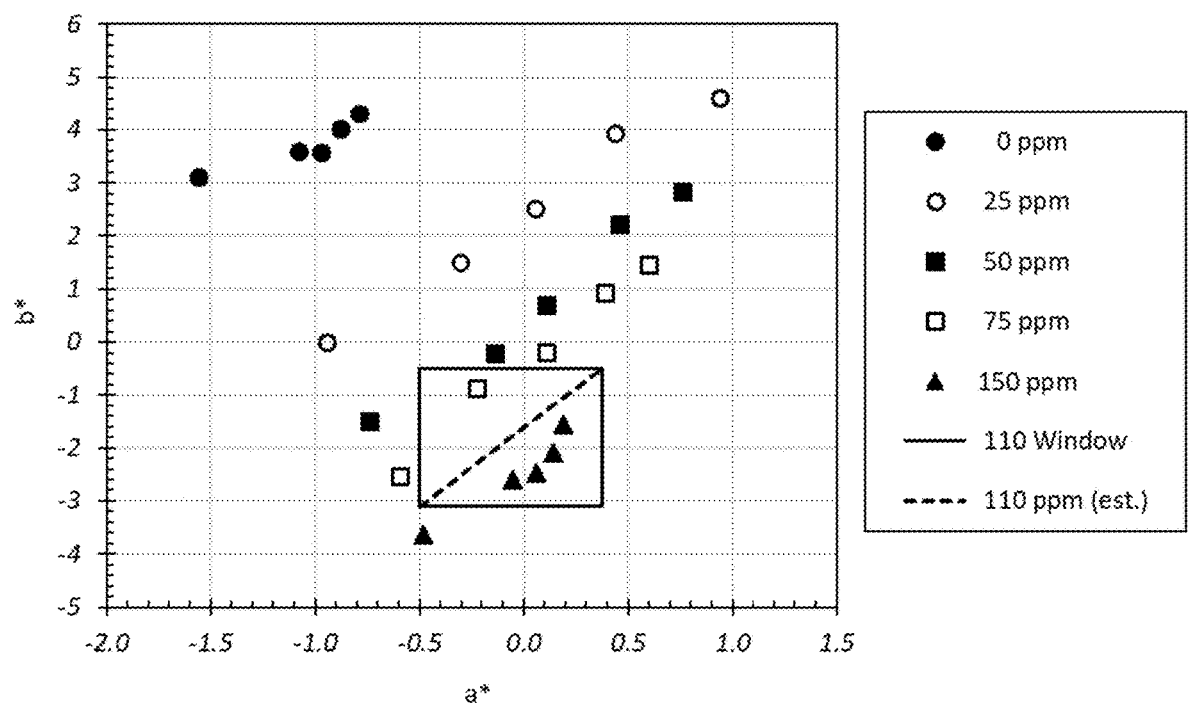
FIGS. 6A and 6B provide redness and yellowness data for embodiments of films disclosed herein.

The data in FIG. 6A reveal that post-sterilized film yellowness (b*) and redness (a*) after aging at 60° C. for 65 days first increases concurrently to a maximum value and then similarly decreases with optical enhancer (e.g., 2,5-bis (5-t-butyl-2-benzoxazolyl) thiophene) addition from 0 ppm to 150 ppm. The maximum yellowness and redness occur at an OB content of about 25 ppm. Above OB levels of 25 ppm, film yellowness and redness ranges continue to contract.

Figure 6B:
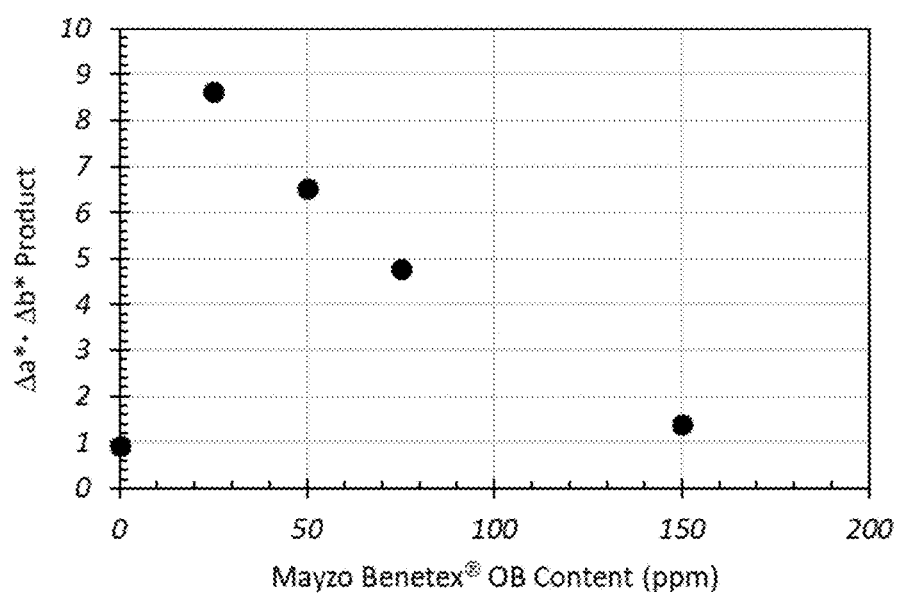

The product of yellowness and redness given by Δa*·Δb* for the aging experiment at 60° C. defines a box with area Δa*·Δb* at each 2,5-bis(5-t-butyl-2-benzoxazolyl) thiophene OB loading. This box is illustrated in FIG. 6B for a 2,5-bis(5-t-butyl-2-benzoxazolyl) thiophene OB content of 110 ppm. This area passes through a maximum with increasing OB concentration at about 25 ppm and decreases exponentially as the OB level is increased, as is shown in FIG. 6B. The plot indicates that gains in yellowness and redness reduction in the post-sterilized films may be realized at OB concentrations higher than about 150 ppm, but the rate of yellowness and redness reduction diminishes per unit OB at the higher loadings. Depending upon the optical and fluorescent activity of the OB, loadings as high as 500 ppm may be required to limit film yellowness and redness by driving the Δa*·Δb* "window" to near zero.

Example 4. Bag Fabrication

Figure 7:
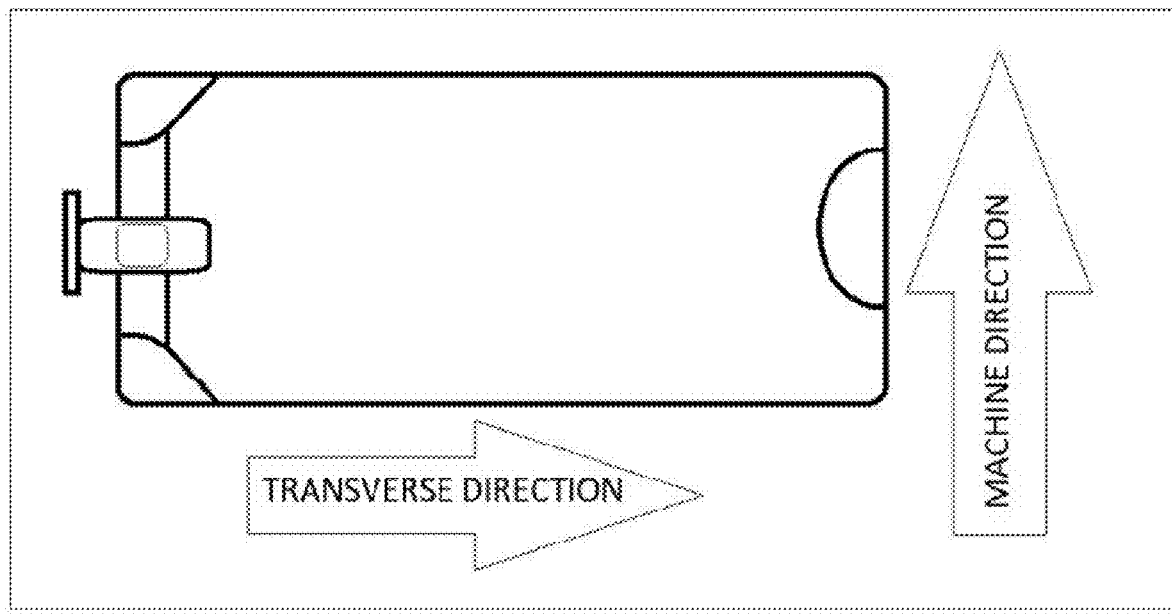
FIG. 7 depicts a bag prepared from embodiments of films disclosed herein.

Sample IV bags were fabricated using a Callalan RF welder located in the R&D laboratory in Round Rock, Tex. Bag sizes ranging from 200 mL to 1000 mL were fabricated using R&D films to evaluate the visual appearance, weld conditions, weld integrity and the target product profile from development film formulations. All fabricated bags were aligned lengthwise with the transverse direction of the film and put together with the matte finish inside the bag, as FIG. 7 illustrates.

Sample IV bags were fabricated using a Callalan RF welder. Bag sizes ranging from 200 mL to 1000 mL were fabricated using the seven DOE films to evaluate the visual appearance, weld conditions, weld integrity and the target product profile from development film formulations. All fabricated bags were aligned lengthwise with the transverse direction of the film (FIG. 7) and joined with the matte finish surface inside the bag. FIG. 7 shows the bag fabrication orientation relative to the film orientation directions (arrows).

Pressure/Burst Testing

Figure 8:
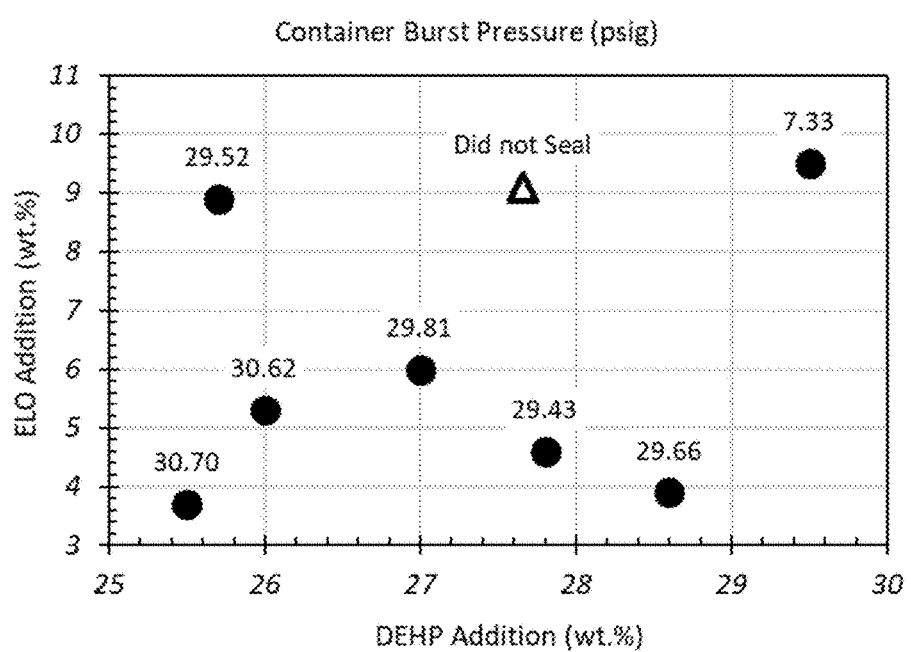
FIG. 8 provides data regarding the bag burst pressure for embodiments of bags disclosed herein.

Comparative testing of 200 mL fabricated bags were subjected to pressure and burst testing using an USON Sprint MD pressure and burst tester. The USON pressure tester was fit with a ⅝-inch barb fitting and was insert into each bag for testing. The bag was evaluated for three distinct performance attributes. FIG. 8 shows the testing results for burst testing of bags fabricated from the films of Example 1 (flexible 200 mL PVC container burst pressures for the seven DOE films and control film generated for this study). Table 15 provides the burst testing data.

TABLE 15

Flexible container (200-mL) burst pressures for the seven DOE films generated in this study.

| Example Film | Container Burst Pressure (psig) |
| --- | --- |
| 1 | 30.70 |
| 2 | 29.66 |
| 3 | 29.52 |
| 4 | 7.33 |
| 5 | 29.81 |
| 6 | 30.62 |
| 7 | 29.43 |
| Control | Not RF Sealable |

Pressure Testing at 7 psig: The bag should be able to maintain a constant pressure of 7 psig for 20 seconds. The test criterion was pass or fail.

Pressure Relaxation: Upon being pressurized to 7 psig; after 20 seconds the bag was evaluated for 30 seconds with a set pressure.

TABLE 16

Figure 9:
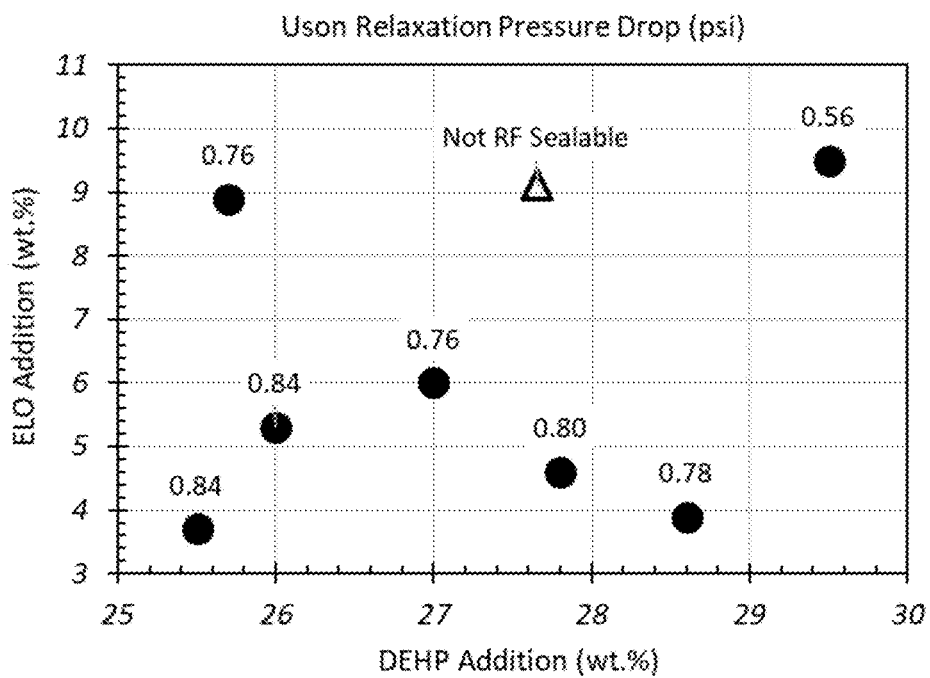
FIG. 9 provides flexible container (200-mL) pressure relaxation data embodiments of films disclosed herein.

Flexible container (200-mL) pressure relaxation data for the seven DOE films generated in this study (shown in FIG. 9).

| Example Film | Uson Relaxation Pressure Drop (psi) |
|---|---|
| 1 | 0.84 |
| 2 | 0.78 |
| 3 | 0.76 |
| 4 | 0.56 |
| 5 | 0.83 |
| 6 | 0.84 |
| 7 | 0.80 |
| Control | Not RF Sealable |

Burst Test: The final bag test utilized a pressure of 40 psig. The USON system quickly ramped the bag pressure to 40 psig and subsequently marked the pressure at which the bag reached before ultimately bursting (see FIG. 8).

Burst pressure measurements on fabricated containers were above 25 psig, with exceptions noted for Example Film 4 and the control film. The control film was not RF sealable by the process employed. Example Film 4 limiting burst pressure appeared to be 7-8 psig burst pressure, as RF seals were weak for the process used. Example Film 4 comprised the highest liquid loading (DEHP+ELO) in the composition space, and exhibited the lowest head pressure during the production of the seven DOE films. These results suggest a substantial reduction in the flexible PVC melt shear viscosity with increased plasticizer content. Since seal strength development is affected by the chain diffusion dynamics and melt rheology of the PVC resin, it is likely that interfacial chain entanglement is reduced by the increased liquid plasticizer loadings in Film Example 4 and the control film.

Example 5. Additional Optical Enhancer Testing

Flexible PVC films of various concentrations of optical brighteners were fabricated as provided in Example 1 and comprising 2-diethylhexyl phthalate (DEHP), epoxidized linseed oil (ELO), and an optical brightener were prepared and extruded.

TABLE 17

Formulations with Different Optical Enhancers

| Sample | DEHP (wt. %) | ELO (wt. %) | Optical Enhancer |
|---|---|---|---|
| Example 8 | 27.0 | 7.22 | 2,5-thiophenediylbis(5-tert-butyl-1,3-benzoxazole) |
| Example 9 | 27.0 | 7.22 | 1,4-bis(2-benzoxazolyl)naphthalene |

The optical enhancers (e.g., optical brighteners, "OB") studied were 2,5-thiophenediylbis(5-tert-butyl-1,3-benzoxazole) (e.g., Benetex® OB) and 1,4-bis(2-benzoxazolyl) naphthalene (e.g., TCI Americas KCB OB). The chemical structures of these compounds are shown below. The following is the chemical structure of 2,5-thiophenediylbis(5-tert-butyl-1,3-benzoxazole) (CAS RN 7128-64-5). The ultraviolet absorption and fluorescence maximum wavelengths for 2,5-thiophenediylbis(5-tert-butyl-1,3-benzoxazole are 375 nm and 435 nm, respectively.

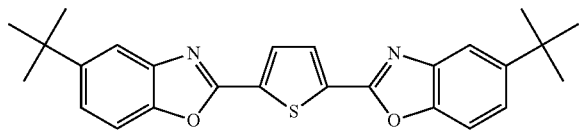 [SMILES: CC(C)(C)c1ccc2oc(-c3ccc(-c4nc5cc(C(C)(C)C)ccc5o4)s3)nc2c1]

The following is the chemical structure chemical structure of 1,4-bis(2-benzoxazolyl)naphthalene (CAS RN 5089-22-5) which is sold by TCI Americas as KCB Optical Brightener. The ultraviolet absorption and estimated fluorescence maximum wavelengths for 1,4-bis(2-benzoxazolyl)naphthalene are 370 nm and about 430 nm, respectively.

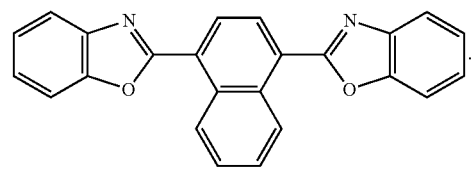

Figure 10:
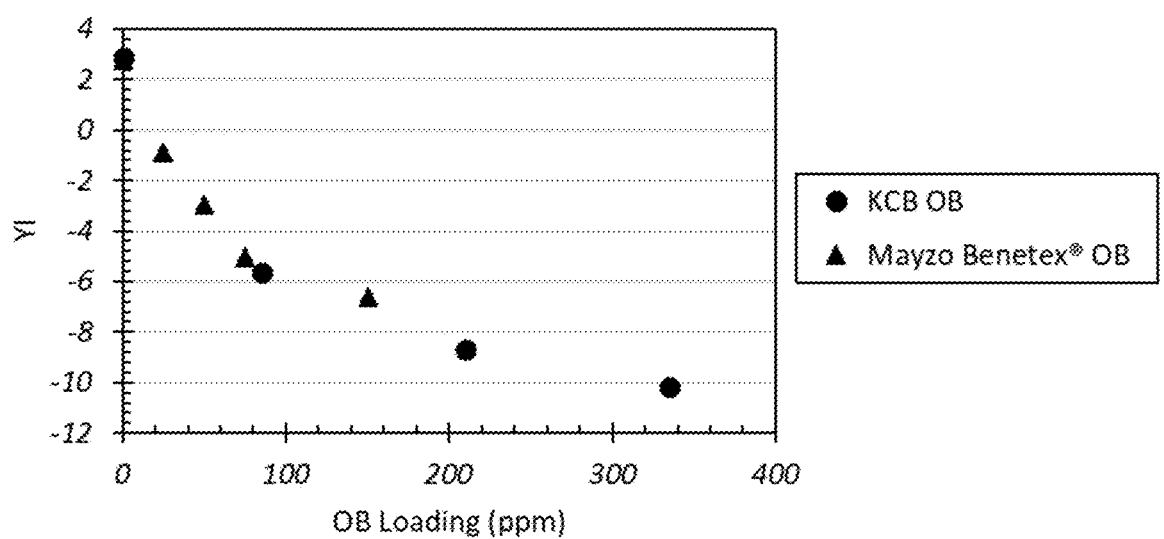
FIG. 10 provides data for two optical enhancing agents. The data shows the optical enhancing agents performed similarly, equivalently, or substantially equivalently with respect to film bluing and yellowness index over their respective film concentration ranges according to the following plot.

Film color stability following a one-hour sterilization cycle at 121° C. was monitored for films with different amounts of 2,5-thiophenediylbis(5-tert-butyl-1,3-benzoxazole) or 1,4-bis(2-benzoxazolyl)naphthalene. The data for that testing is shown as FIG. 10, where YI is the D65/10° yellowness index. As shown, sterilization surprisingly appears to increase film blueness and/or decrease film yellowness for optical enhancer-modified films, whereas for films containing no optical enhancer, yellowness is increased (see Table 18 below with before and after sterilization data, see also FIG. 3A). As shown, films having differing concentrations of optical enhancers were used. The change in yellowness index is shown in FIG. 10. The two optical enhancing agents performed equivalently with respect to film bluing and yellowness index over their respective film concentration ranges according to the following plot.

Table 18 provides data for three different concentrations of 1,4-bis(2-benzoxazolyl)naphthalene optical enhancer versus the Control formulation:

TABLE 18

Performance of 1,4-bis(2-benzoxazolyl)naphthalene Optical enhancer versus Control.

| | KCB | ASTM E313-20 Yellowness Index (D65, 10°) | | | |
|---|---|---|---|---|---|
| Film | Content (ppm) | Before Sterilization | After Sterilization | Difference | Trend |
| Control 1 Formulation | 0 | 2.74 | 4.35 | 1.61 | Yellower |
| Example 9.1 (in Control 1 Base) | 75 | −5.26 | −6.39 | −1.14 | Bluer |
| Example 9.2 (in Control 1 Base) | 225 | −9.58 | −9.80 | −0.21 | Bluer |
| Example 9.3 (in Control 1 Base) | 330 | −10.73 | −11.34 | −0.61 | Bluer |

Example 6. Optical Enhancer Content Effect on TOC

Figure 11A:
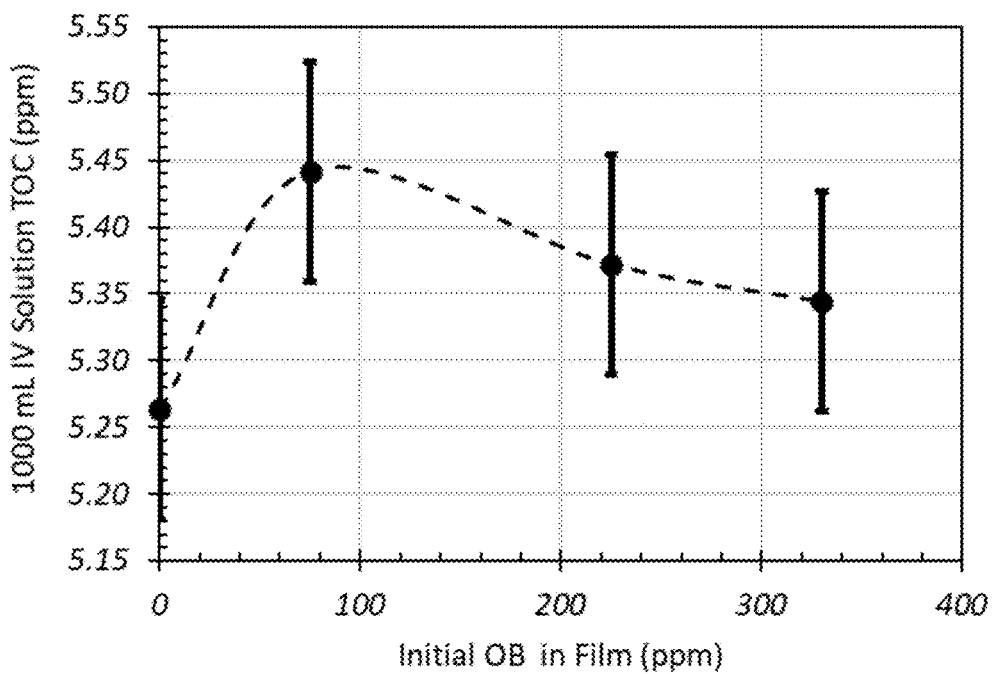
FIGS. 11A and 11B provide data for total organic carbon (TOC) measurements for the two different optical enhancers: 2,5-bis(5-t-butyl-2-benzoxazolyl) thiophene and 1,4-bis (2-benzoxazolyl)naphthalene.
Figure 11B:
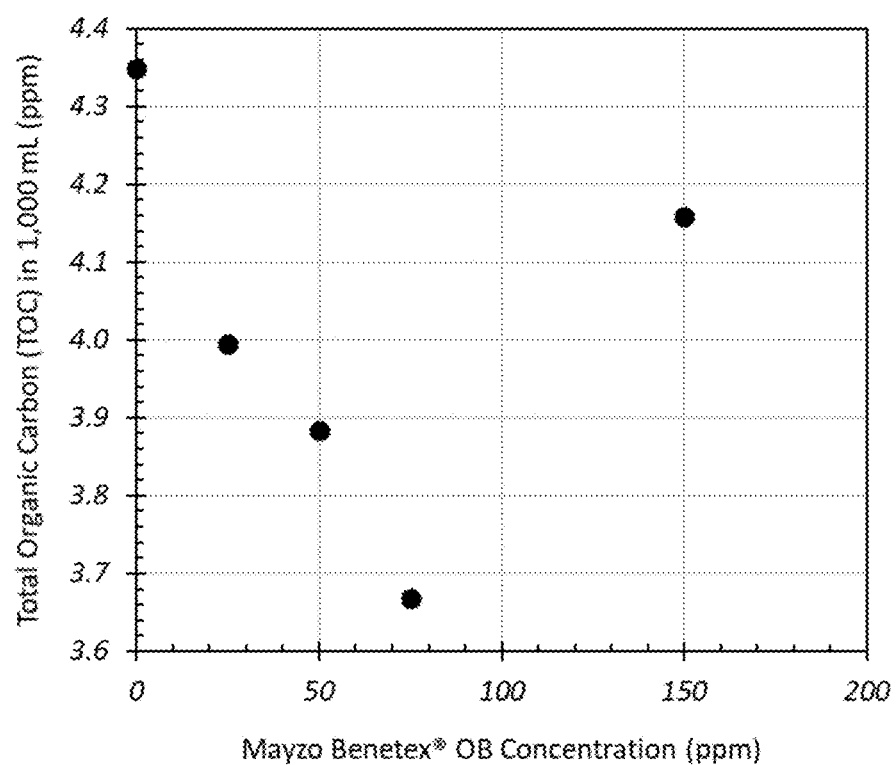

TOC testing was performed on film samples comprising 2,5-bis(5-t-butyl-2-benzoxazolyl) thiophene or 1,4-bis(2- benzoxazolyl)naphthalene using the testing methods provided in Example 2 (using 35 mL of water). The 2,5-bis(5-t-butyl-2-benzoxazolyl) thiophene concentration in the flexible PVC film was systematically varied at 0 ppm, 25 ppm, 50 ppm, 75 ppm and 150 ppm by blending the base resin for the Control formulation of Example 1 (lacking the optical enhancer) with a 3,750 ppm 2,5-bis(5-t-butyl-2-benzoxazolyl) thiophene masterbatch. An interesting result was observed with increasing optical enhancer content for both 2,5-bis(5-t-butyl-2-benzoxazolyl) thiophene and 1,4-bis(2-benzoxazolyl)naphthalene, as total organic carbon in the parenteral solution decreased with increasing optical enhancer content. The effect for 2,5-bis(5-t-butyl-2-benzoxazolyl) thiophene was more pronounced than for the 1,4-bis(2-benzoxazolyl)naphthalene as the FIGS. 11A and 11B show. The 150 ppm 2,5-bis(5-t-butyl-2-benzoxazolyl) thiophene film appeared to not fit the data trend in FIG. 11B. The cause for this discrepancy, is believed to be due to an inhomogeneous blend (poor distribution and lack of dispersion) resulting from the small amount of masterbatch added to the base resin and the poor mixing characteristics of the barrier screw design employed in film extrusion, since the dilution was 25:1. The 1,4-bis(2-benzoxazolyl)naphthalene masterbatch concentration was 1,500 ppm.

Example 7. Impact Dynamic Melt Shearing

Data regarding the impact dynamic melt shearing on the rheological responses of the seven flexible PVC resin formulations studied in Example 1 was performed. This example summarizes and discusses the relationship between the resin compositions and their torque rheometry. Torque rheometry has proven itself a valuable tool for studying multicomponent thermoplastic systems to assess processing behavior. Torque rheometry measures the viscosity-related torque generated by the resistance of a material to the shearing action of the plasticating process.

The results of Brabender torque rheometry studies of the seven DOE resins prepared in Example 1 align with the results of previous static thermal stability data obtained at 172° C. (in Example 2), confirming a compositional advantage for ratios of ingredients as disclosed herein, including for formulation concentrations of DEHP and ELO. In several embodiments, DEHP and ELO concentrations at ranges including 27.00 wt. % and 6.00 wt. %, respectively, perform well (though other concentrations are contemplated, as disclosed elsewhere herein). This compositional operating range for DEHP and ELO (27.00 wt. % and 6.00 wt. %, respectively) appears to result in surprising synergy demonstrated at or near the midpoint of the chosen DOE composition space for DEHP and ELO in this study.

Each of the seven DOE flexible PVC resin formulations were subjected to the torque rheometer processing conditions listed in Table 19. The mixing bowl and roller blades were scrubbed with brass spatulas and brushes following each formulation run. The torque of the driven roller and the temperature of the mixing bowl contents were monitored over the time of fusion and melt shearing (30 min). Recorded Torque-time and temperature-time curves were plotted analyzed for compositional related differences. The torque and temperature values obtained at 30 min were utilized to assess chemical changes and shear heating temperature rise in the plasticated melt.

TABLE 19

| Brabender Plasticorder ® Operating Variable | Value | Units |
|---|---|---|
| Mixing Bowl Capacity | 60 | $cm^3$ |
| Charge Mass | 60.0 | g |
| Bowl Temperature | 175 | ° C. |
| Blade Design | Standard Roller | — |
| Blade Speed Ratio (Driven:Idle) | 2:3 | — |
| Blade Rotational Speed (Idle) | 100 | rpm |
| Mixing Time | 30 | min |

The measured temperature after 30 min of shearing was used to compute the temperature rise ($\Delta T$) above the initial mixing bowl temperature to provide a measure of shear heating. The differences in temperature rise between the various DOE PVC resin variants ($\Delta\Delta T$) and the midpoint PVC resin were calculated. Both temperature differences were plotted parametrically in FIGS. 12A and 12B within the DEHP-ELO composition space.

Figure 12A:
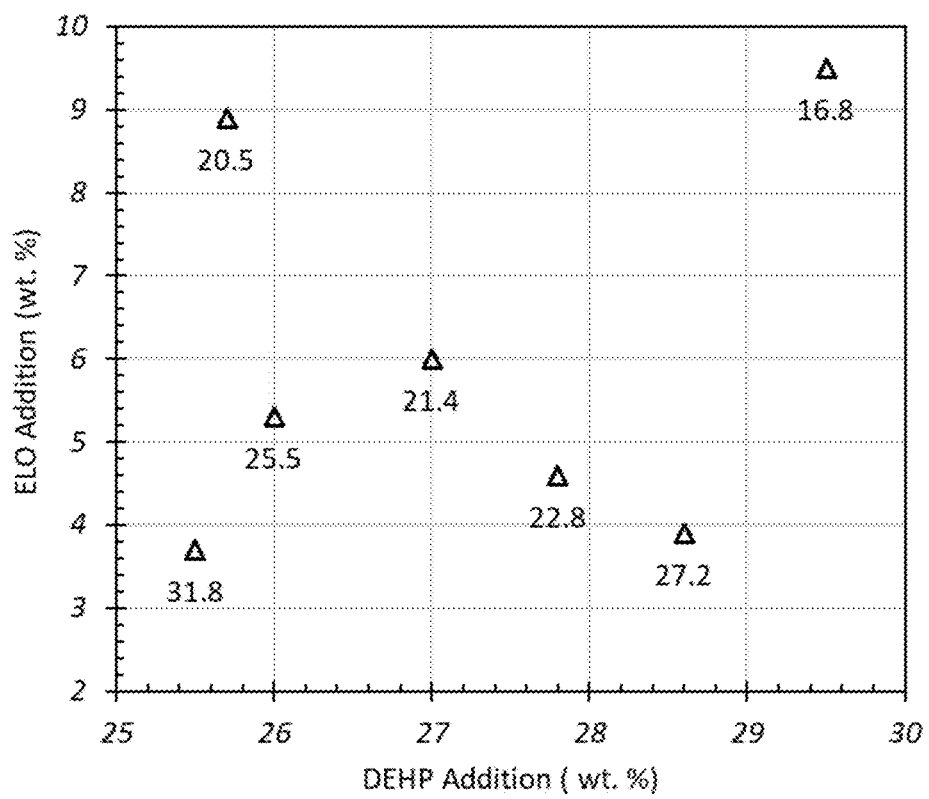
FIG. 12A provides data for shear heating temperature differences measured after 30 minutes of shearing at 100 rpm in a 60 cm$^3$ Brabender Plasticorder® mixing bowl using standard roller blades running at a 2:3 driven:idle speed ratio. Note the relative decrease in shear heating along the ordinate and along the diagonals of the composition space as the ELO content of the formulation is increased (ΔT≈10-11° C.). The shear heating temperature increment for DEHP is lower (ΔT≈4-5° C.).
Figure 12B:
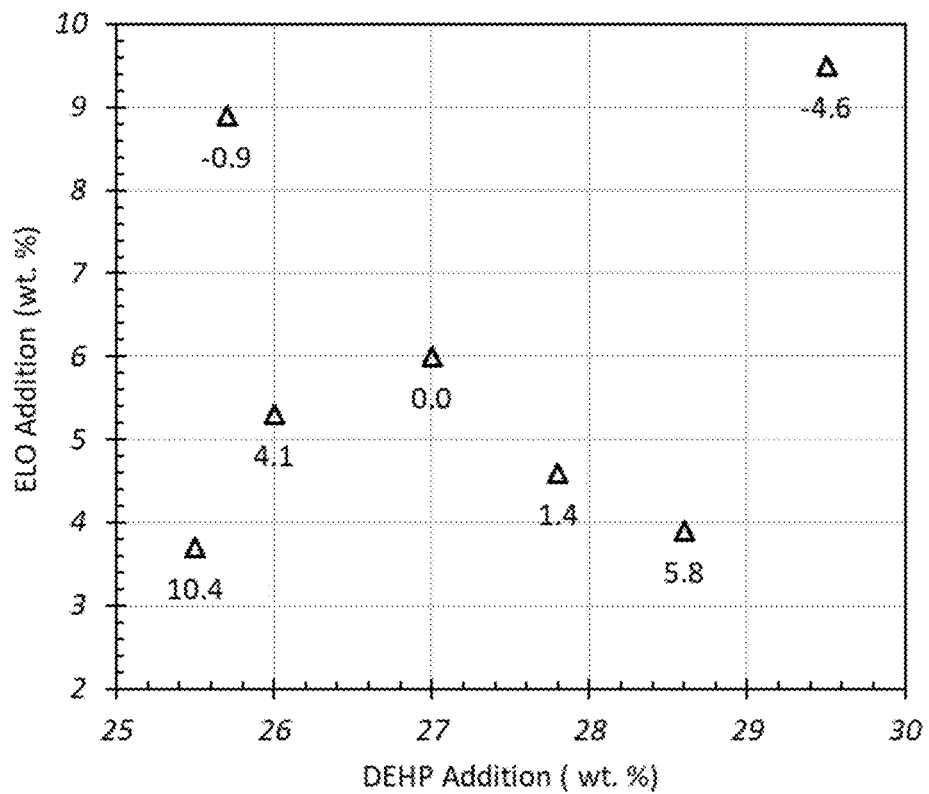
FIG. 12B provides shear heating differential temperature rise (AAT) relative to the midpoint poly(vinyl chloride) (PVC) formulation comprising 27.0 wt. % DEHP and 6.0 wt. % ELO. Again, note the relative changes in the parameter AAT along the ordinate and along the diagonals in the DOE composition space.

The data in FIGS. 12A and 12B parallel earlier results obtained for the static thermal stability test at 172° C. (e.g., from Example 2). The static thermal stability test revealed that an increase in ELO from 4 wt. % to 6 wt. % raised the thermal stability time from 55 min to 100 min (22.5 min/wt. % ELO added), whereas an increase from 6 wt. % to 9 wt. % (10.0 min/wt. % ELO added) increased the thermal stability time to about 120-130 min. Additionally, the data confirmed the static heat stability time was independent of the DEHP content of the formulation with the range of 26 wt. % to 29 wt. %. A similar relationship is observed in FIGS. 12A and 12B.

The static thermal stability test is performed on a film or slab sample subjected to a quiescent exposure to a constant 172° C. in an oven. In the Brabender experiment, the PVC melt is masticated and sheared between the roller blades in the mixing bowl at about 180° C. to 200° C. While both experiments yield information related to the rate of progression of the PVC dehydrochlorination reaction, one is static in the solid state and the other is dynamic in the melt state. The latter method is more reflective of degradation occurring during film extrusion.

The impact of melt processing conditions on the extent of shear heating temperature rise may be estimated in the adiabatic limit for steady-state shearing by the equation:

$$\Delta T = \frac{\sigma \dot{\gamma}}{\rho c_p} \Delta t$$

where T is the resin formulation melt temperature, $\sigma^o$ is the shear stress, $\dot{\gamma}$ is the shear rate, $\rho$ is the melt density, and $c_p$ is the melt specific heat. If the melt processing conditions and the rate and duration of shearing are held constant for the Brabender experiment, one would expect from the foregoing equation a linear relationship between the final shear heating temperature and the Brabender shaft torque, since the shaft torque $\tau$ is proportional to the shear stress $\sigma$.

Figure 12C:
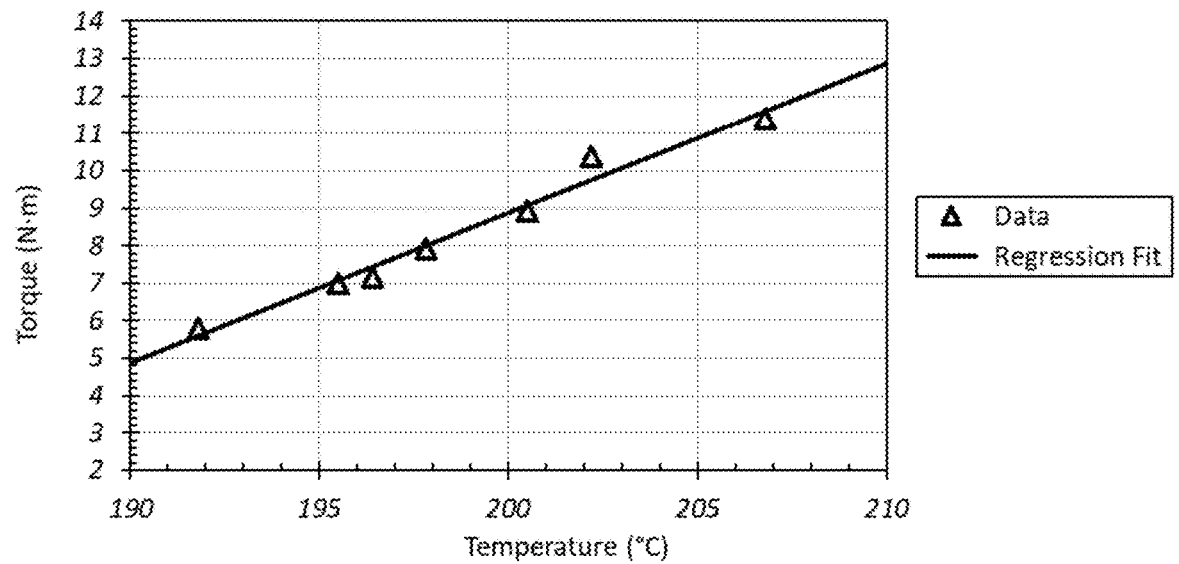
FIG. 12C provides the variation of Brabender shaft torque with melt temperature at 30 min for the various design of experiment (DOE) PVC formulations. The Brabender Plasticorder® conditions employed in the melt shearing experiments are listed in Table 1. The regression equation of the line shown is: Torque (N·m)=−71.3+0.401·ΔT(° C.) with a squared correlation coefficient of $R^2$=0.975.
Figure 12D:
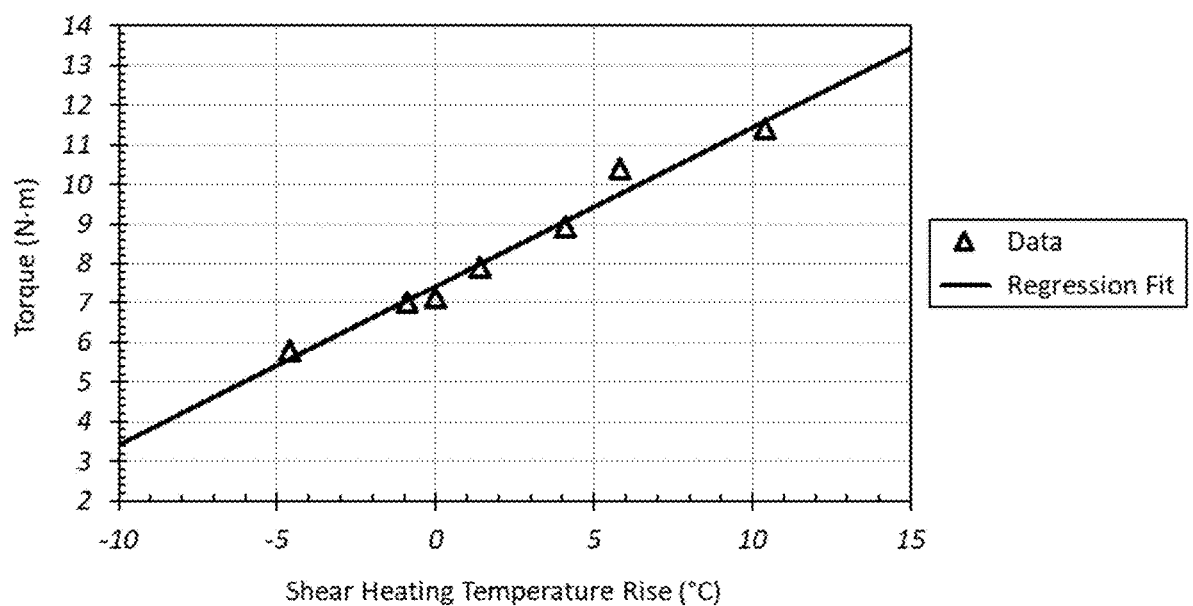
FIG. 12D provides the variation of Brabender shaft torque with melt temperature rise at 30 min for the various DOE PVC formulations. The Brabender Plasticorder® conditions employed in the melt shearing experiments are listed in Table 19. The regression equation of the line shown is: Torque (N−m)=7.44+0.401·ΔΔT(° C.) with a squared correlation coefficient of $R^2$=0.975.

The plot of the 30-min Brabender torque against melt temperature in FIG. 12C confirms this assertion. Since the initial mixing bowl temperature is set at a constant 175° C. for all experiments, the torque varies linearly with the temperature rise observed in melt shearing and yields the equivalent relationship given and plotted in FIG. 12D.

A more rigorous analysis considering the variations in temperature and plasticizer concentrations is developed below. The resulting model equation is:

$$ln(e^{cT_{30}} - e^{cT_0}) = lnK' + aln(1 - w_{DEHP}) + bln(1 - w_{ELO})$$

where $T_{30}$ is the melt temperature at 30 min, $T_0$ is the initial mixing bowl temperature, $w_{DEHP}$ is the mass fraction of DEHP in the resin, $w_{ELO}$ is the mass fraction of ELO in the resin, and which a, b, c, and K' are the unknown model parameters. The unknown model parameters were obtained by Newton-Raphson least-squares using the MS Solver routine. The values of the model parameters were found to be:
a=3.80
b=7.73
c=0.00393 $K^{-1}$
K'=0.0999

Figure 12E:
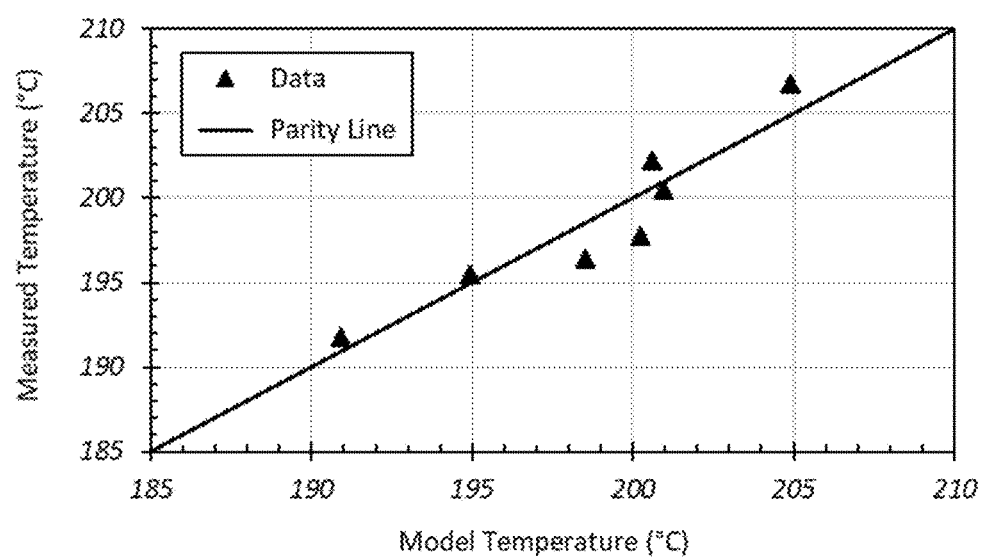
FIG. 12E is a graph showing model calculated mixing bowl temperatures versus actual measurements. As shown, there is agreement between measured and model calculated mixing bowl temperatures for the seven DOE resin formulations processed using the Brabender Plasticorder torque rheometer with the operating conditions prescribed in Table 19.

The value obtained for the parameter c indicates an Arrhenius flow activation energy of $E_A$=6.09 kJ/mol which is consistent with the range values 4.50 kJ/mol≤$E_A$≤14.5 kJ/mol proposed by Patel for the same temperature range. Good agreement between measured and model calculated values for the melt temperature at 30 minutes ($T_{30}$) is indicated in FIG. 12E.

The shear heating responses for the seven DOE resin variants obtained from the Brabender torque rheometer shearing experiments using the conditions listed in Table 19 reveal the observed temperature rise in shearing is dependent upon the concentrations of DEHP and ELO. A composition-dependent model of adiabatic shear heating coupled with the non-linear regression modeling of the experimental data indicate the change in shear heating temperature rise is about twice higher for ELO than for DEHP within the studied composition space. While not to be bound by theory, the increased sensitivity demonstrated for ELO relative to DEHP may be related to ELO's ability to act as an external plasticizer and to limit the thermal degradation and crosslinking of the PVC due its ability to scavenge protons generated in the PVC dehydrochlorination reaction to improve the thermal stability of the resin during melt processing. DEHP functions only as an external plasticizer, and offers no proton scavenging capacity to mitigate the dehydrochlorination reaction. However, the two plasticizers do work in concert to synergistically reduce the shear heating temperature rise during melt processing which reduces melt thermal exposure.

The results of Brabender torque rheometry studies of the seven DOE resins prepared earlier align with the results of static thermal stability data obtained at 172° C. (in Example 2), confirming a compositional concentration range of DEHP and ELO with improved properties (that includes 27.00 wt. % and 6.00 wt. %, respectively). This compositional operating range for DEHP and ELO appears to be related to their surprising synergy demonstrated at or near the midpoint of the chosen DOE composition space for DEHP and ELO in this study.

The Brabender Plasticorder conditions used in this experiment provide a reliable method for characterization the melt processing characteristics of formulated PVC resins such as standard roller blade shaft torque, shear heating temperature rise, and melt temperature.

A polymer melt under melt shearing conditions will experience an adiabatic temperature rise given approximately by the relationship:

$$\rho c_p \frac{dT}{dt} = \tau \dot{\gamma}$$

Assuming the polymer melt is a power law fluid, the foregoing equation may be expanded to $$\frac{dT}{dt} = \frac{\eta(T, \dot{\gamma})\dot{\gamma}^2}{\rho c_p}$$

However, since $$\eta(T,\dot{\gamma}) = K_0 e^{-bT}(1-w_{DEHP})^a(1-w_{ELO})^b \dot{\gamma}^{n-1}$$

we have $$\frac{dT}{dt} = \frac{K_0}{\rho c_p} e^{-bT}(1-w_{DEHP})^a(1-w_{ELO})^b \dot{\gamma}^{n+1}$$

Separating variables and integrating from $T_0$ to $T_{30}$ as the shearing time is increased from 0 to t yields $$\int_{T_0}^{T_{30}} e^{cT} dT = \frac{K_0}{\rho c_p}(1-w_{DEHP})^a(1-w_{ELO})^b \dot{\gamma}^{n+1} t$$

$$\frac{e^{cT_{30}} - e^{cT_0}}{c} = \frac{K_0}{\rho c_p}(1-w_{DEHP})^a(1-w_{ELO})^b \dot{\gamma}^{n+1} t$$

$$\frac{e^{cT_{30}} - e^{cT_0}}{c} = \frac{K_0}{\rho c_p}(1-w_{DEHP})^a(1-w_{ELO})^b \dot{\gamma}^{n+1} t$$

$$e^{cT_{30}} - e^{cT_0} = \frac{K_0}{\rho c_p}(1-w_{DEHP})^a(1-w_{ELO})^b \dot{\gamma}^{n+1} ct$$

$$e^{cT_{30}} - e^{cT_0} = \frac{cK_0 \dot{\gamma}^{n+1} t}{\rho c_p}(1-w_{DEHP})^a(1-w_{ELO})^b$$

Taking the natural logarithm of both sides of the preceding equation gives:

$$\ln(e^{cT_{30}} - e^{cT_0}) = \ln\left(\frac{cK_0 \dot{\gamma}^{n+1} t}{\rho c_p}\right) + a\ln(1 - w_{DEHP}) + b\ln(1 - w_{ELO})$$

$$\ln(e^{cT_{30}} - e^{cT_0}) = \ln K' + a\ln(1 - w_{DEHP}) + b\ln(1 - w_{ELO})$$

and, finally $$T_{30} = \frac{1}{c}\ln\{\exp(cT_0) + \exp[\ln K' + a\ln(1 - w_{DEHP}) + b\ln(1 - w_{ELO})]\}$$

The four unknowns to be solved for are c, a, b, K' using the MS Solver to perform a nonlinear least-squares regression with a Newton-Raphson iteration. The values obtained were:
a=320
b=7.73
c=0009
K'=0.0999

The relative sensitivities of the adiabatic temperature rise to independent changes in ELO and DEHP concentrations may be found by ratioing the respective partial derivatives.

$$\frac{\partial T_{30}}{\partial w_{DEHP}} =$$

$$-\frac{a}{c}\left(\frac{1}{\{\exp(cT_0) + \exp[\ln K' + a\ln(1 - w_{DEHP}) + b\ln(1 - w_{ELO}) + \ln t]\}}\right)$$

-continued $$\frac{\partial T_{30}}{\partial w_{ELO}} = -\frac{b}{c}\left(\frac{1}{\{\exp(cT_0)+\exp[\ln K'+a\ln(1-w_{DEHP})+b\ln(1-w_{ELO})+\ln t]\}}\right)\left(\frac{1}{1-w_{ELO}}\right)$$

to obtain:

$$\frac{\left(\frac{\partial T_{30}}{\partial w_{ELO}}\right)}{\left(\frac{\partial T_{30}}{\partial w_{DEHP}}\right)} = \frac{b}{a}\left(\frac{1-w_{DEHP}}{1-w_{ELO}}\right) = 2.033\left(\frac{1-w_{DEHP}}{1-w_{ELO}}\right)$$

$$\Delta T_{30} = \left(\frac{\partial T_{30}}{\partial w_{DEHP}}\right)\Delta w_{DEHP} + \left(\frac{\partial T_{30}}{\partial w_{ELO}}\right)\Delta w_{ELO}$$

At the proposed formulation composition, we have $w_{DEHP}=0.270$ and $w_{ELO}=0.060$. Substituting these values into the derivative ratio equation along with the values for the model parameters a and b we find that $$\frac{\left(\frac{\partial T_{30}}{\partial w_{ELO}}\right)}{\left(\frac{\partial T_{30}}{\partial w_{DEHP}}\right)} = \frac{b}{a}\left(\frac{1-w_{DEHP}}{1-w_{ELO}}\right) = \left(\frac{7.73}{3.80}\right)\left(\frac{1-0.270}{1-0.060}\right) = 1.58$$

Thus, at the proposed composition, the rate of decrease of the shear heating temperature rise is 1.58 times greater with an increase in ELO than with DEHP. At a constant $w_{DEHP}=0.270$, the lower end of the ELO range at $w_{ELO}=0.040$ we have $$\frac{\left(\frac{\partial T_{30}}{\partial w_{ELO}}\right)}{\left(\frac{\partial T_{30}}{\partial w_{DEHP}}\right)} = \frac{b}{a}\left(\frac{1-w_{DEHP}}{1-w_{ELO}}\right) = \left(\frac{7.73}{3.80}\right)\left(\frac{1-0.270}{1-0.040}\right) = 1.55$$

and at the higher limit of $w_{ELO}=0.090$ the result is $$\frac{\left(\frac{\partial T_{30}}{\partial w_{ELO}}\right)}{\left(\frac{\partial T_{30}}{\partial w_{DEHP}}\right)} = \frac{b}{a}\left(\frac{1-w_{DEHP}}{1-w_{ELO}}\right) = \left(\frac{7.73}{3.80}\right)\left(\frac{1-0.270}{1-0.090}\right) = 1.63$$

Several illustrative embodiments of polymer compositions, articles comprising those compositions, and methods of making and using the same have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment, or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and other implementations of the disclosed features are within the scope of this disclosure.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic.

Conditional language used herein, such as, among others, "can," "could," "might," "may," "e.g.," and the like, unless specifically stated otherwise or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "includes" should be interpreted as "includes but is not limited to;" the term "example" is used to provide exemplary instances of the item in discussion, not an exhaustive or limiting list thereof; and use of terms like "preferably," "preferred," "desired," or "desirable," and words of similar meaning should not be understood as implying that certain features are critical, essential, or even important to the structure or function of the invention, but instead as merely intended to highlight alternative or additional features that may or may not be utilized in a particular embodiment of the invention. In addition, the term "comprising" is to be interpreted synonymously with the phrases "having at least" or "including at least". When used in the context of a process, the term "comprising" means that the process includes at least the recited steps, but may include additional steps. When used in the context of a compound, composition or device, the term "comprising" means that the compound, composition or device includes at least the recited features or components, but may also include additional features or components. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Additionally, the phrase "consisting essentially of" will be understood to include those elements specifically recited and those additional elements that do not materially affect the basic and novel characteristics of the claimed technology. The phrase "consisting of" excludes any element not specified.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

What is claimed is:

1. A medical fluid bag, comprising:
   a light transmissive film providing an internal area that is configured to hold a medical fluid, the film comprising:
   poly(vinyl chloride) in an amount in weight percent ranging from 55% to 75% of the film;
   one or more plasticizers in an amount in weight percent ranging from 20% to 47.5% of the film;
   one or more acid scavengers in an amount in weight percent ranging from 0.01% to 1.0% of the film; and
   one or more optical enhancers in an amount in weight percent ranging from 0.001% to 0.10% of the film, the optical enhancer being an aromatic compound that converts an ultraviolet wavelength of light into a visible wavelength of light;
   wherein a yellowness index of the medical fluid bag as indicated by D65/10° is less than 0 after subjecting the medical fluid bag to thermal sterilization.

2. The medical fluid bag of claim 1, wherein the yellowness index of the medical fluid bag decreases after subjecting the medical fluid bag to the thermal sterilization.

3. The medical fluid bag of claim 1, wherein the thermal sterilization includes exposing the medical fluid bag to a temperature of 121° C. for a period of time that is at least 10 minutes.

4. The medical fluid bag of claim 1, wherein a total organic carbon of the film is less than or equal to 8 ppm.

5. The medical fluid bag of claim 1, wherein the poly(vinyl chloride) is present in an amount in weight percent ranging from 62.5% to 70.0% of the film.

6. The medical fluid bag of claim 1, wherein the one or more plasticizers consists of a first plasticizer and a second plasticizer.

7. The medical fluid bag of claim 6, wherein the first plasticizer is bis(2-diethylhexyl) phthalate (DEHP).

8. The medical fluid bag of claim 6, wherein the second plasticizer is as a proton scavenger and/or is configured to mitigate adverse effects and autocatalytic nature of the dehydrochlorination reaction in PVC.

9. The medical fluid bag of claim 6, wherein the second plasticizer is epoxidized linseed oil (ELO).

10. The medical fluid bag of claim 1, wherein the one or more optical enhancers are present in an amount in weight percent ranging from 0.005% to 0.05% of the film.

11. The medical fluid bag of claim 1, wherein the one or more optical enhancers consist of 2,5-bis(5-t-butyl-2-benzoxazolyl) thiophene, 1,4-bis(2-benzoxazolyl)naphthalene, or both.

12. The medical fluid bag of claim 1, wherein the one or more acid scavengers consist of one or more metal stearates.

13. The medical fluid bag of claim 12, wherein the one or more metal stearates comprise $CaSt_2$, $ZnSt_2$, or both.

14. The medical fluid bag of claim 1, further comprising one or more lubricants.

15. The medical fluid bag of claim 14, wherein the one or more lubricants comprise a wax.

16. The medical fluid bag of claim 14, wherein the one or more lubricants consists of N,N'-ethylene bis-stearamide wax.

17. The medical fluid bag of claim 14, wherein the one or more lubricants consists of montan wax.

18. A medical fluid bag, comprising:
   a light transmissive film, the film comprising:
   poly(vinyl chloride) in an amount in weight percent ranging from 61.0% to 70.0% of the film;
   DEHP in an amount in weight percent ranging from 25.0% to 30.0% of the film;
   ELO in an amount in weight percent ranging from 3.0% to 10.0% of the film;
   $CaSt_2$ in an amount in weight percent ranging from 0.05% to 0.07% of the film;
   $ZnSt_2$ in an amount in weight percent ranging from 0.05% to 0.07% of the film;
   N,N'-ethylene bis-stearamide wax in an amount in weight percent ranging from 0.1% to about 2% of the film; and 2,5-bis(5-t-butyl-2-benzoxazolyl) thiophene or 1,4-bis(2-benzoxazolyl)naphthalene in an amount in weight percent ranging from 0.001% to 0.015% of the film; wherein a yellowness index of the medical fluid bag as indicated by D65/10° is negative after exposure to thermal sterilization conditions.

19. The medical fluid bag of claim 18, wherein the poly(vinyl chloride) is present in an amount in weight percent ranging from 62.5% to 70.0% of the film.

20. The medical fluid bag of claim 19, wherein the DEHP is present in amount in weight percent ranging from 26.0% to 27.5% of the film.

21. The medical fluid bag of claim 20, wherein the ELO is present in an amount in weight percent ranging from 4.6% to 6.5% of the film.

22. The medical fluid bag of claim 21, wherein the 2,5-bis(5-t-butyl-2-benzoxazolyl) thiophene is present in an amount in weight percent ranging from 0.005% to 0.015% of the film.

23. A film, comprising:
poly(vinyl chloride) in an amount in weight percent ranging from 55% to 75%;
one or more plasticizers in an amount in weight percent ranging from 20% to 47.5%;
one or more metal stearates in an amount in weight percent ranging from 0.01% to 1.0%; and
an optical enhancer in an amount in weight percent ranging from 0.001% to 0.10%;
wherein the optical enhancer is an aromatic compound that converts a portion of ultraviolet light into a visible wavelength of light;
wherein the yellowness index of the film as indicated by D65/10° is negative after subjecting the film to thermal sterilization conditions.

24. The film of claim 23, wherein the poly(vinyl chloride) is present in an amount in weight percent ranging from 62.5% to 70.0% of the film.

25. The film of claim 24, wherein the one or more plasticizers consists of a first plasticizer and a second plasticizer.

26. The film of claim 25, wherein the first plasticizer is bis(2-diethylhexyl) phthalate (DEHP).

27. The film of claim 25, wherein the second plasticizer is epoxidized linseed oil (ELO).

28. The film of claim 23, wherein the one or more optical enhancers are present in an amount in weight percent ranging from 0.005% to 0.05% of the film.

29. The film of claim 28, wherein the one or more optical enhancers consist of 2,5-bis(5-t-butyl-2-benzoxazolyl) thiophene, 1,4-bis(2-benzoxazolyl)naphthalene, or both.

30. The film of claim 23, wherein the one or more metal stearates comprise $CaSt_2$, $ZnSt_2$, or both.

31. The film of claim 23, further comprising one or more lubricants.

32. The film of claim 31, wherein the one or more lubricants comprise a wax.

33. The film of claim 31, wherein the one or more lubricants consists of N,N'-ethylene bis-stearamide wax.

34. A method for manufacturing the film of claim 23, comprising:
mixing a poly(vinyl chloride) resin with an optical enhancer to prepare a polymer blend;
heating the polymer blend;
extruding the polymer blend to provide an extruded polymer blend;
cooling the extruded polymer blend to provide the film.

35. A method for packaging and storing medical fluids, comprising:
providing a container comprising the film of claim 23, wherein the container comprises at least one port;
attaching a fill tube to the at least one port; and
filling the container with a predetermined volume of a medical fluid.

* * * * *